(12) United States Patent
Nakata

(10) Patent No.: US 11,076,320 B2
(45) Date of Patent: Jul. 27, 2021

(54) VEHICLE COMMUNICATION SYSTEM, VEHICLE COMMUNICATION APPARATUS, AND MANAGEMENT APPARATUS

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/825,053

(22) Filed: Mar. 20, 2020

(65) Prior Publication Data

US 2020/0221349 A1 Jul. 9, 2020

Related U.S. Application Data

(63) Continuation of application No. PCT/JP2018/035565, filed on Sep. 26, 2018.

(30) Foreign Application Priority Data

Sep. 28, 2017 (JP) .............................. JP2017-188644
Aug. 28, 2018 (JP) .............................. JP2018-159609

(51) Int. Cl.
*H04W 28/26* (2009.01)
*H04W 64/00* (2009.01)
*H04W 4/44* (2018.01)

(52) U.S. Cl.
CPC .............. *H04W 28/26* (2013.01); *H04W 4/44* (2018.02); *H04W 64/006* (2013.01)

(58) Field of Classification Search
CPC .......... G08G 1/09; H04W 28/26; H04W 4/44; H04W 4/04; H04W 64/006; H04W 72/04; H04W 28/18; H04W 72/08; H04M 3/00
See application file for complete search history.

(56) References Cited

U.S. PATENT DOCUMENTS 10,320,923 B2 * 6/2019 Moghe ............ H04W 36/00835
10,723,374 B2 * 7/2020 Itagaki ................ B61L 15/0027
10,868,667 B2 * 12/2020 Qi ........................ H04W 12/069
(Continued)

FOREIGN PATENT DOCUMENTS

| JP | 2014-003355 A | | 1/2014 | |
| JP | 2014003355 A | * | 1/2014 | ............ H04W 28/26 |
| JP | 5880302 B2 | | 2/2016 | |

*Primary Examiner* — Khawar Iqbal
(74) *Attorney, Agent, or Firm* — Maschoff Brennan

(57) ABSTRACT

A vehicle communication system includes: a vehicle communication apparatus for a vehicle; a management apparatus that manages a wireless resource; and a request transmitter that transmits a resource allocation request to the management apparatus for requesting allocation of a location resource and the wireless resource by time. The vehicle communication apparatus includes: a vehicle transmitter, a vehicle receiver, and a vehicle communication controller that corresponds to a vehicle processer, and controls the vehicle transmitter and the vehicle receiver. The management apparatus includes: a management apparatus receiver that receives the resource allocation request, an allocator that corresponds to a management processer, and allocates the location resource and the wireless resource by time, and a management apparatus transmitter that transmits an allocation result of the allocator.

16 Claims, 33 Drawing Sheets

(56) References Cited

U.S. PATENT DOCUMENTS

| | | | |
|---|---|---|---|
| 2015/0072696 A1* | 3/2015 | Nakata | H04W 72/048 |
| | | | 455/450 |
| 2018/0001916 A1* | 1/2018 | Aoyama | B61L 15/0054 |
| 2018/0160333 A1* | 6/2018 | Patil | H04L 67/12 |
| 2019/0026829 A1* | 1/2019 | Nakata | G06Q 20/3224 |
| 2019/0077433 A1* | 3/2019 | Itagaki | B61L 15/0027 |
| 2019/0130755 A1* | 5/2019 | Lin | G08G 1/164 |
| 2019/0138008 A1* | 5/2019 | Ross | H04B 17/318 |
| 2019/0174286 A1* | 6/2019 | Guo | H04W 4/00 |
| 2019/0297526 A1* | 9/2019 | Das | H04W 4/06 |
| 2020/0120458 A1* | 4/2020 | Aldana | H04W 36/08 |

* cited by examiner

VEHICLE COMMUNICATION SYSTEM, VEHICLE COMMUNICATION APPARATUS, AND MANAGEMENT APPARATUS

CROSS REFERENCE TO RELATED APPLICATIONS

The present application is a continuation application of International Patent Application No. PCT/JP2018/035565 filed on Sep. 26, 2018, which designated the U.S. and claims the benefit of priority from Japanese Patent Application No. 2017-188644 filed on Sep. 28, 2017, and Japanese Patent Application No. 2018-159609 filed on Aug. 28, 2018. The entire disclosures of all of the above applications are incorporated herein by reference.

TECHNICAL FIELD

The present disclosure relates to a vehicle communication system, a vehicle communication apparatus of the vehicle communication system, and a management apparatus of the vehicle communication system.

BACKGROUND

An in-vehicle terminal transmits a wireless resource allocation request including a travel schedule route of a vehicle, a schedule time at which the vehicle travels along the travel schedule route, and a communication band desired in advance to a management server, and thereby reserves a wireless resource in advance.

SUMMARY

According to one example embodiment, a vehicle communication system includes: a vehicle communication apparatus for a vehicle; a management apparatus that manages a wireless resource; and a request transmitter that transmits a resource allocation request to the management apparatus for requesting allocation of a location resource and the wireless resource by time. The vehicle communication apparatus includes: a vehicle transmitter, a vehicle receiver, and a vehicle communication controller that corresponds to a vehicle processer, and controls the vehicle transmitter and the vehicle receiver. The management apparatus includes: a management apparatus receiver that receives the resource allocation request, an allocator that corresponds to a management processer, and allocates the location resource and the wireless resource by time, and a management apparatus transmitter that transmits an allocation result of the allocator.

BRIEF DESCRIPTION OF DRAWINGS

The objects and other objects, features and advantages of the present disclosure will become more apparent from the following detailed description with reference to the attached drawings. In the drawings.

DETAILED DESCRIPTION

Figure 1:
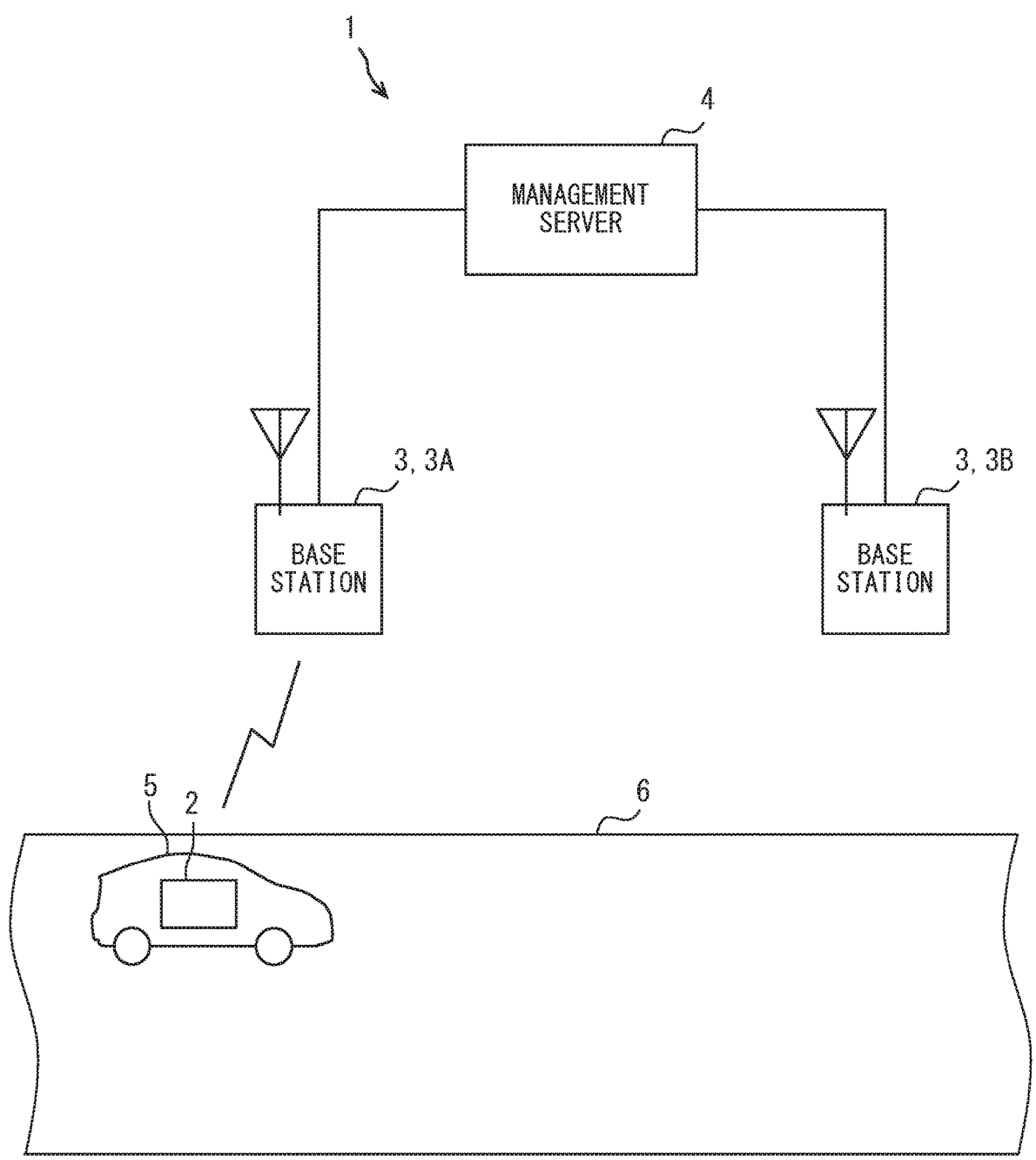
FIG. 1 is a view illustrating a schematic configuration of a vehicle communication system.

A technology in which an in-vehicle terminal transmits a wireless resource allocation request including a travel schedule route of a vehicle, a schedule time at which the vehicle travels along the travel schedule route, and a communication band desired in advance to a management server, and thereby reserves a wireless resource in advance.

In the technology, the management server determines whether to secure the wireless resource having the requested amount in a base station area and a time block which are decided by the wireless resource allocation request. When the management server determines to secure the wireless resource, the wireless resource having the requested amount is allocated to the in-vehicle terminal transmitting the wireless resource allocation request.

The wireless resource allocation is performed for each base station area. This is because a frequency band for communication is managed for each base station. Accordingly, in a case where the technology is applied, at the time of utilizing the allocated wireless resource, a communication apparatus for a vehicle is required to be positioned inside the base station area to which the wireless resource is allocated.

Even inside the same base station area, communication efficiency or available frequency range may vary depending on locations. Due to a difference of this communication efficiency or this available frequency area, the number of simultaneously communicable communication apparatuses may vary even when the same number of communication apparatuses exist in the same base station area. Accordingly, it may be required that the communication apparatus exists at the location assumed at the time of allocating the wireless resource when the wireless resource is allocated on assumption of the difference of the communication efficiency or the available frequency range in the area.

The communication apparatus may not exist at anywhere in the area when utilizing the allocated wireless resource. The communication apparatus may be required to exist at the location assumed at the time of allocating the wireless resource.

The communication apparatus may be not able to utilize the allocated wireless resource when the communication apparatus does not exist at the location assumed at the time of allocating the wireless resource.

The example embodiment provides a vehicle communication system, a vehicle communication apparatus, and a management apparatus avoiding a situation where a wireless resource is allocated and the allocated wireless resource is not utilizable.

According to one example, a vehicle communication system includes a vehicle communication apparatus for a vehicle, a management apparatus that manages a wireless resource, a request transmitter that transmits to the management apparatus, a resource allocation request requesting allocation of a location and the wireless resource by time.

The vehicle communication apparatus includes a vehicle transmitter that wirelessly transmits signals to an outside of the vehicle, a vehicle receiver that receives signals wirelessly transmitted from the outside of the vehicle, and a vehicle communication controller that corresponds to a vehicle processor and controls the vehicle transmitter and the vehicle receiver. The management apparatus includes a management apparatus receiver that receives the resource allocation request, an allocator that corresponds to a management processor, and, in accordance with the resource allocation request received by the management apparatus receiver, allocates the location and the wireless resource by time to the vehicle communication apparatus in accordance with the resource allocation request, and a management apparatus transmitter that transmits an allocation result of the allocator to the vehicle communication apparatus in accordance with the resource allocation request. The vehicle receiver receives the allocation result. The vehicle communication controller controls the vehicle receiver and the vehicle receiver based on the allocation result received by the vehicle receiver.

In this vehicle communication system, the management apparatus allocates not only the wireless resource for each of the times but also the location for each of the times to the vehicle communication apparatus. Accordingly, it may be possible to prevent a situation where, although the wireless resource is allocated, the vehicle is not able to be positioned at the location in which the wireless resource is utilizable at the allocated time of the wireless resource and the allocated wireless resource is not utilizable.

According to another example, a vehicle communication system includes a vehicle communication apparatus. That is, the vehicle communication apparatus for a vehicle and performs wireless communication. The vehicle communication apparatus includes a vehicle transmitter that transmits signals to an outside of the vehicle, a vehicle receiver that receives signals wirelessly transmitted from the outside of the vehicle, and a vehicle receiver that receives signals wirelessly transmitted from the outside of the vehicle, and a vehicle communication controller that controls the vehicle transmitter and the vehicle receiver. The vehicle receiver receives from the management apparatus, an allocation result indicating whether a requested location for each of times and a requested wireless resource for each of the times by a resource allocation request are allocated. The vehicle communication controller controls the vehicle transmitter and the vehicle receiver based on the allocation result received by the vehicle receiver.

Furthermore, according to another example, a vehicle communication system includes a management apparatus. That is, the management apparatus manages a wireless resource. The management apparatus includes a management apparatus receiver that receives the resource allocation request requesting allocation of the wireless resource at a location for each of times, an allocator that allocates the location and the wireless resource by time to the vehicle communication apparatus for a vehicle and performing wireless communication in accordance with the resource allocation request received by the management apparatus receiver, and a management apparatus transmitter that transmits an allocation result of the allocator to the vehicle communication apparatus.

First Embodiment (Overall Configuration)

The following will describe an embodiment based on the drawings. FIG. 1 is a view illustrating a schematic configuration of a vehicle communication system 1. The vehicle communication system 1 includes an in-vehicle system 2, base stations 3, and a management server 4. The management server 4 corresponds to an example of a management apparatus in the present disclosure.

The in-vehicle system 2 is the system mounted in a vehicle 5. The in-vehicle system 2 performs communication control and automated driving control on the vehicle 5.

Each of the base stations 3 is a device which relays signal transmission/reception between a vehicle communication apparatus 21 (see FIG. 2) as a part of the in-vehicle system 2 and the management server 4. The base station 3 has a wireless communication function of performing wireless communication with the vehicle communication apparatus 21 and a communication function of performing communication with the management server 4. The number of the base stations 3 is at least one.

FIG. 1 shows two base stations 3A and 3B. When the base stations 3A and 3B are not to be distinguished from each other, each of the base stations 3A and 3B is mentioned as the base station 3. For the convenience of illustration, FIG. 1 shows the two base stations 3A and 3B, but the number of the base stations 3 is typically three or more and is not limited.

A communication method utilized between the base station 3 and the vehicle communication apparatus 21 is not particularly limited. It is assumed that the communication method utilized between the base station 3 and the vehicle communication apparatus 21 is LTE. The LTE (Long Term Evolution) is a communication method which performs adaptive modulation. Note that, for communication between the base station 3 and the vehicle communication apparatus 21, a communication method which performs adaptive modulation utilizing a scheme other than that utilized by the LTE may also be utilized or, alternatively, a communication method which does not perform adaptive modulation may also be utilized.

The management server 4 and the base station 3 are communicatively connected to each other. Between the management server 4 and the base station 3, either wired communication or wireless communication may be performed. The management server 4 manages wireless resources to be utilized for communication between the base station 3 and the vehicle communication apparatus 21. Specifically, the wireless resources are frequency bands to be allocated to the individual base stations 3 to be utilized at individual chronological times. In other words, the wireless resources are time slots and frequency slots which are to be allocated to the individual base stations 3. Note that the frequency slots are subcarrier frequency bands. In the case of the LTE, the wireless resources are managed based on a resource block defined by the time slot and the frequency slot, which is utilized as a unit. Note that, in the case of utilizing a different communication method, the wireless resources may be different physical quantities such as, e.g., frequency widths, time slots, or the number of codes.

Note that, at the same time and at the same location, multiple the vehicles 5 cannot be situated. Consequently, even when a wireless resource which needs to be present at the same time and at the same location is allocated to the different vehicle communication apparatuses 21, communication cannot be performed as scheduled. Accordingly, the management server 4 also manages a location of the vehicle 5 at a time at which one of the wireless resources is allocated.

The vehicle 5 is not particularly limited as long as the vehicle 5 travels on a road 6. The vehicle 5 includes a four-wheel vehicle, a motor cycle, a bicycle, or the like.

(Configuration of in-Vehicle System 2)

Figure 2:
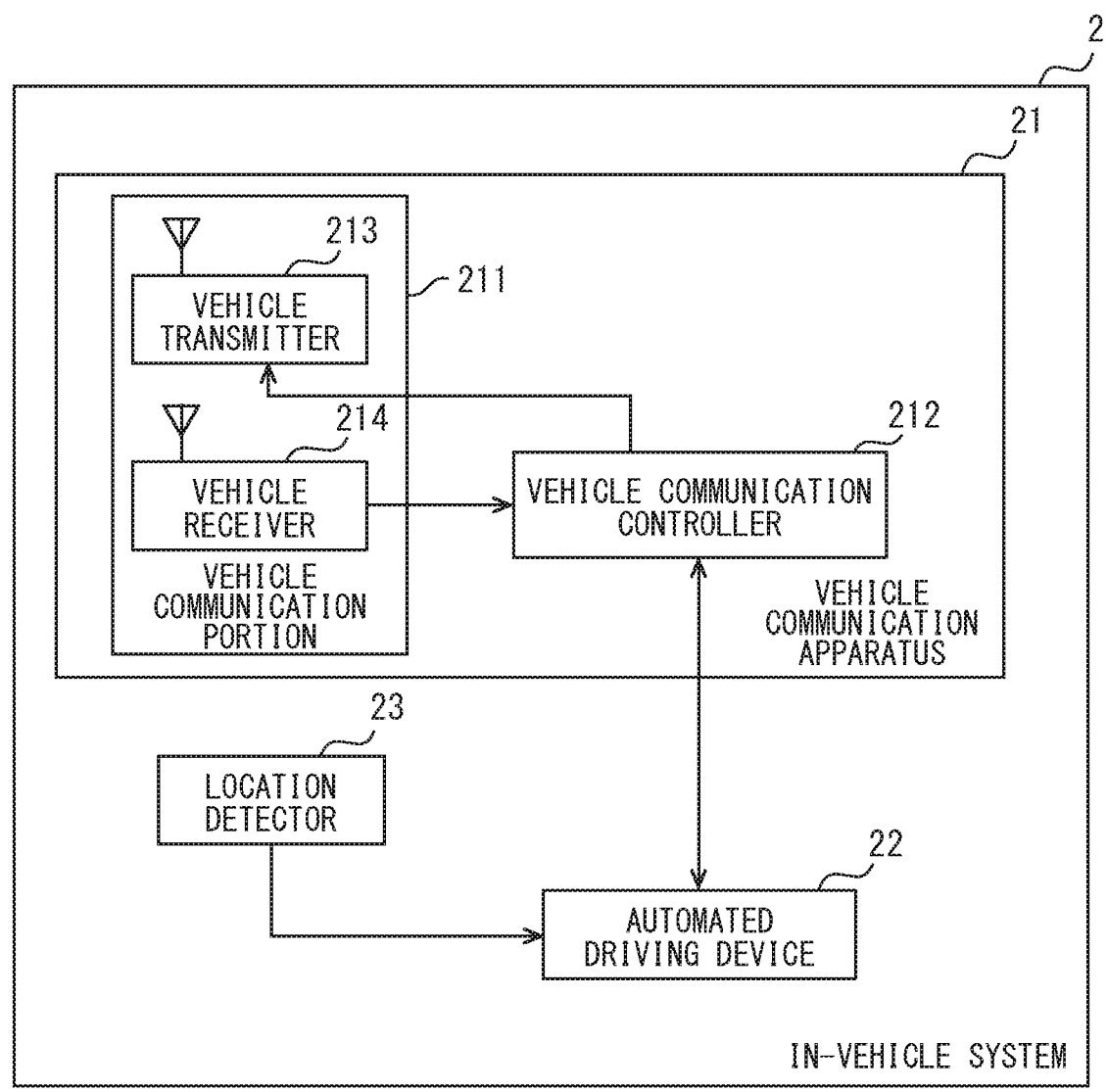
FIG. 2 is a view showing a configuration of an in-vehicle system.

FIG. 2 shows a configuration of the in-vehicle system 2. The in-vehicle system 2 includes the vehicle communication apparatus 21, an automated driving device 22, and a location detector 23.

The vehicle communication apparatus 21 is the device which performs wireless communication with the base station 3, and includes a vehicle communication portion 211 and a vehicle communication controller 212. The vehicle communication portion 211 includes a vehicle transmitter 213 and a vehicle receiver 214 and thereby performs wireless signal transmission/reception. A frequency band to be utilized by the vehicle communication portion 211 for communication is determined in advance. Examples of the frequency band to be utilized by the vehicle communication portion 211 for communication include a 2.1 GHz band, a 1.9 GHz band, a 1.8 GHz band, or the like. The vehicle communication portion 211 can utilize one or more frequency bands from among multiple frequency bands prepared in advance.

The vehicle transmitter 213 amplifies or modulates signals supplied from the vehicle communication controller 212 utilizing a radio wave at a frequency decided by a communication channel set in advance as a carrier wave, and transmits the amplified or modulated signal as a radio wave to the outside of the vehicle 5.

The vehicle receiver 214 receives the radio wave at the frequency determined by the communication channel set in advance, performs amplification, demodulation, decoding, or the like on the received radio wave, retrieves signals from the received radio wave, and outputs the retrieved signal to the vehicle communication controller 212.

The vehicle communication controller 212 is a computer including a CPU, a RAM, a ROM, an I/O, a bus line connecting such components, or the like. In the ROM, a communication control program for causing a general-purpose computer to function as the vehicle communication controller 212 is stored. Note that the communication control program may be stored appropriately in a non-transitory tangible storage medium, and a specific storage medium is not limited to the ROM. For example, the communication control program may also be stored in a flash memory.

Execution of the communication control program by the CPU corresponds to implementation of a method corresponding to the communication control program. It may be possible to implement any or all of functions of the vehicle communication controller 212 utilizing one or multiple ICs or the like (i.e., utilizing hardware). Alternatively, it may also be possible to implement any or all of functional blocks of the vehicle communication controller 212 utilizing a combination of execution of software by the CPU and a hardware member.

The execution of the communication control program by the CPU causes the vehicle communication controller 212 to control the vehicle transmitter 213 and the vehicle receiver 214 and perform signal transmission/reception. The detailed control performed by the vehicle communication controller 212 will be described later based on FIG. 4 or the like.

The automated driving device 22 is a device which causes the vehicle 5 to perform automated driving. The automated driving in the first embodiment is automated driving of a level which eliminates the need for a driver to perform a driving operation at least under normal circumstances. To cause the vehicle 5 to perform the automated driving, the automated driving device 22 performs acceleration/deceleration control and steering control on the vehicle 5. In addition, the automated driving device 22 sequentially schedules a future travel route and controls the behavior of the vehicle 5, while updating the schedule (hereinafter referred to as the travel schedule). The travel schedule includes a scheduled travel route and scheduled times at which the vehicle is to pass individual locations on the scheduled travel route. To perform the automated driving, the automated driving device 22 can also sequentially acquire a current location from the location detector 23 and mutually perform signal transmission/reception to/from the vehicle communication apparatus 21.

The automated driving device 22 is an example of a travel control device. The automated driving device 22 also performs communication via the vehicle communication apparatus 21 and performs control related to running of the vehicle 5 based on the communication. For example, the automated driving device 22 receives a location of another vehicle 5 by communication and performs either one or both of the acceleration/deceleration control and the steering control to adjust relative positions of the other vehicle 5 and the host vehicle. The control related to the running of the vehicle 5 is also allowed to include control which causes peripheral images resulting from image capturing of a periphery of the vehicle 5 to be sequentially transmitted to the management server 4 to effect remote monitoring of the running of the vehicle 5.

The location detector 23 sequentially detects the current location of the vehicle 5. The current location is supplied to the automated driving device 22. The automated driving device 22 utilizes the current location for the acceleration/deceleration control and traveling direction control on the vehicle 5.

(Configuration of Management Server 4)

Figure 3:
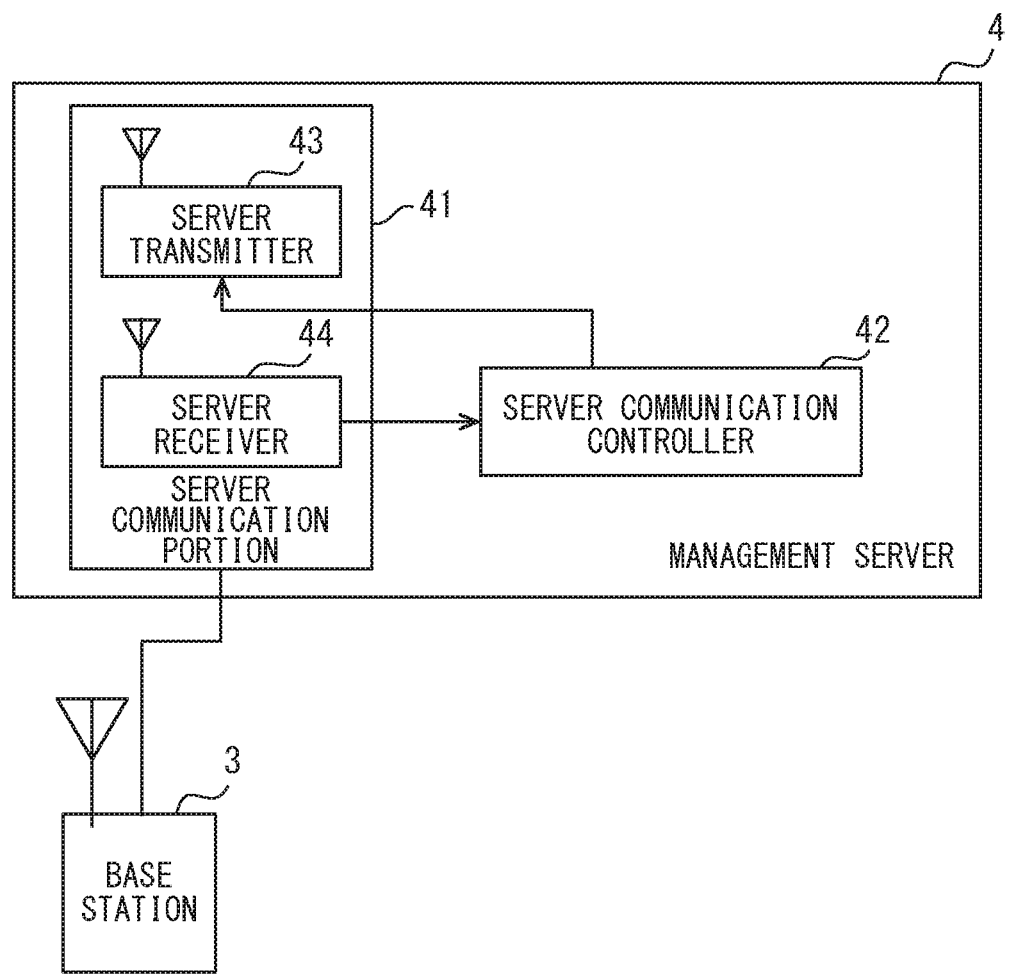
FIG. 3 is a view showing a configuration of a management server.

FIG. 3 shows a configuration of the management server 4. The management server 4 includes a server communication portion 41 and a server communication controller 42. The server communication portion 41 includes a server transmitter 43 and a server receiver 44. The server communication portion 41 is communicatively connected to the base station 3. The server transmitter 43 corresponds to an example of a management apparatus transmitter. The server transmitter 43 transmits signals to the vehicle communication apparatus 21 via the base station 3. The server receiver 44 corresponds to an example of a management apparatus receiver. The server receiver 44 receives signals transmitted from the vehicle communication apparatus 21 via the base station 3.

The server communication controller 42 is a computer including a CPU, a RAM, a ROM, an I/O, a bus line connecting such components, or the like. In the ROM, a program for causing a general-purpose computer to function as the server communication controller 42 is stored. The program may also be stored in a non-transitory tangible storage medium other than the ROM. Execution of the program by the CPU corresponds to implementation of a method corresponding to the program. It may be possible to implement any or all of functions of the server communication controller 42 utilizing one or multiple ICs or the like. Alternatively, it may also be possible to implement any or all of functional blocks of the server communication controller 42 utilizing a combination of execution of software by the CPU and a hardware member.

The server communication controller 42 controls the server transmitter 43 and the server receiver 44 to perform signal transmission/reception. Communication between the management server 4 and the vehicle communication apparatus 21 is performed via the base station 3. In other words, when the communication between the management server 4 and the vehicle communication apparatus 21 is performed, the communication between the vehicle communication apparatus 21 and the base station 3 is performed.

The server communication controller 42 corresponds to an allocator. To allow the vehicle communication apparatus 21 and the base station 3 to perform communication therebetween, the server communication controller 42 allocates the wireless resource to the communication and also allocates a location resource to the vehicle communication apparatus 21. The detailed control performed by the server communication controller 42 will be described later based on FIG. 5 or the like.

(Process Executed by Vehicle Communication Controller 212)

Figure 4:
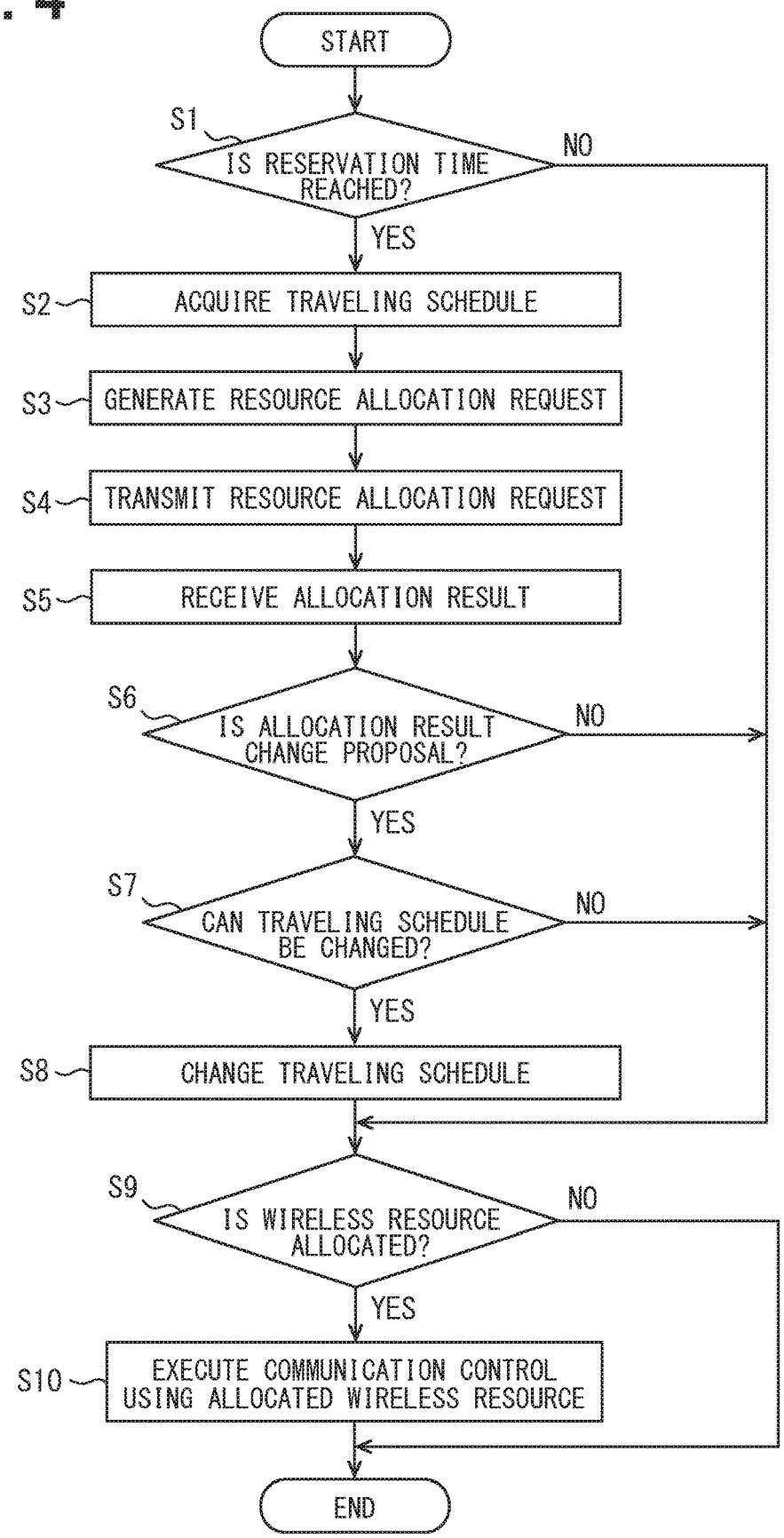
FIG. 4 is a flow chart showing a process executed by a vehicle communication controller.

The vehicle communication controller 212 executes a process shown in FIG. 4 in a cycle in which signal transmission/reception is performed. In S1, the vehicle communication controller 212 determines whether a reservation time is reached. The reservation time is a time at which a resource allocation request is to be transmitted to the management server 4.

When receiving the resource allocation request, the management server 4 allocates a future wireless resource and a future location resource to the vehicle communication apparatus 21 that has transmitted the resource allocation request. As described above, the wireless resources are the time slots and the frequency slots which are to be allocated to the individual base stations 3. The reservation time is, e.g., a given time before the time to which the wireless resource is allocated ends, a given distance before running of the vehicle 5 in the allocated location resource ends, or the like. The vehicle communication controller 212 may also determine that the reservation time is reached when the travel schedule is changed. When a result of the determination in S1 is NO, the vehicle communication controller 212 advances the process to S9. On the other hand, when the result of the determination in S1 is YES, the vehicle communication controller 212 advances the process to S2.

In Step S2, the vehicle communication controller 212 acquires the travel schedule from the automated driving device 22. In S3, the vehicle communication controller 212 generates a resource allocation request. The resource allocation request is information requesting allocation of a time-specific location and a time-specific wireless resource for allowing the vehicle communication apparatus to perform communication with the base station 3. Specifically, the resource allocation request includes an ID (hereinafter referred to as the device ID) of the vehicle communication apparatus 21, a time block or a section requesting the wireless resource allocation, the travel schedule, and a communication speed required (hereinafter referred to as the required communication speed).

The device ID is stored in a predetermined storage portion such as the ROM included in the vehicle communication controller 212. A starting time of the time block requesting the allocation is assumed to be a last time of the time block to which the wireless resource has been already allocated. A length of the time block requesting the allocation is, e.g., a given time from the starting time in a range not later than a latest time at which the vehicle location can be estimated based on the travel schedule. A starting position of the section requesting the allocation is assumed to be a position in the section to which the wireless resource has been already allocated to be finally passed through by the vehicle 5. A length of the section requesting the allocation is, e.g., a given distance from the starting position in the section in which the vehicle location can be estimated based on the travel schedule.

The required communication speed is the communication speed which is required for communication in which the vehicle communication apparatus 21 is scheduled to perform transmission/reception in a time block requesting the allocation for the automated driving. The communication speed can be set simply to have a given value. Alternatively, the requested communication speed may also vary depending on a time such that the requested communication speed periodically varies. Still alternatively, the requested (i.e., required) communication speed may also vary depending on a location.

In S4, the resource allocation request generated in S3 is transmitted from the vehicle transmitter 213 to the management server 4. Since the vehicle transmitter 213 transmits the resource allocation request, in the first embodiment, the vehicle transmitter 213 corresponds to an example of a request transmitter. The resource allocation request is received by the base station 3 having a communication area including a location where the vehicle 5 is present at this time, and received by the management server 4 via the base station 3.

When receiving the resource allocation request, the management server 4 determines whether the wireless resource and the location resource which are requested by the resource allocation request can be allocated. Then, the management server 4 returns an allocation result as a result of the determination to the vehicle communication apparatus 21 that has transmitted the resource allocation request.

In S5, the vehicle communication controller 212 receives the allocation result. When the wireless resource and the location resource cannot be allocated exactly as requested by the resource allocation request, the management server 4 may propose a change in the travel schedule as the allocation result. In S6, the vehicle communication controller 212 determines whether the received allocation result is a change proposal. When a result of the determination in S6 is NO, the vehicle communication controller 212 advances the process to S9. When the result of the determination in S6 is YES, the vehicle communication controller 212 advances the process to S7.

In S7, the vehicle communication controller 212 determines whether the travel schedule can be changed in response to the change proposal. The change proposal may propose a route change or propose a change in each of times at which the vehicle 5 passes through the individual locations, not a route change. When the travel schedule can be changed, i.e., when a result of the determination in S7 is YES, the vehicle communication controller 212 advances the process to S8. In S8, the vehicle communication controller 212 changes the travel schedule exactly as proposed in the allocation result. After executing S8, the vehicle communication controller 212 advances the process to S9. When the result of the determination in S7 is NO, the vehicle communication controller 212 advances the process to S9 without executing S8.

In S9, the vehicle communication controller 212 determines whether there is a wireless resource allocated to a current location and a current time. When a result of the determination is NO, the vehicle communication controller 212 ends the process in FIG. 4 without executing S10. On the other hand, when the result of the determination in S9 is YES, the vehicle communication controller 212 advances the process to S10. In S10, the vehicle communication controller 212 controls one or both of the vehicle transmitter 213 and the vehicle receiver 214 to perform communication utilizing the allocated wireless resource.

When the vehicle communication controller 212 ends the process in FIG. 4 without executing S10, it follows that the vehicle communication apparatus 21 does not perform wireless communication. When the vehicle communication apparatus 21 does not perform the wireless communication, the automated driving device 22 cannot perform control related to the travel of the vehicle 5 based on the communication performed via the vehicle communication apparatus 21. Accordingly, in order to allow the automated driving device 22 to perform the control related to the running of the vehicle 5 based on the communication performed via the vehicle communication apparatus 21, it is a condition that the allocation result shows that the location resource and the wireless resources each requested by the resource allocation request have been allocated.

(Process Executed by Server Communication Controller 42)

Figure 5:
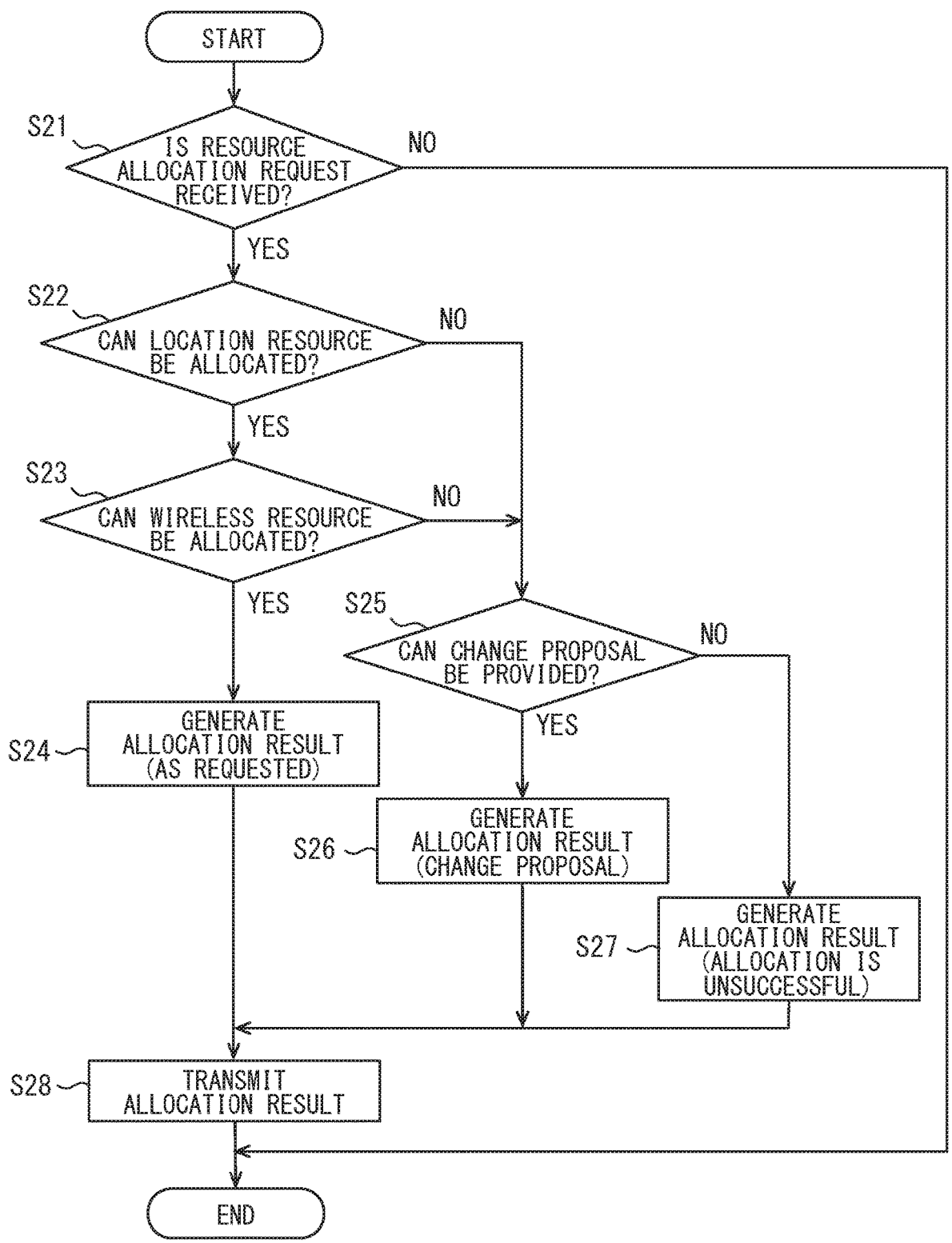
FIG. 5 is a flow chart showing a process executed by a server communication controller.

Next, a process executed by the server communication controller 42 will be described. The server communication controller 42 periodically executes a process shown in FIG. 5. In S21, the server communication controller 42 determines whether a resource allocation request is received. When a result of the determination in S21 is NO, the process shown in FIG. 5 is ended. On the other hand, when the result of the determination in S21 is YES, the server communication controller 42 advances the process to S22.

In S22, the server communication controller 42 determines whether the location resource can be allocated exactly as requested by the received resource allocation request. Since the resource allocation request includes the travel schedule, the server communication controller 42 can estimate, based on the travel schedule, a location where the vehicle communication apparatus 21 that has transmitted the resource allocation request is scheduled to be present at each of the times. When the estimated location does not overlap a location of another vehicle communication apparatus 21 managed by the management server 4 at each of the times, the server communication controller 42 determines that the location resource can be allocated exactly as requested by the resource allocation request.

Figure 6:
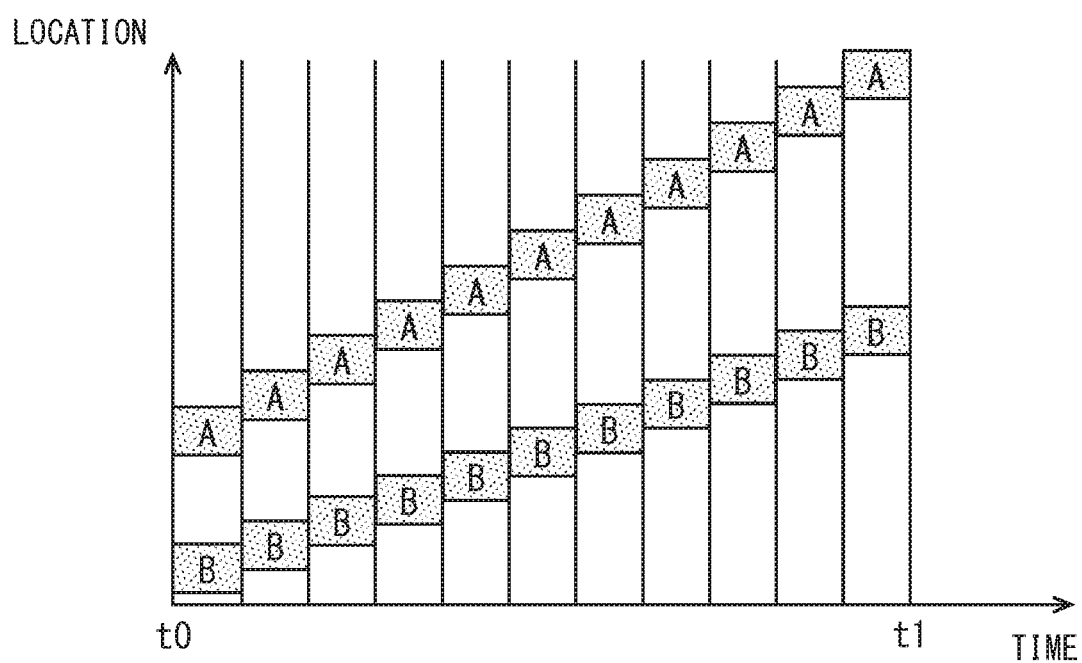
FIG. 6 is a view illustrating a state in which location resources are allocated.

FIG. 6 is a view conceptually illustrating the determination in S22, which shows a time-specific location resource allocation situation. In FIG. 6, "A" and "B" denote respective vehicles 5A and 5B shown in FIG. 9. It is assumed that the vehicle communication apparatus 21 mounted in the vehicle 5B has transmitted the resource allocation request this time and, to the vehicle communication apparatus 21 mounted in the vehicle 5A, the location resource during a period between a time t0 and a time t1 has already been allocated.

As shown in FIG. 6, the location resource for which the vehicle 5B has transmitted the resource allocation request this time does not overlap that allocated to the vehicle 5A. Accordingly, the server communication controller 42 determines that the location resource can be allocated to the vehicle 5B. By contrast, when the location resource requested by the vehicle 5B has even a portion overlapping the already allocated location resource, the server communication controller 42 determines that the location resource cannot be allocated to the vehicle 5B. When a result of the determination in S22 is NO, the server communication controller 42 advances the process to S25. When the result of the determination in S22 is YES, the server communication controller 42 advances the process to S23.

Figure 7:
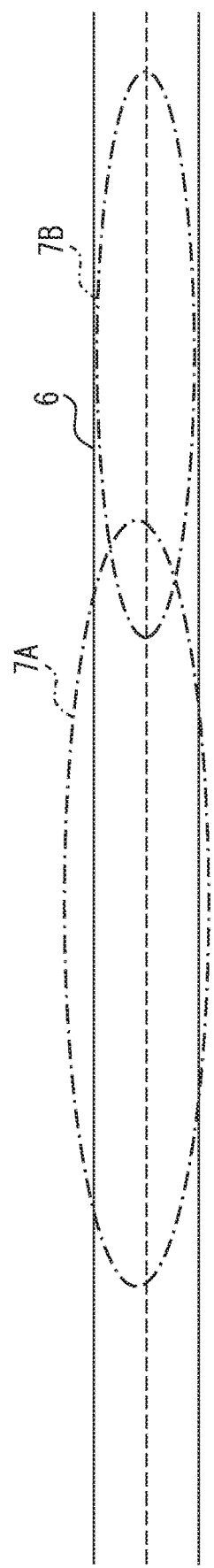
FIG. 7 is a view showing a range along a road in a base station area.

In S23, the server communication controller 42 determines whether the wireless resource can be allocated. A determination process in S23 will be described specifically based on FIGS. 7 to 12. FIG. 7 shows a base station area 7A serving as a communication range of the base station 3A over the road 6 and a base station area 7B serving as a communication range of the base station 3B over the road 6. The base station areas 7A and 7B have respective portions overlapping each other. A base station area without specifying the base station 3 is hereinafter referred to as the base station area 7.

In the management server 4, the respective base station areas 7 of the individual base stations 3 are stored in the ROM of the server communication controller 42 or in another storage portion. The server communication controller 42 determines, based on the stored base station areas 7 and on the travel schedule included in the resource allocation request, when and which one of the base station areas 7 is passed through by the vehicle 5.

The server communication controller 42 also manages a communication schedule for each of the base stations 3. The communication schedule is a combination of the time slots and the frequency slots.

Also, in the management server 4, a relationship between a location and a communication efficiency (Mbs/Hz) is stored in the ROM or in another storage portion. In the first embodiment, the communication method between the base station 3 and the vehicle communication apparatus 21 is the LTE. Since the LTE performs adaptive modulation, the communication efficiency is not constant. The communication efficiency varies depending on a radio wave environment, and the radio wave environment varies depending on the location. Accordingly, the communication efficiency varies depending on the location.

Figure 8:
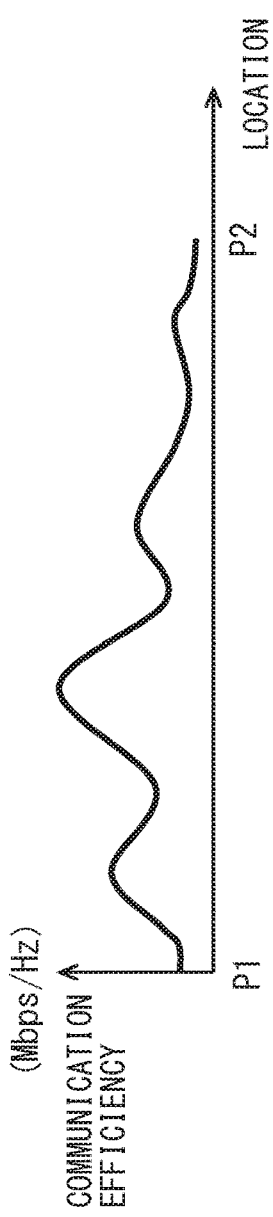
FIG. 8 is a view showing a relationship between a location and a communication efficiency.

FIG. 8 is a view illustrating the relationship between the location and the communication efficiency. The location as an abscissa parameter is the location in a direction along the road. FIG. 8 is a view showing the relationship between the location and the communication efficiency stored in the storage portion in terms of the location in the direction along the road.

Even when the communication speed requested by the resource allocation request is constant, to ensure the same communication speed at a spot where the communication efficiency is low, a larger number of resource blocks are required than those required at a spot where the communication efficiency is high. Since a total number of the resource blocks (i.e., a total resource quantity) which can be utilized by each of the base stations 3 is determined in advance, as a larger number of resource blocks are allocated, an occupancy ratio increases. Note that the occupancy ratio is a ratio of the number of the resource blocks allocated to the vehicle communication apparatus 21 that has transmitted the resource allocation request to the total number of the resource blocks usable by the base station 3.

At each of the times for which the wireless resource allocation is requested this time by the resource allocation request, the total resource quantity which is a sum of the number of the already allocated resource blocks (hereinafter referred to as the resource quantity) and a resource quantity required to allow communication at a communication speed requested this time by the resource allocation request is calculated.

When the total resource quantity is equal to or less than a maximum allowable resource quantity having a value obtained by multiplying the total resource quantity allocated to the base station 3 by a factor N at each of the times, the server communication controller 42 determines that the wireless resource requested this time by the resource allocation request can be allocated. On the other hand, when the total resource quantity exceeds the maximum allowable resource quantity at at least any of the times, the server communication controller 42 determines that the wireless resource requested this time by the resource allocation request cannot be allocated. The maximum allowable resource quantity can also be, e.g., calculated by the server communication controller 42 or stored in advance in the ROM or in a non-transitory tangible storage medium other than the ROM.

The factor N is a numerical value which can be arbitrarily set as long as the factor N is equal to or more than 1. For example, the factor N is 1. In a case where a numerical value larger than 1 is set as the factor N, when all the vehicle communication apparatuses 21 to which the wireless resources are allocated utilize all the wireless resources allocated thereto, congestion occurs. However, it is often the case that, even though the wireless resources are allocated, not all the wireless resources are utilized. Particularly when a purpose of securing the wireless resources is to secure a communication capacity in case of emergency, even though the wireless resources are allocated, the probability of not utilizing the wireless resources is high. Note that communication in case of emergency is communication when, e.g., the automated driving by the automated driving device 22 becomes difficult for any reason and when remote monitoring data such as a peripheral image is transmitted to the outside of the vehicle 5 to allow remote driving to be performed.

Thus, in consideration of the situation in which, even though the wireless resources are allocated, the vehicle communication apparatus 21 does not utilize all the wireless resources allocated thereto, the factor N is permitted to be set to a value larger than 1 to allow the wireless resources to be effectively utilized.

Figure 9:
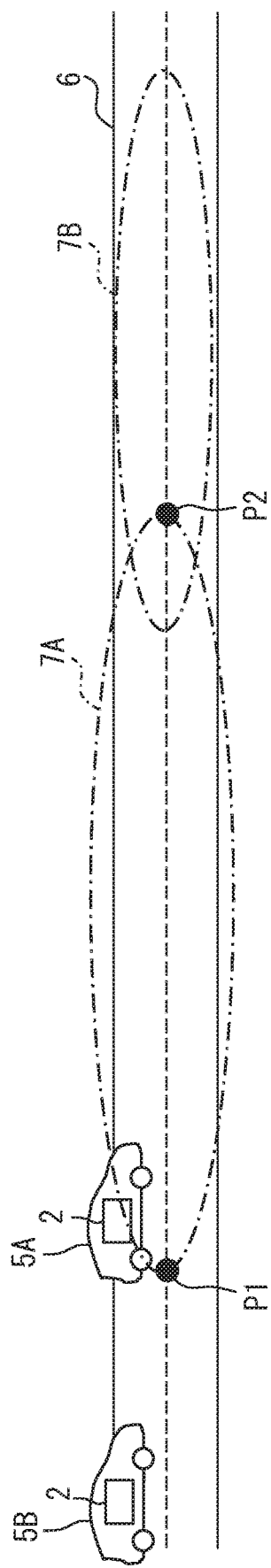
FIG. 9 is a view illustrating an example in which a wireless resource can be allocated.

Next, based on FIGS. 9 and 10, an example in which the wireless resources can be allocated will be described. In FIG. 9, the vehicle 5A is located in the vicinity of an end of the base station area 7A, while the vehicle 5B runs behind the vehicle 5A on the same road 6 on which the vehicle 5A runs. It is assumed that a communication efficiency in the base station area 7A in a direction along the road 6 varies as shown in FIG. 8. A location P1 is one end of the base station area 7A in the direction along the road 6, while a location P2 is the other end of the base station area 7A in the direction along the road 6.

It is assumed that the vehicle communication apparatus 21 mounted in the vehicle 5A requests, in a resource allocation request to be transmitted to the management server 4, a given speed as a required communication speed while the vehicle 5A moves from the location P1 to the location P2.

Even when the given speed is requested, as shown in FIG. 8, the communication efficiency varies depending on the location. As the communication efficiency is higher, the resource quantity required to be allocated is smaller. Conversely, as the communication efficiency is lower, the resource quantity required to be allocated is larger. Accordingly, the resource quantity allocated to the vehicle communication apparatus 21 mounted in the vehicle 5A exhibits a shape shown by a broken line in FIG. 10. The shape shown by the broken line in FIG. 10 is a waveform shape having an increasing/decreasing tendency opposite to that of the waveform shape shown in FIG. 8. Note that the vehicle 5A is located at the location P1 at a time t10, while being located at the location P2 at a time t15.

A consideration is given of a case where, after the wireless resource when the vehicle 5A travels through the base station area 7A is allocated, the vehicle communication apparatus 21 mounted in the vehicle 5B transmits a resource allocation request for reserving the wireless resource when the vehicle 5B travels through the base station area 7A.

For easier understanding of the description, it is assumed that the resource allocation request transmitted from the vehicle communication apparatus 21 mounted in the vehicle 5B is the same as the resource allocation request transmitted from the vehicle communication apparatus 21 mounted in the vehicle 5A except that a time at which the vehicle 5B passes through the base station area 7A is different from a time at which the vehicle 5A passed therethrough. It is assumed that the vehicle 5B is scheduled to pass through the location P1 at a time t12 and pass through the location P2 at a time t17.

In this case, the resource quantity required by the vehicle communication apparatus 21 mounted in the vehicle 5B at each of the locations is the same as the resource quantity required by the vehicle communication apparatus 21 mounted in the vehicle 5A at each of the locations. However, the vehicle 5B passes through the locations through which the vehicle 5A passed at times later than the times at which the vehicle 5A passed through the locations. Consequently, a solid line shown in FIG. 10 which represents a relationship between the time and the resource quantity required by the vehicle communication apparatus 21 mounted in the vehicle 5B while the vehicle 5B passes through the base station area 7A is obtained by shifting the broken line shown in FIG. 10 in parallel.

A value obtained by adding up the resource quantity shown by the broken line and the resource quantity shown by the solid line at each of the times corresponds to the total resource quantity described above. FIG. 10 also shows the maximum allowable resource quantity. In FIG. 10, the total resource quantity becomes maximum at a time t13. The total resource quantity at the time t13 is shown by a double-headed arrow. The total resource quantity at the time t13 is smaller than the maximum allowable resource quantity. Accordingly, in the example of FIG. 10, the total resource quantity is equal to or less than the maximum allowable resource quantity at each of the times. It follows therefore that the wireless resource requested by the resource allocation request is allocatable.

Next, based on FIGS. 11 and 12, an example in which the wireless resource requested by the resource allocation request cannot be allocated will be described. In FIG. 11, the location of the vehicle 5A is the same as that in FIG. 9. In addition, the resource allocation request transmitted by the vehicle communication apparatus 21 mounted in the vehicle 5A is also the same as that described based on FIGS. 9 and 10.

On the other hand, the vehicle 5B is the same as in FIG. 9 in that the vehicle 5B runs behind the vehicle 5A, but the vehicle 5B is located at a location closer to the vehicle 5A than the location shown in FIG. 9. The resource allocation request transmitted from the vehicle communication apparatus 21 mounted in the vehicle 5B is the same as in the example described based on FIGS. 9 and 10 except for details resulting from the location of the vehicle 5B different from that of the vehicle 5B in FIG. 9.

Figure 10:
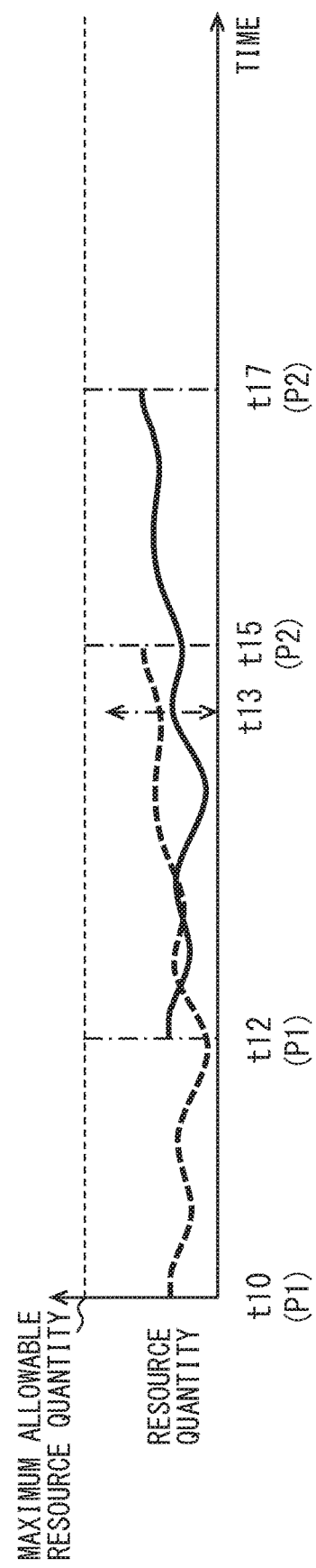
FIG. 10 is a view showing a resource quantity varying with time, which corresponds to FIG. 9.
Figure 11:
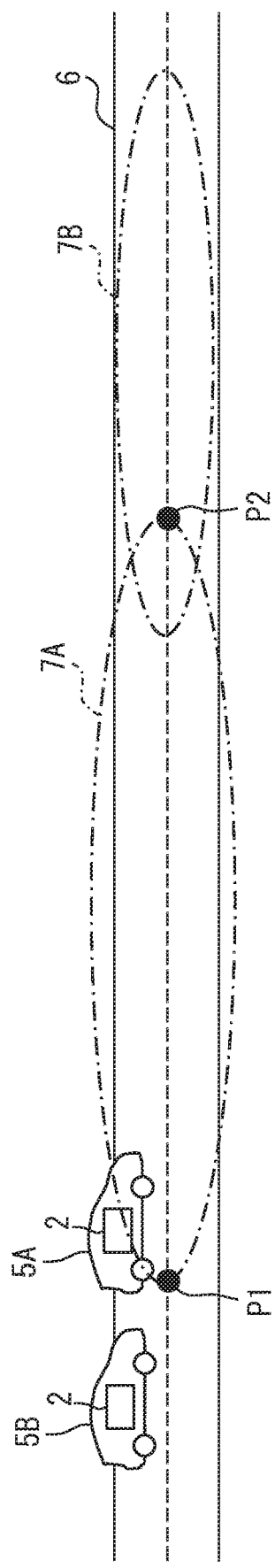
FIG. 11 is a view illustrating an example in which the wireless resource cannot be allocated.
Figure 12:
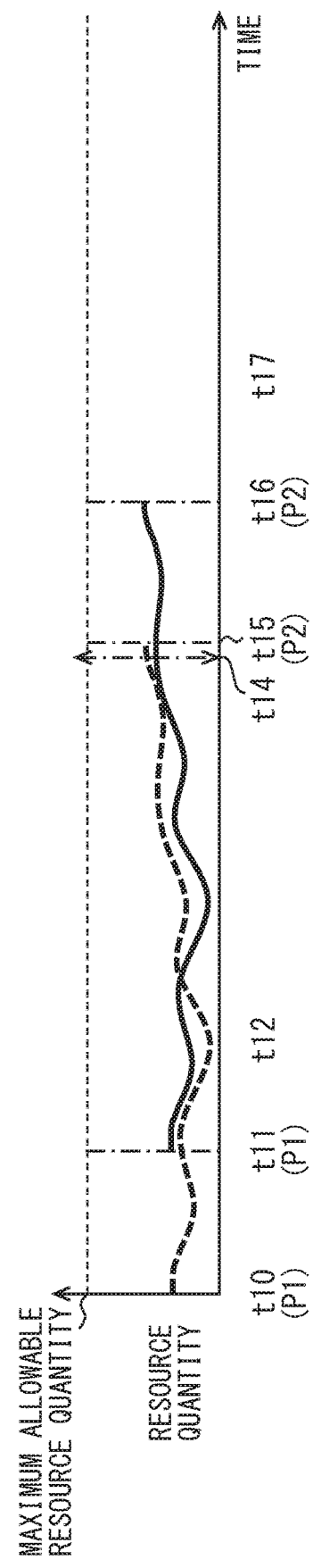
FIG. 12 is a view showing the resource quantity varying with time, which corresponds to FIG. 11.

Accordingly, in FIG. 12, a solid line showing a time-specific resource quantity to be allocated to the vehicle communication apparatus 21 mounted in the vehicle 5B has the same shape as that of the solid line shown in FIG. 10, but is entirely located at times earlier than those in FIG. 10. Specifically, in FIG. 12, the solid line begins at a time t11 earlier than the time t12 and ends at a time t16 earlier than the time t17.

In FIG. 12, the total resource quantity becomes maximum at a time t14. The total resource quantity at the time t14 is shown by a double-headed arrow. The total resource quantity at the time t14 is larger than the maximum allowable resource quantity. In other words, in the example of FIG. 12, there is a time at which the total resource quantity exceeds the maximum allowable resource quantity. At the time at which the total resource quantity exceeds the maximum allowable resource quantity, such as the time t14, the wireless resource requested by the resource allocation request cannot be allocated.

Returning back to FIG. 5, when the result of the determination in S23 is YES, the server communication controller 42 advances the process to S24. In S24, the server communication controller 42 generates an allocation result showing that the wireless resource and the location resource are successfully allocated exactly as requested in S24 and showing the allocated wireless resource and the allocated location resource.

When the result of the determination in S23 is NO, the server communication controller 42 advances the process to S25. S25 is executed when the server communication controller 42 determines that either of the location resource and the wireless resource cannot be allocated. In S25, the server communication controller 42 determines whether it can be proposed to change what is requested by the resource allocation request. Specifically, the determination is made to determine whether it is possible to allocate the location resource and the wireless resource by changing the travel schedule. The changing of the travel schedule involves one or both of changing of a route scheduled to be driven and changing of times at which individual locations on the route scheduled to be driven are scheduled to be passed through by the vehicle 5. When a result of the determination in S25 is YES, the server communication controller 42 advances the process to S26.

In S26, the server communication controller 42 generates an allocation result showing a proposal to change the travel schedule. When a result of the determination in S25 is NO, the server communication controller 42 advances the process to S27. In S27, the server communication controller 42 generates an allocation result showing that the location resource and the wireless resource are not successfully allocated.

In S28, the server communication controller 42 transmits the allocation result generated in any of S24, S26, and S27 to the vehicle communication apparatus 21 that has transmitted the resource allocation request via the base station 3.

In the first embodiment, the management server 4 allocates, to the vehicle communication apparatus 21, not only the time-specific wireless resource, but also the time-specific location resource. Since the location resource is also allocated, it is possible to prevent a situation in which, even though the wireless resource is allocated thereto, the vehicle communication apparatus 21 cannot be present at a location where the wireless resource can be utilized at the time to which the wireless resource is allocated, and therefore cannot utilize the allocated wireless resource.

Also, in the first embodiment, the resource quantity required to allow for communication at the communication speed requested by the resource allocation request is calculated, at each of the times, from the communication efficiency which varies depending on the location and from the location of the vehicle communication apparatus 21 at each of the times. At each of the times, the total resource quantity corresponding to the sum of the resource quantity and the resource quantity already allocated at each of the times is compared to the maximum allowable resource quantity, and whether the wireless resource can be allocated is determined. As a result, even though the communication efficiency differs from one location to another, it is possible to appropriately allocate the wireless resource to the vehicle communication apparatus 21.

The maximum allowable resource quantity has a value obtained by multiplying the total resource quantity allocated to the base station 3 by the factor N, and a numerical value larger than 1 can be set to the factor N. By setting a numerical value larger than 1 to the factor N, it is possible to effectively utilize the wireless resource.

Second Embodiment

Next, a second embodiment will be described. In a description of each of embodiments including and subsequent to the second embodiment, a component having the same reference numeral as that utilized previously is the same as the component having the same reference numeral in the previous embodiment unless particularly mentioned otherwise. When only a part of a configuration is described, the previously described embodiment is applicable to the other portion of the configuration.

(Outline of System)

Figure 13:
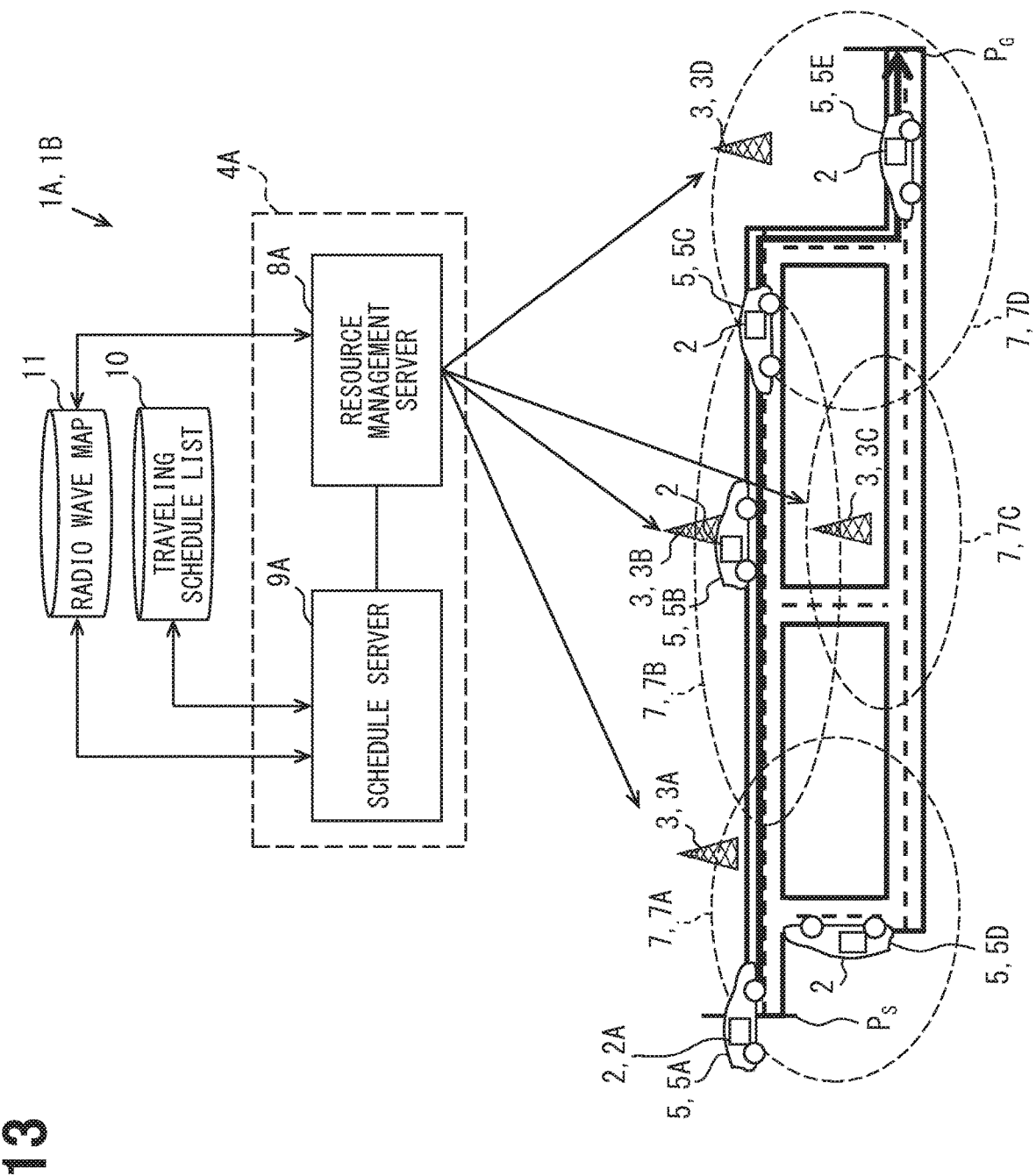
FIG. 13 is a view showing a configuration of the vehicle communication system in a second embodiment.

FIG. 13 shows a configuration of a vehicle communication system 1A as the second embodiment. The vehicle communication system 1A includes the in-vehicle system 2, the base station 3, a management server 4A, a travel schedule list 10, radio wave maps 11.

The in-vehicle system 2 has the same hardware configuration as that in the first embodiment. Also, the vehicle communication apparatus 21 included in the in-vehicle system 2 executes substantially the same process as that executed in the first embodiment. However, in the second embodiment, the vehicle communication apparatus 21 transmits a resource allocation request to a schedule server 9A. The resource allocation request in the second embodiment includes a device ID, a starting point $P_S$, an ending point $P_G$, and a required communication speed, which is signals requesting allocation of a travel schedule for a drive from the starting point $P_S$ to the ending point $P_G$ and allocation of the wireless resource between the starting point $P_S$ and the ending point $P_G$. The allocation of the travel schedule for the drive from the starting point $P_S$ to the ending point $P_G$ corresponds to allocation of a location resource. The starting point $P_S$ is typically a current location, but may also be a location scheduled to be passed through by the vehicle 5 in future. The ending point $P_G$ is an ending point of a section for which communication with the base station 3 is requested in the resource allocation request transmitted this time.

The management server 4A includes a resource management server 8A and the schedule server 9A. The resource management server 8A is the server which manages the wireless resources for the multiple base stations 3. The resource management server 8A has the same hardware configuration as that of the management server 4 of the first embodiment. As shown in FIG. 3, the resource management server 8A has the server communication portion 41 and the server communication controller 42.

The schedule server 9A can communicate with each of the vehicle communication apparatuses 21 and the resource management server 8A via a communication network including the base stations 3. The schedule server 9A can refer to the travel schedule list 10 and the radio wave maps 11. The travel schedule list 10 and the radio wave maps 11 are stored in a writable storage device.

When acquiring the resource allocation request from the vehicle communication apparatus 21, the schedule server 9A decides the travel schedule based on the resource allocation request and requests, of the resource management server 8A, allocation of the wireless resource when the vehicle 5 moves based on the travel schedule. The resource management server 8A, which performs the allocation of the wireless resource, corresponds to an example of a wireless resource allocator. The travel schedule corresponds to allocation of a location resource, while the schedule server 9A corresponds to an example of a location resource allocator. A process executed by the schedule server 9A will be described later in detail utilizing a flow chart shown in FIG. 14.

The schedule server 9A is the server which manages the travel schedules for the multiple vehicles 5, while the travel schedule list 10 is a list including the travel schedules for the multiple vehicles 5. Each of the travel schedules includes a route scheduled to be driven by the corresponding vehicle 5 and times at which the vehicle 5 is scheduled to pass through individual locations on the route. Each of the radio wave maps 11 is the map showing a signal intensity of a radio wave delivered from the base station 3 at each of the locations. There are the respective maps for the individual base stations 3. The radio wave maps 11 are produced in advance based on measurement performed by causing a measurement vehicle to run. The signal intensity is related to the communication efficiency, and the radio wave maps 11 are wireless resource maps.

Figure 14:
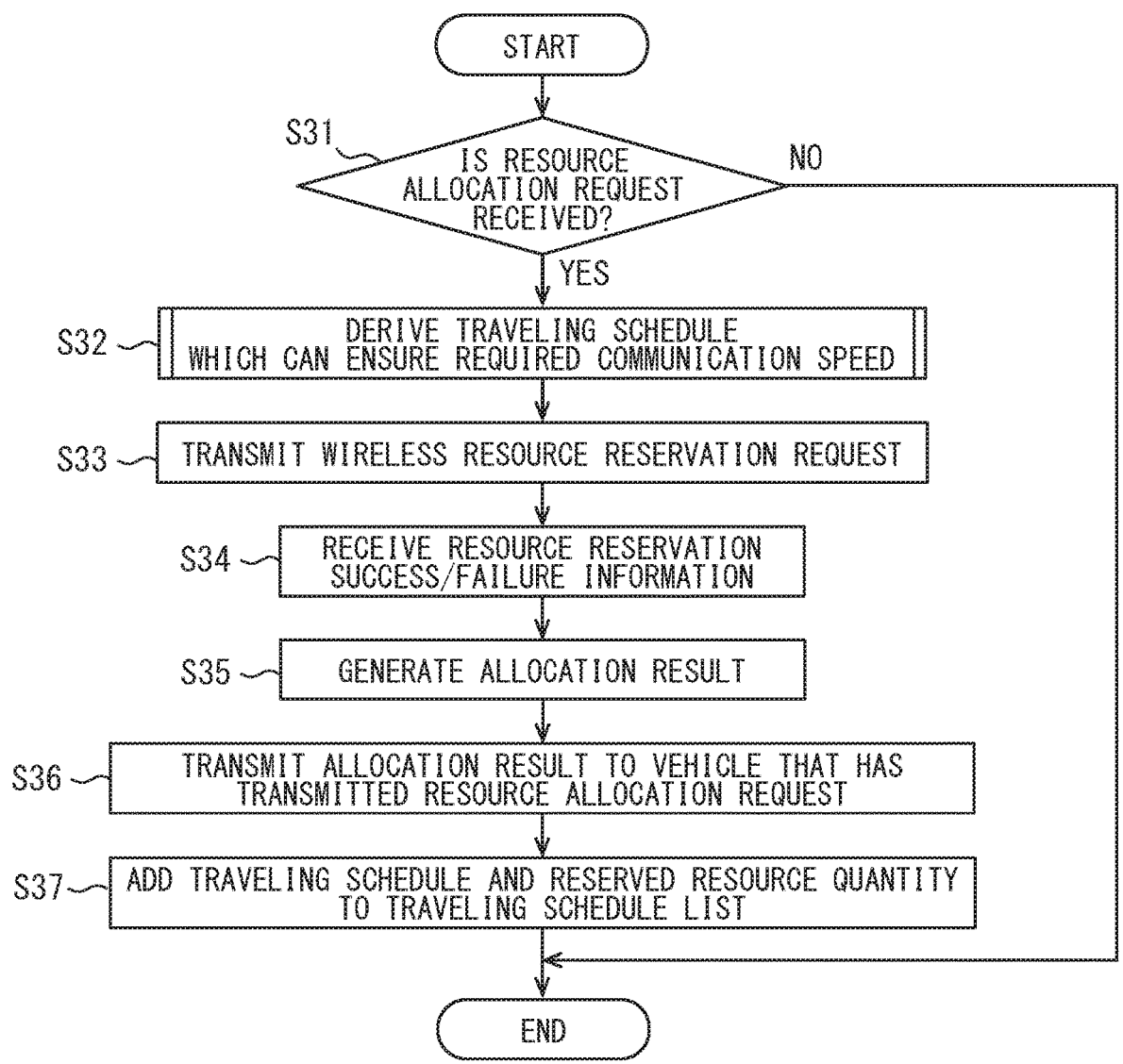
FIG. 14 is a view showing a process executed by a schedule server in the second embodiment.

FIG. 14 shows a process executed by the schedule server 9A. The schedule server 9A periodically executes the process shown in FIG. 14. In S31, the schedule server 9A determines whether the resource allocation request is received. When a result of the determination in S31 is NO, the schedule server 9A ends the process shown in FIG. 14. When the result of the determination in S31 is YES, the schedule server 9A advances the process to S32.

In S32, the schedule server 9A derives the travel schedule for the vehicle 5 that has transmitted the resource allocation request so as to be able to ensure the required communication speed included in the resource allocation request. In S32, the schedule server 9A executes a process specifically shown in FIG. 15.

Figure 15:
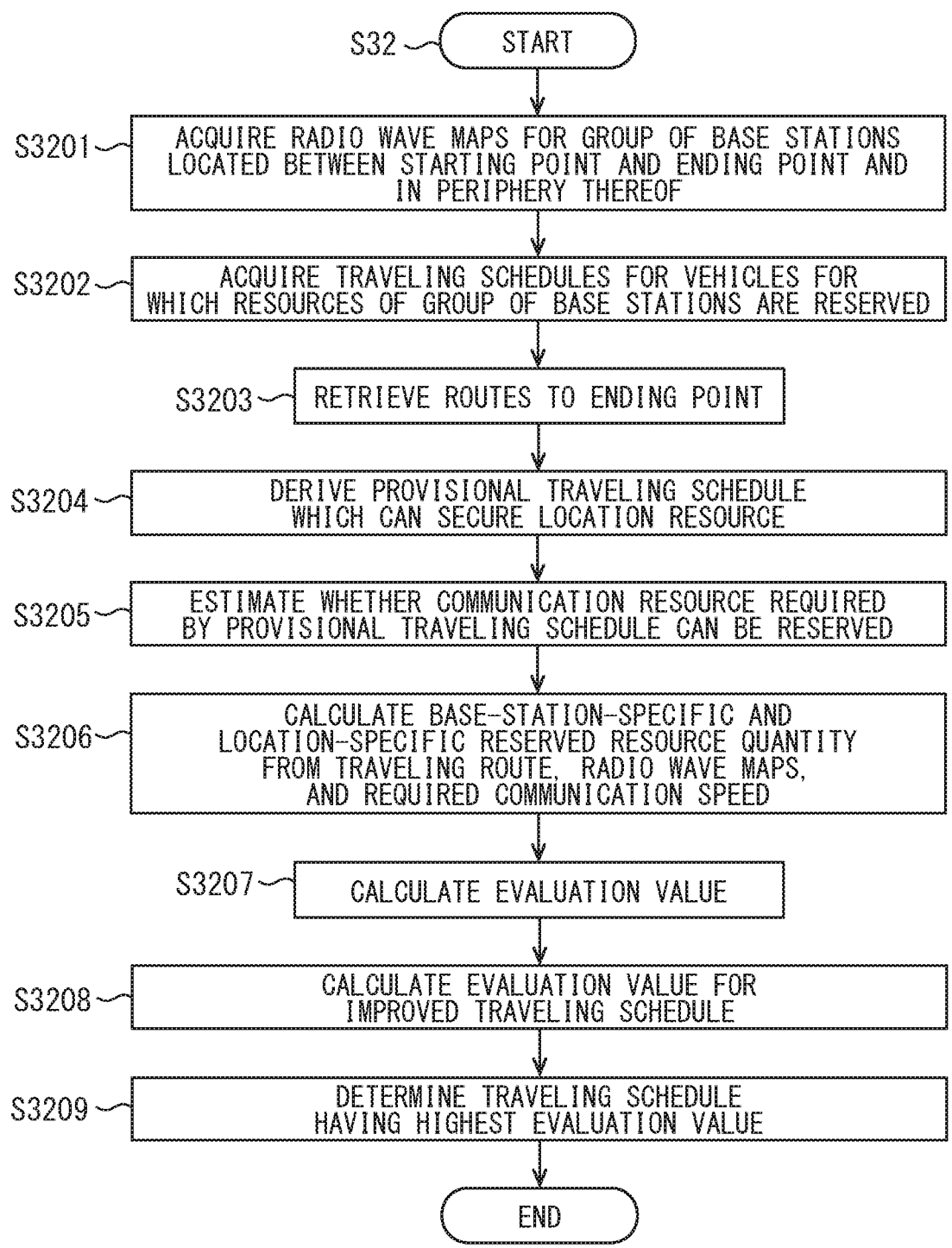
FIG. 15 is a flow chart showing a detailed process in S32 in FIG. 14.

In FIG. 15, in S3201, the schedule server 9A acquires the radio wave maps 11 for a group of the base stations having the base station areas 7 including a section between the starting point $P_S$ and the ending point $P_G$, which are included in the resource allocation request, and the periphery thereof. In the example shown in FIG. 13, the radio wave maps 11 for the base stations 3A, 3B, 3C, and 3D are acquired.

Figure 16:
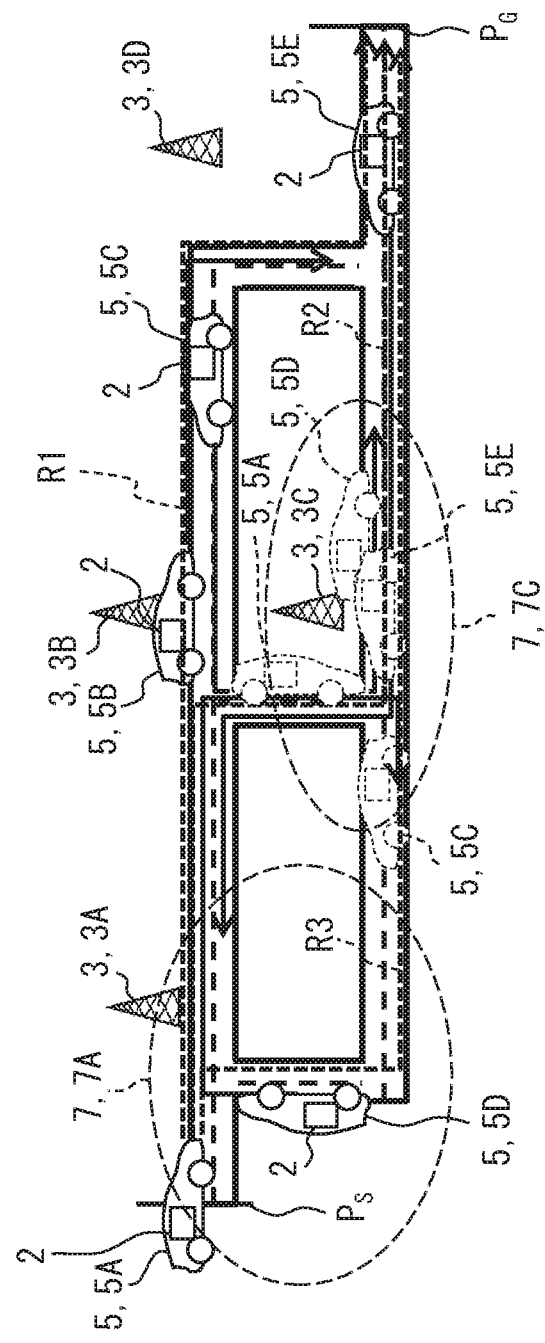
FIG. 16 is a view conceptually showing an example of a travel schedule acquired from a travel schedule list.

In S3202, the schedule server 9A acquires, from the travel schedule list 10, the travel schedules for the vehicles 5 scheduled to drive through the base station areas 7 corresponding to the radio wave maps 11 acquired in S3201. FIG. 16 conceptually shows an example of the travel schedules acquired from the travel schedule list 10. In FIG. 16, arrows extending from the vehicles 5B, 5C, 5D, and 5E show the travel schedules for the vehicles 5B, 5C, 5D, and 5E.

In S3203, the schedule server 9A retrieves routes which allow the vehicles 5 to travel from the starting point $P_S$ and reach the ending point $P_G$. FIG. 16 also shows three routes R1, R2, and R3 retrieved in S3203. In S3204, the schedule server 9A derives a provisional travel schedule. The provisional travel schedule is derived on the assumption that the vehicle 5 travels on the route R retrieved in S3203 at a vehicle speed assumed when the vehicle 5 travels on the route R, such as a limiting speed. However, a condition for the provisional travel schedule is not only that the vehicle 5 travels on the route R at the assumed vehicle speed, but also that a safe distance can be ensured as an inter-vehicle distance to another vehicle 5. This means that the travel schedule which can ensure the location resource is derived. The safe distance may be a given distance or may also be a distance which varies depending on the vehicle speed. The other vehicle 5 is the vehicle 5 that has acquired the travel schedule in S3202. The provisional travel schedule is derived for each of the routes retrieved in S3203.

In S3205, the schedule server 9A estimates whether the required wireless resource can be reserved when the vehicle 5 moves based on the provisional travel schedule. The required wireless resource is the wireless resource required to obtain the required communication speed. In FIG. 16, the respective locations of the vehicles 5A, 5C, 5D, and 5E at a time t1 a given period after a time t0 at which the vehicle 5A is at the starting point $P_S$ are shown by the broken lines. Note that, in FIG. 16, the location of the vehicle 5A at the time t1 corresponds to a location of the vehicle 5A when the vehicle 5A has traveled on the route R2. The locations of the vehicles 5C, 5D, and 5E at the time t1 are determined from the travel schedule acquired in S3202.

In the example shown in FIG. 16, it can be estimated that, at the time t1, the vehicles 5 are concentrated on the base station area 7C, and the wireless resource may be insufficient. The estimation in S3205 is made based on the number of the vehicles 5 present in each of the base station areas 7 at each of the times. As also shown in FIG. 16, the route R3 has a section included in none of the base station areas 7. Accordingly, the wireless resource when the vehicle 5 travels through the section cannot be reserved. Consequently, in the example of FIG. 16, the route for which it can be estimated that the required wireless resource can be reserved is only the route R1.

In S3206, the schedule server 9A calculates, for the route for which it is estimated in S3205 that the required wireless resource can be reserved, the base-station-specific and location-specific reserved resource quantity. The reserved resource quantity is a wireless resource quantity requested to be reserved, and the value thereof is the same as that of the required wireless resource. In other words, the reserved resource quantity corresponds to the required resource quantity. The reserved resource quantity is calculated based on the travel route, the radio wave maps 11, and the required communication speed. The travel route is the route for which it is estimated in S3205 that the required wireless resource can be reserved. On the route R1 shown in FIG. 16, the vehicle 5 communicates with the base stations 3A, 3B, and 3D. Accordingly, the portions of the radio wave maps 11 for the base stations 3A, 3B, and 3D through which the route R1 extends are utilized. In an upper row of FIG. 17, a view obtained by extracting the portions of the radio wave maps 11 for the base stations 3A, 3B, and 3D through which the route R1 extends is shown. The ordinate axis of each of the radio wave maps 11 shown in FIG. 17 represents a signal intensity.

The reserved resource quantity can be calculated by multiplying the required communication speed by the communication efficiency. In addition, as the signal intensity is higher, the communication efficiency is higher. Accordingly, it is possible to determine the communication efficiency by multiplying the signal intensity determined from the radio wave map 11 by a predetermined calculation factor. The communication efficiency may also be determined in consideration of a location-specific interference noise intensity, a margin based on reproducibility statistics, or the like in addition to the signal intensity.

Since an end of the base station area 7 is distant from the base station 3, the signal intensity decreases at the end of the base station area 7. In addition, the end of the base station area 7 also serves as the base station area 7 of another of the base stations 3 and, in most cases, the end of the base station area 7 receives interference by a radio wave transmitted from the other base station 3. Accordingly, in a region where the multiple base station areas 7 overlap each other, in order to ensure the same required communication speed, a larger wireless resource quantity is required.

Figure 17:
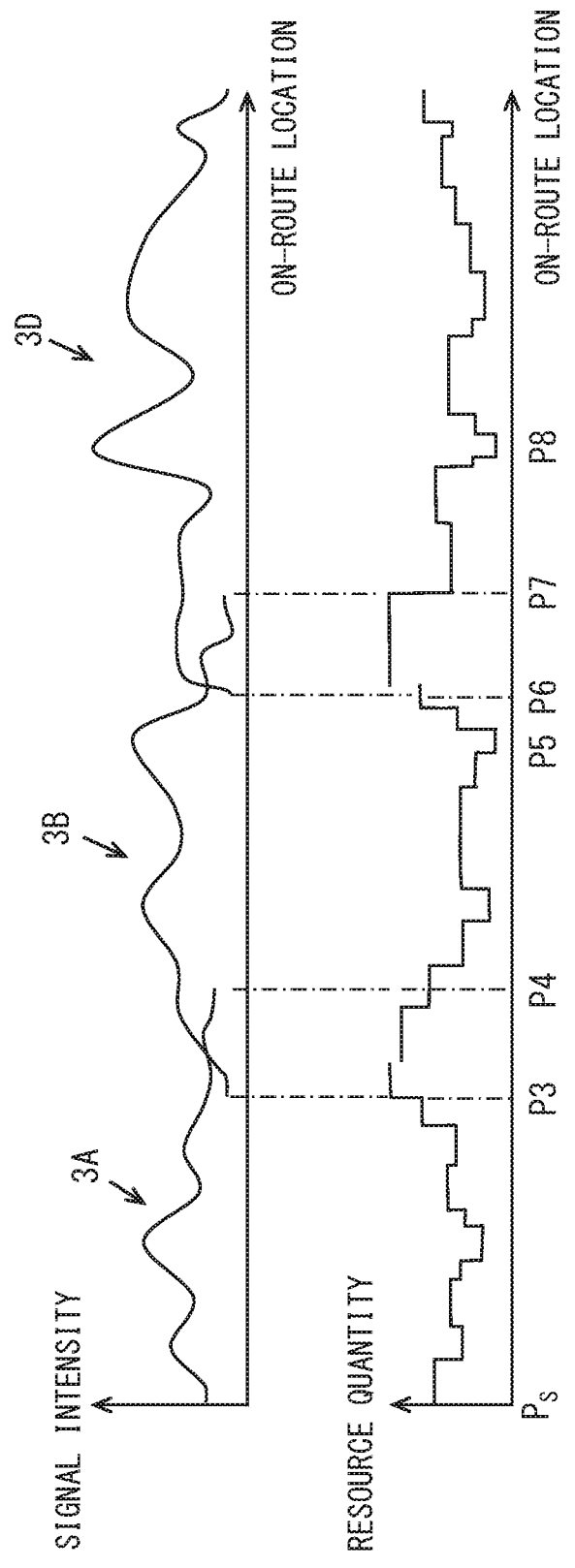
FIG. 17 shows an upper-row graph representing radio wave maps for individual base stations, while showing a lower-row graph representing a reserved resource quantity.

In a lower row of FIG. 17, a result of the calculation of the reserved resource quantity is shown. What is shown in the lower row of FIG. 17 is the reserved resource quantity when the required communication speed is constant during the travel schedule. Even when the reserved resource quantity is constant, for the reason described above, the required resource quantity is larger in each of locations P3 and P4 where the base station areas 7A and 7B overlap each other and locations P6 and P7 where the base station areas 7B and 7D overlap each other. On the other hand, at a location where the base station area 7 does not overlap another of the base station areas 7 and the signal intensity is high, such as each of locations P5 and P8, the required resource quantity is small.

In S3207, the schedule server 9A calculates an evaluation value for the travel schedule for which the reserved resource quantity is calculated in S3206. The evaluation value is calculated utilizing an evaluation function set in advance. The evaluation function is a function of a movement distance and a maximum value of a utilization ratio of the wireless resource. The evaluation value is a value representing a result of evaluating movement-related easiness and a communication-related advantage. The evaluation function is, e.g., a function which outputs a higher evaluation value as the movement distance is shorter. This is because, in general, a shorter distance is preferred as long as the same location can be reached. However, instead of the movement distance, a movement time may also be utilized as an input parameter to the evaluation function.

The evaluation function is also a function which outputs the higher evaluation value as the maximum value of the utilization ratio of the wireless resources is lower. Note that the utilization ratio of the wireless resource is a ratio of the reserved resource quantity to a maximum value of the resource quantity that can be allocated by the base station 3. The utilization ratio of the wireless resource mentioned herein includes not only the travel schedule for which the reserved resource quantity is calculated in S3206, but also the travel schedule for the other vehicle 5 acquired in S3202. This is because, to determine whether the wireless resource can be allocated, it is required to consider the wireless resource which may be allocated to the vehicle 5 that has requested the allocation of the wireless resources, but also the already allocated wireless resource.

In S3208, the schedule server 9A determines, for the travel schedule for which the evaluation value is calculated, whether it is possible to improve the utilization ratio of the wireless resources by adjusting the speed of the vehicle 5. When it is possible to improve the travel schedule, the schedule server 9A calculates the evaluation value for the improved travel schedule.

Figure 18:
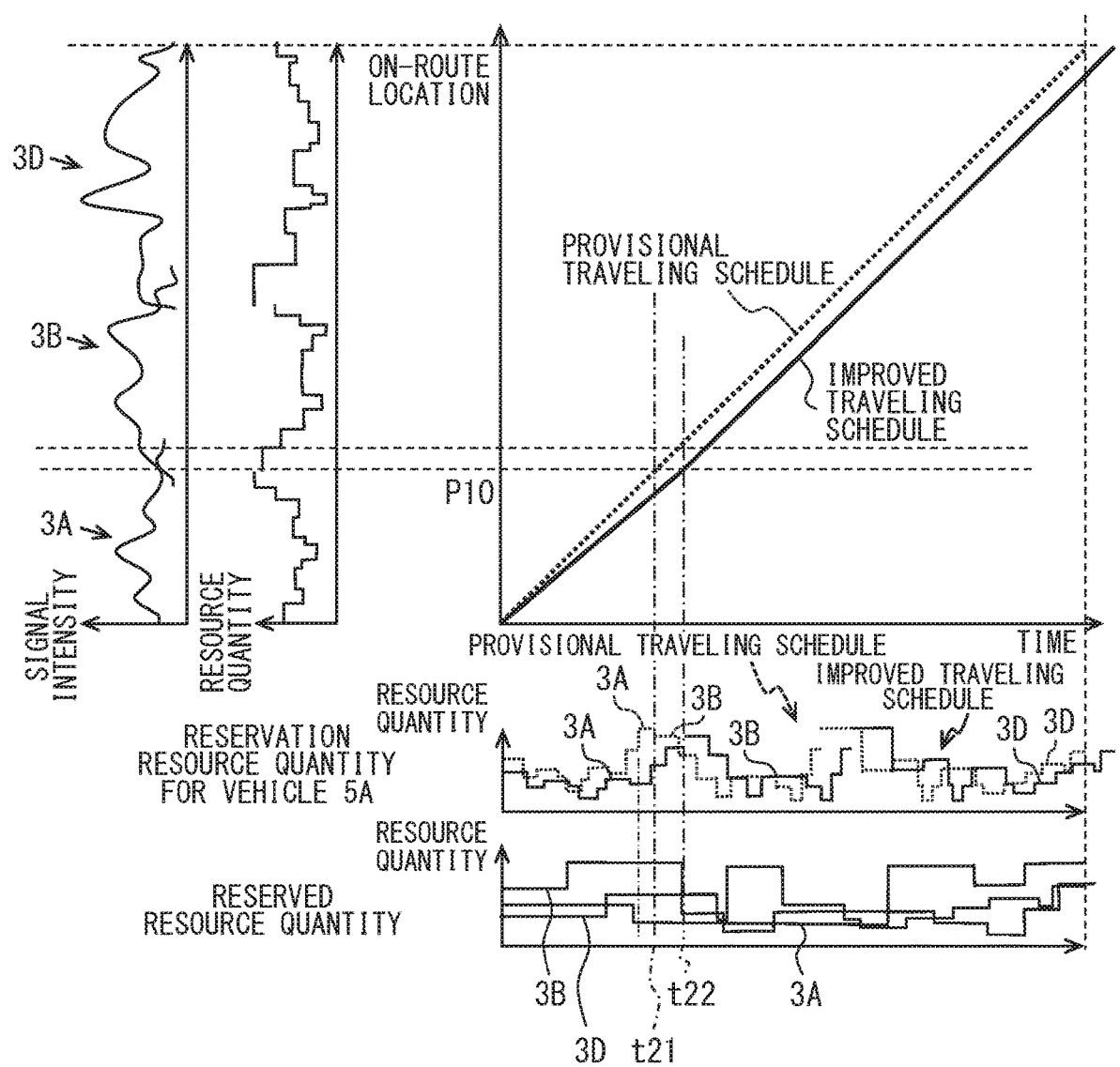
FIG. 18 is a view specifically illustrating a process executed in S3208.

Based on FIG. 18, a process executed in S3208 will be specifically described. In FIG. 18, a graph shown at the center thereof and utilizing a time and an on-route location as two axes shows the on-route location varying with the time for each of a case where the vehicle moves based on the provisional travel schedule and a case where the vehicle moves based on the improved travel schedule. Also, a graph located below the center graph shares the abscissa axis of the center graph. On the other hand, two graphs located on the left side of the center graph has an axis for the on-route location which is the same as the ordinate axis of the center graph. The two graphs located on the left side of the center graph are the same as the graphs shown in FIG. 17.

The upper one of the two graphs located below the center graph represents the reserved resource quantity calculated for the vehicle 5A in S3206. Note that the vehicle 5A corresponds to the vehicle 5 to which the wireless resource is to be allocated in the current process. In this graph, a dotted line represents the reserved resource quantity determined for the provisional travel schedule. The reserved resource quantity determined for the provisional resource schedule has a peak in the resource quantity reserved for the base station 3B during a period between times t21 and t22. As for the reserved resource quantity also, during the period between the times t21 and t22, the resource quantity reserved for the base station 3B is large. Accordingly, during the period between the times t21 and t22, the utilization ratio of the resource is high. As a result, the evaluation value is low.

Thus, it may be possible that there is a time block during which each of the reserved resource quantity and the resource quantity schedule to be reserved has a high value. In this case, when the speed of the vehicle 5 for which it is attempted this time to reserve the wireless resource is changed, it is possible to reduce overlap between the peak of the reserved resource quantity and the peak of the resource quantity which is about to be reserved.

In the example of FIG. 18, the speed before a location P10 is reached is reduced so as to shift a time at which the on-route location reaches P10 from t21 in the provisional travel schedule to t22 in the improved travel schedule. After the location P10 is reached, the speed in the improved travel schedule is the same as the speed in the provisional travel schedule. The improved travel schedule is an example of a changed schedule.

At the time t22, the reserved resource quantity is smaller than a peak value. Accordingly, by shifting the time at which the location P10 is reached to t22, it is possible to reduce the utilization ratio of the wireless resource. In terms of this, the evaluation value is increased. However, since the movement speed before the location P10 is reduced, from a viewpoint related to the movement, the evaluation value is reduced. For evaluation of which one of the travel schedule before the improvement and the improved travel schedule is superior, the evaluation value for the improved travel schedule is calculated.

In S3206, when the schedule server 9A estimates that the required wireless resource can be reserved for multiple the provisional travel schedules, multiple the improved travel schedules may be obtained. In S3209, the schedule server 9A determines the travel schedule having the highest evaluation value.

Returning back to FIG. 14, in S33, the schedule server 9A transmits a wireless resource reservation request to the resource management server 8A. The wireless resource reservation request includes the reserved resource quantity determined for the travel schedule having the highest evaluation value as a result of executing S32. As shown in FIG. 18, the reserved resource quantity is represented by the base-station-specific and time-specific resource quantity. However, since the times and the locations of the vehicle 5 are in one-to-one correspondence, the reserved resource quantity may also be represented by a resource quantity associated with each of the base stations and with each of the locations of the vehicle 5. On receiving the wireless resource reservation request, the resource management server 8A executes a process shown in FIG. 19, determines whether the resource quantity shown in the wireless resource reservation request can be reserved, and transmits, to the schedule server 9A, resource reservation success/failure information showing a result of the determination.

In S34 shown in FIG. 14, the schedule server 9A receives the resource reservation success/failure information. In S35, the schedule server 9A generates an allocation result. The allocation result includes a wireless resource allocation result and a travel schedule corresponding to a location resource allocation result. When the wireless resource reservation is successful, the wireless resource allocation result includes information indicative of the wireless resource allocated to the vehicle 5 that has transmitted the resource allocation request. On the other hand, when the wireless resource allocation is unsuccessful, the reservation result includes information indicative of the unsuccessful reservation. In S36, the schedule server 9A transmits the allocation result generated in S35 to the vehicle 5 that has transmitted the resource allocation request.

In S37, when the allocation result shows the successful wireless resource reservation, the schedule server 9A adds the current travel schedule and the successfully reserved wireless resource quantity to the travel schedule list 10.

Figure 19:
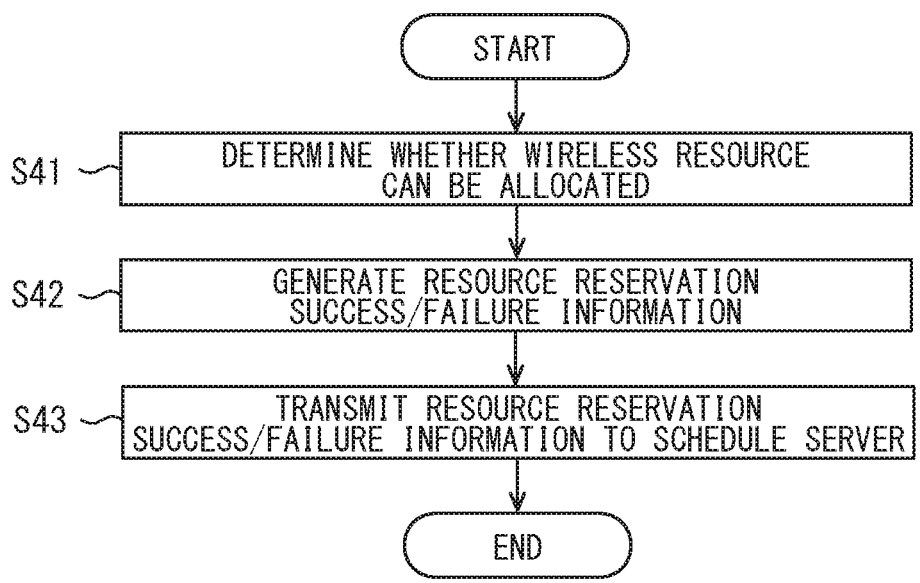
FIG. 19 is a view showing a process executed by a server communication controller of a resource management server in the second embodiment.

FIG. 19 shows a process executed by the server communication controller 42 of the resource management server 8A. On receiving the wireless resource reservation request from the schedule server 9A, the server communication controller 42 starts the process shown in FIG. 19.

In S41, the server communication controller 42 determines whether the reserved resource quantity shown in the wireless resource reservation request can be allocated. The determination is the same as in the process after the resource quantity is calculated in S23 in the first embodiment. In S23 in the first embodiment, the required resource quantity is calculated from the communication speed requested by the resource allocation request. By contrast, in the second embodiment, the reserved resource quantity is included in the wireless resource reservation request, and therefore it is not required to calculate the resource quantity in S41.

Note that, in the process in S41, it may also be possible that the resource management server 8A does not directly determine whether the wireless resource can be allocated and instructs the base station 3 to determine whether the wireless resource can be allocated. In this case, it follows that the resource management server 8A instructs each of the base stations 3 of which the wireless resource allocation is requested in the resource allocation request to reserve the wireless resource shown in the resource allocation request. The base station 3 that has received the instruction determines whether the specified wireless resource can be reserved. Then, the base station 3 transmits information indicative of whether the reservation is successful to the resource management server 8A.

In S42, the server communication controller 42 generates the resource reservation success/failure information indicative of a result of the determination made in S41. In S43, the server communication controller 42 transmits the resource reservation success/failure information generated in S42 to the schedule server 9A. When S43 is executed, the schedule server 9A executes steps including and subsequent to S34 in FIG. 14.

The vehicle communication system 1A of the second embodiment includes the schedule server 9A which determines the travel schedule for the vehicle 5. The schedule server 9A, which can refer to the travel schedule determined for the other vehicle 5, can determine a highly safe travel schedule which can ensure a given inter-vehicle distance to the other vehicle 5.

Third Embodiment

A vehicle communication system 1B of a third embodiment has the same hardware configuration as that of the vehicle communication system 1A of the second embodiment. In the second embodiment, the schedule server 9A refers to the radio wave maps 11 to determine the reserved resource quantity. By contrast, in the third embodiment, the resource management server 8A refers to the radio wave maps 11 to determine the reserved resource quantity.

Figure 20:
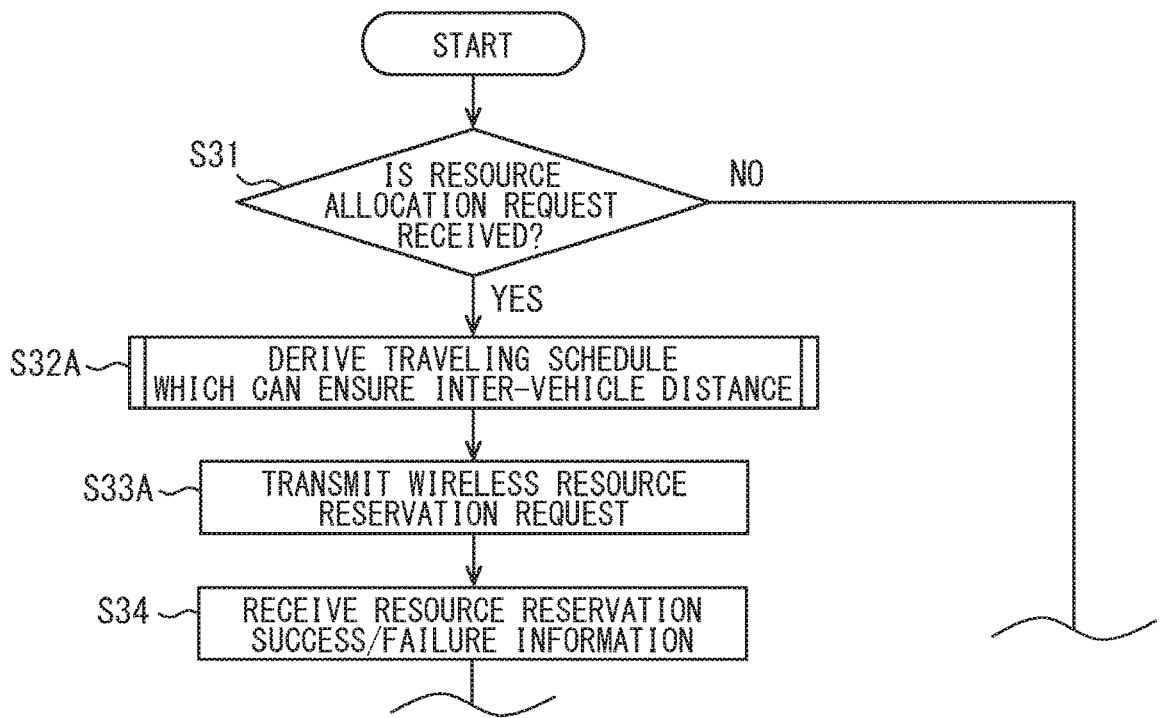
FIG. 20 is a view showing a part of a process executed by the schedule server in a third embodiment.

FIG. 20 shows a part of a process executed by the schedule server 9A in the third embodiment. The portion omitted in FIG. 20 is the same as in FIG. 14. When a result of the determination made in S31 in FIG. 20 is YES, the schedule server 9A advances the process to S32A.

In S32A, the schedule server 9A derives a travel schedule which can ensure a safe distance as the inter-vehicle distance between the starting point $P_S$ and the ending point $P_G$ which are included in the resource allocation request. The meaning of the safe distance is the same as in the second embodiment.

Figure 21:
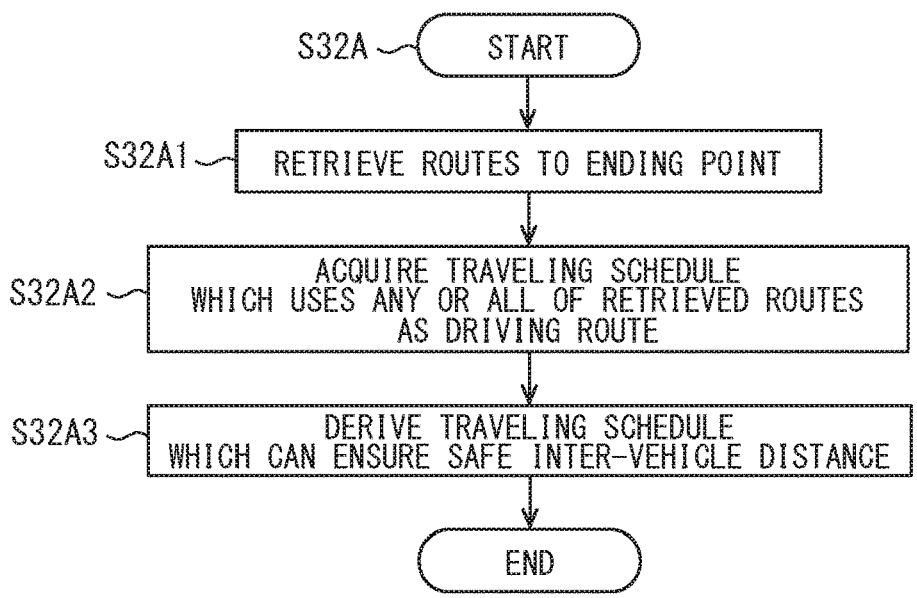
FIG. 21 is a view showing a detailed process in S32A in FIG. 20.

FIG. 21 shows a detailed process in S32A. In FIG. 21, in S32A1, the schedule server 9A retrieves routes which allow the vehicle 5 to drive from the starting point $P_S$ and reach the ending point $P_G$. In S32A2, the schedule server 9A extracts, from the travel schedule list 10, a travel schedule which utilizes any or all of the routes retrieved in S32A1 as a travel route. In S32A3, the schedule server 9A derives a travel schedule which allows the vehicle 5 to travel on the route retrieved in S3201, while ensuring the safe inter-vehicle distance to the other vehicle 5 traveling based on the travel schedule acquired in S32A2.

After the travel schedule is thus derived, the schedule server 9A executes S33A in FIG. 20 and transmits the wireless resource reservation request to the resource management server 8A. The wireless resource reservation request includes the travel schedule derived in S32A. Specifically, the wireless resource reservation request includes information which allows the travel route from the starting point $P_S$ to the ending point $P_G$ and respective times at which the vehicle 5 travels through the individual locations on the travel route to be specified. The wireless resource reservation request also includes the required communication speed included in the resource allocation request.

Figure 22:
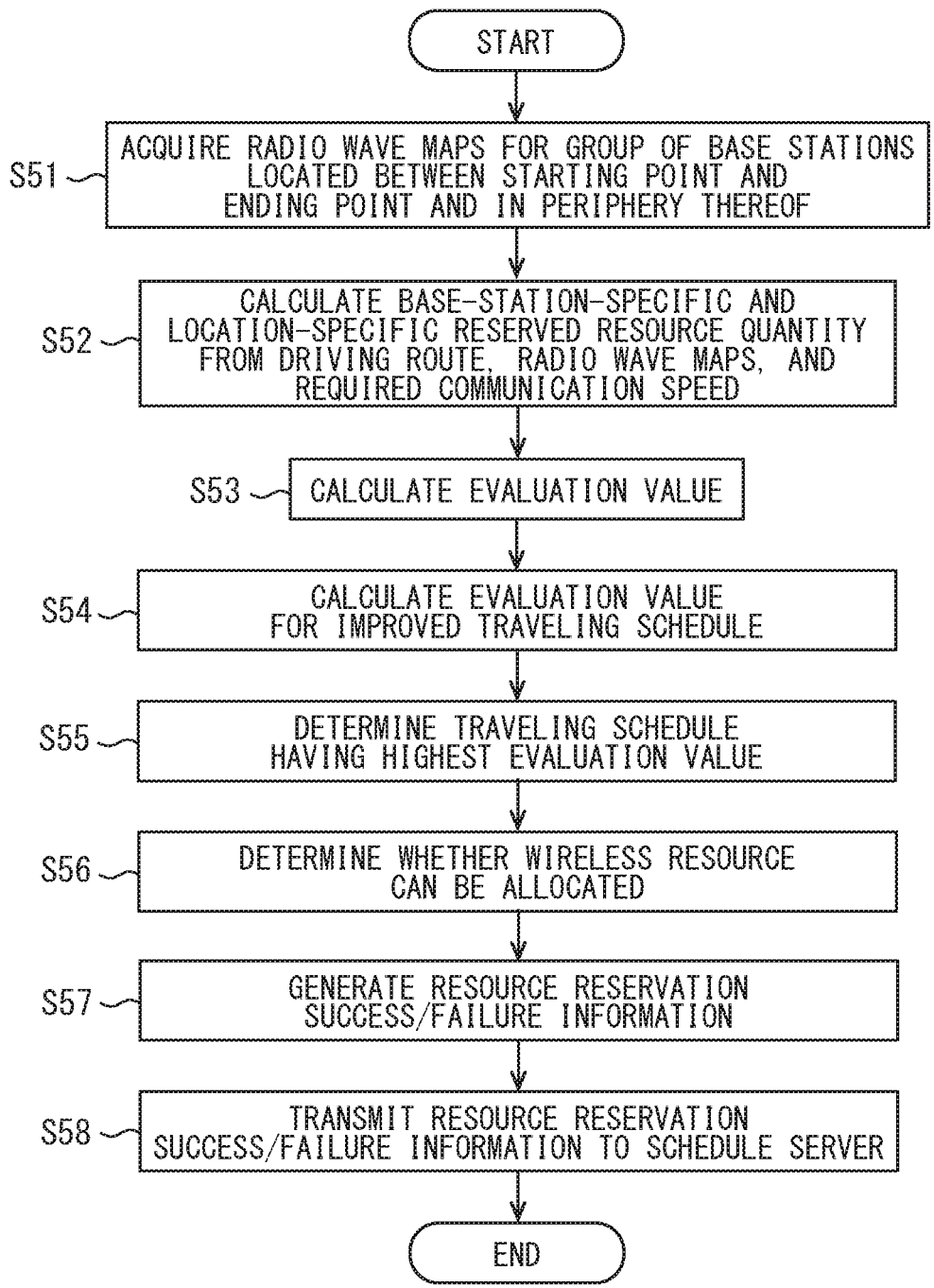
FIG. 22 is a view showing a process executed by the resource management server in the third embodiment.

FIG. 22 shows a process executed by the resource management server 8A in the third embodiment. In the third embodiment, a part of the process executed by the schedule server 9A in the second embodiment is executed by the resource management server 8A.

In FIG. 22, in S51, the resource management server 8A acquires the radio wave maps 11 for the group of base stations having the base station areas 7 including the section between the starting point $P_S$ and the ending point $P_G$ of the travel route included in the wireless resource reservation request and the periphery thereof. In S52, for the travel route included in the wireless resource reservation request, the resource management server 8A calculates the base-station-specific and location-specific reserved resource quantity. The reserved resource quantity is calculated based on the travel route, the radio wave maps 11, and the required communication speed.

In S53, S54, and S55, the same processes as executed in S3207, S3208, and S3209 in FIG. 15 are executed. In S53, the resource management server 8A calculates the evaluation value for the travel schedule for which the reserved resource quantity is calculated in S52. In S54, the resource management server 8A determines, for the travel schedule for which the evaluation value is calculated, whether the utilization ratio of the wireless resource can be improved by adjusting the speed of the vehicle 5. When the travel schedule can be improved, the resource management server 8A calculates an evaluation value for the improved travel schedule. In S55, the resource management server 8A determines the travel schedule having the highest evaluation value.

In S56, the resource management server 8A determines whether the reserved resource quantity required by the travel schedule having the highest evaluation value can be allocated. The determination is made utilizing the same method as utilized in S41 in the second embodiment. In S57, the resource management server 8A generates an allocation result showing the result of the determination made in S56. In S57, the resource management server 8A transmits the allocation result generated in S56 and the travel schedule determined in S55 to the schedule server 9A. When S58 is executed, the schedule server 9A executes steps including and subsequent to S34 in FIG. 20.

Fourth Embodiment

A vehicle communication system of a fourth embodiment has the same hardware configuration as that of the vehicle communication system 1A of the second embodiment. Accordingly, the management server 4A includes the schedule server 9A and the resource management server 8A, and the schedule server 9A can refer to the radio wave maps 11.

Figure 23:
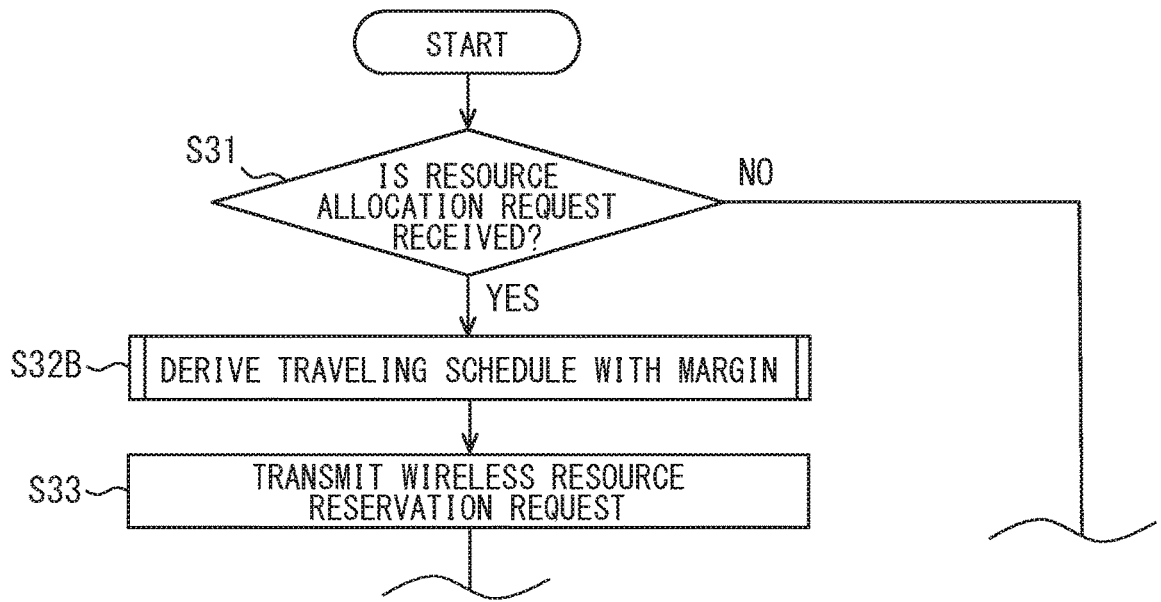
FIG. 23 is a view showing a part of a process executed by the schedule server in a fourth embodiment.

FIG. 23 shows a part of a process executed by the schedule server 9A in the fourth embodiment. The portion omitted in FIG. 23 is the same as in FIG. 14. When a result of the determination made in S31 in FIG. 23 is YES, the schedule server 9A advances the process to S32B.

Figure 24:
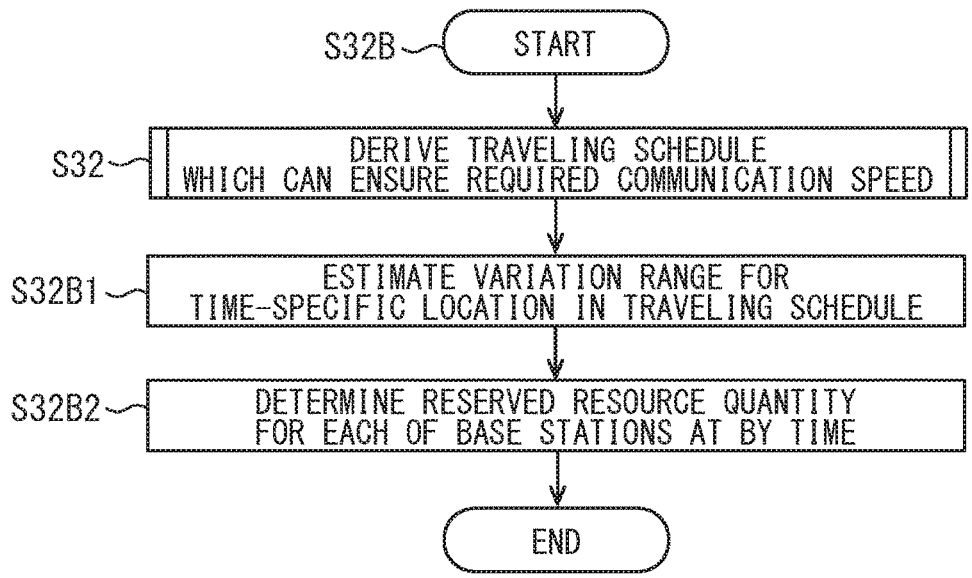
FIG. 24 is a view showing a detailed process in S32B in FIG. 23.

In S32B, the schedule server 9A derives a travel schedule with a margin. In S32B, a process specifically shown in FIG. 24 is executed. In the process shown in FIG. 24, first, the schedule server 9A executes S32 shown in FIG. 15 in the second embodiment to derive the travel schedule which can ensure the required communication speed.

Figure 25:
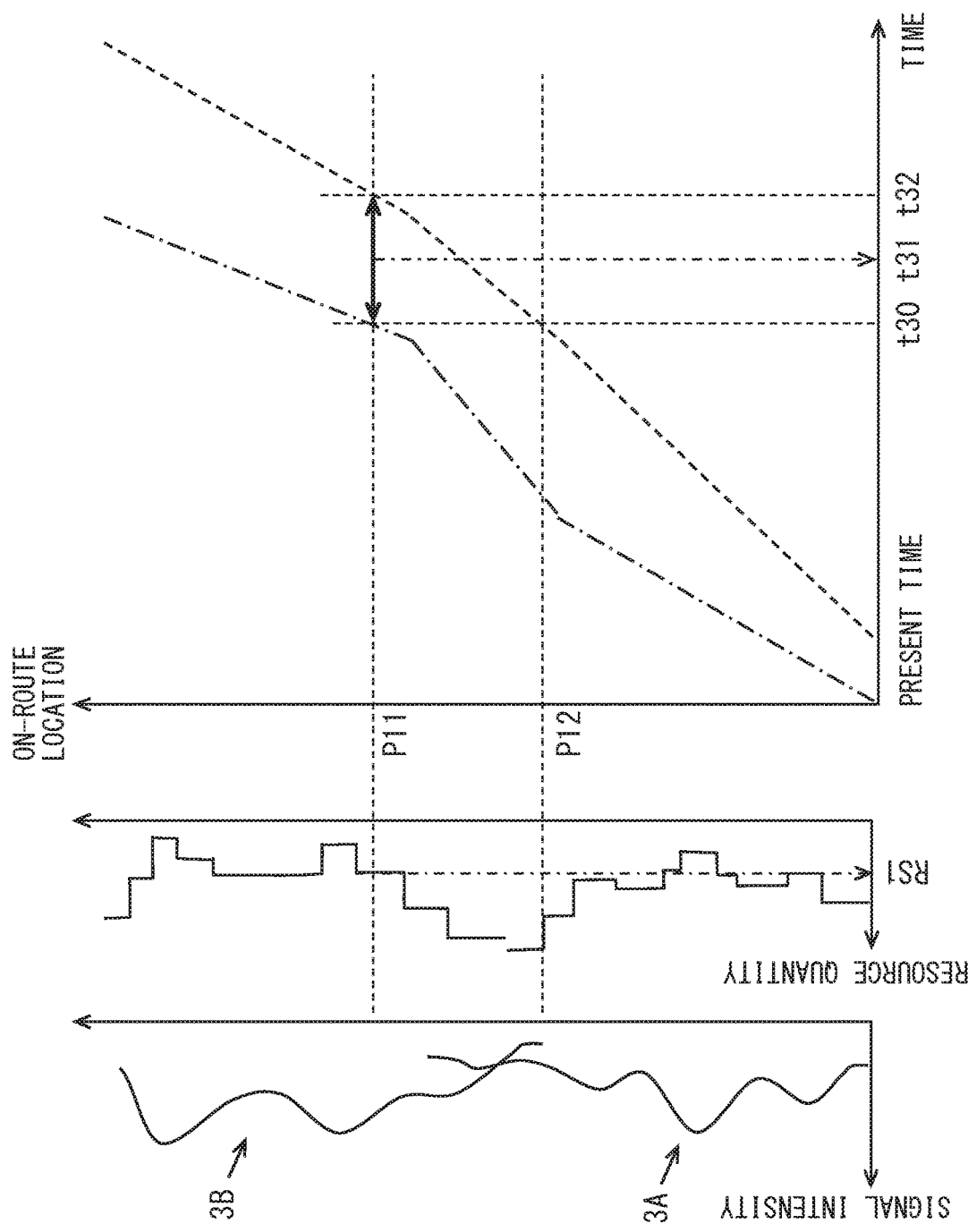
FIG. 25 is a view specifically illustrating a process in S32B1 in FIG. 24.

Subsequently, in S32B1, the schedule server 9A estimates a variation range for the time-specific location of the vehicle 5 in the travel schedule derived in S32. Based on FIG. 25, a process in S32B1 will be described. In FIG. 25, t31 is a time at which the vehicle 5 reaches a location P11 when traveling based on the travel schedule derived in S32.

However, when the vehicle 5 actually travels, the vehicle 5 may not be able to drive as scheduled. This is because a movement speed varies due to a traffic situation or the like, and a departure time may not be exactly as scheduled. A time t30 is an earliest time at which the vehicle 5 reaches the location P11 when consideration is given to variation factors, while a time t32 is a latest time at which the vehicle 5 reaches the location P11 when consideration is given to the variation factors.

A time length of a period by which a scheduled time in the travel schedule is shifted earlier and a time length of a period by which a scheduled time in the travel schedule is shifted later are allowed to be increased based on a distance from the starting point $P_S$. When statistical data on a time difference between a travel time in the travel schedule and an actual travel time can be acquired, the length of the period may also be determined based on the statistical data.

A one-dot-dash line in FIG. 25 shows an earliest time at which the vehicle 5 reaches each of the locations on the travel route shown by the travel schedule when consideration is given to the variation factors. On the other hand, a broken line in FIG. 25 shows a latest time at which the vehicle 5 reaches each of the locations on the travel route shown by the travel schedule when consideration is given to the variation factors.

A range between the one-dot-dash line and the broken line at each of the times in a graph showing a relationship between a time and an on-route location in FIG. 25 corresponds to the variation range for the location of the vehicle 5 at each of the times in the travel schedule when consideration is given to the variation factors. In S32B2, the schedule server 9A determines the reserved resource quantity to be reserved for each of the base stations 3 at each of the times as follows. On a left side of FIG. 25, a graph showing the radio wave maps 11 when the vehicle 5 travels on the travel route and a graph representing the resource quantity required at each of the locations are shown. The resource quantity required at each of the locations can be determined from the radio wave maps 11 and the required communication speed.

It can be understood from the graph representing the resource quantity required at each of the locations that, at the location P11, a resource quantity RS1 is required. As long as the resource quantity RS1 can be reserved during a period between the time t30 and the time t32, even though the location of the vehicle 5 at each of the times varies due to the variation factors, the probability that the vehicle communication apparatus 21 cannot perform required communication due to the insufficient wireless resource decreases.

On the other hand, when the reserved resource quantity is considered based on a time, the schedule server 9A can estimate that, at the time t30, for example, the vehicle 5 is located between the location P12 and the location P11. When the vehicle 5 is located between the location P12 and the location P11, in the graph representing the relationship between the on-route location and the resource quantity in FIG. 25, the required resource quantity corresponds to a maximum value of the resource quantity between the location P12 and the location P11.

Accordingly, based on Expressions 1 and 2 shown below, the schedule server 9A can determine the reserved resource quantity to be reserved for each of the base stations 3 at each of the times.

$$RSr[X](t) \geq \text{Max}(RSn[X](P)) \quad \text{(Expression 1)}$$

$$PU(t) \geq P \geq PL(t) \quad \text{(Expression 2)}$$

In Expression 1, X represents which one of the base stations 3 is mentioned, and RSr represents the reserved resource quantity. Accordingly, a left part of Expression 1 represents the reserved resource quantity at a time t for a given one of the base stations 3, while RSn shown in a right part of Expression 1 represents the required resource quantity and P in the right part of Expression 1 represents the on-route location. Also, PU(t) shown in Expression 2 represents the on-route location closest to the ending point $P_G$ at the time t, while PL(t) shown in Expression 2 represents the on-route location closest to the starting point $P_S$ at the time t. In the example of FIG. 25, PU(t30) represents the location P11, while PL(t30) represents the location P12.

When ending the process in FIG. 24, the schedule server 9A advances the process to S33 in FIG. 23. In S33, the schedule server 9A transmits the wireless resource reservation request to the resource management server 8A. The wireless resource reservation request includes the base-station-specific reserved resource quantity at each of the times, which is determined through the execution of S32B.

In the fourth embodiment, in consideration of the variation factors, the schedule server 9A derives the travel schedule with a margin showing the time-specific variation range for the location. Then, the schedule server 9A determines the reserved resource quantity such that, even when the location of the vehicle 5 varies in the variation range for the location, the wireless resources are not insufficient. This prevents a situation in which, even when the location of the vehicle 5 at a given time varies for certain reasons, the required communication speed cannot be obtained with the allocated wireless resource.

Fifth Embodiment

Figure 26:
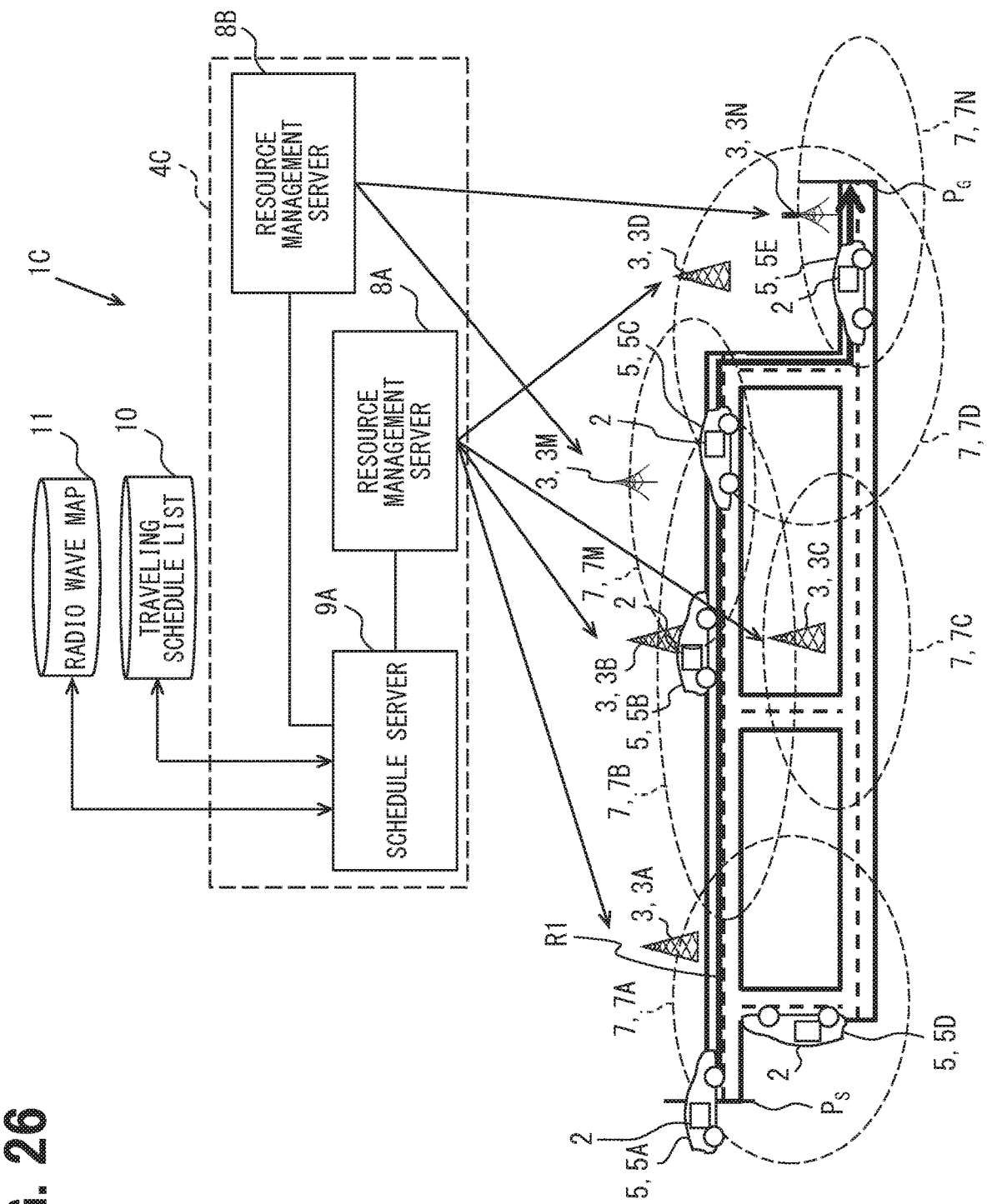
FIG. 26 is a view showing a configuration of the vehicle communication system in a fifth embodiment.

FIG. 26 shows a configuration of a vehicle communication system 10 of a fifth embodiment. The vehicle communication system 10 includes a management server 4C different from the management servers 4 and 4A of the embodiments described above. The management server 4C includes two resource management servers 8A and 8B and the schedule server 9A.

The resource management server 8A manages the base stations belonging to a first network, such as the base stations 3A, 3B, 3C, and 3D. On the other hand, the resource management server 8B manages the base stations belonging to a second network, such as the base stations 3M and 3N. The first network and the second network utilize respective frequencies different from each other. The base station area 7 of the base station 3 belonging to the first network and the base station area 7 of the base station 3 belonging to the second network, such as the base station area 7B and a base station area 7M or the base station areas 7D and 7M have respective portions overlapping each other. However, since the first network and the second network utilize the different frequencies, there is no mutual radio wave interference therebetween. In the fifth embodiment, it is assumed that the vehicle communication apparatus 21 is connectible to each of the first network and the second network.

Figure 27:
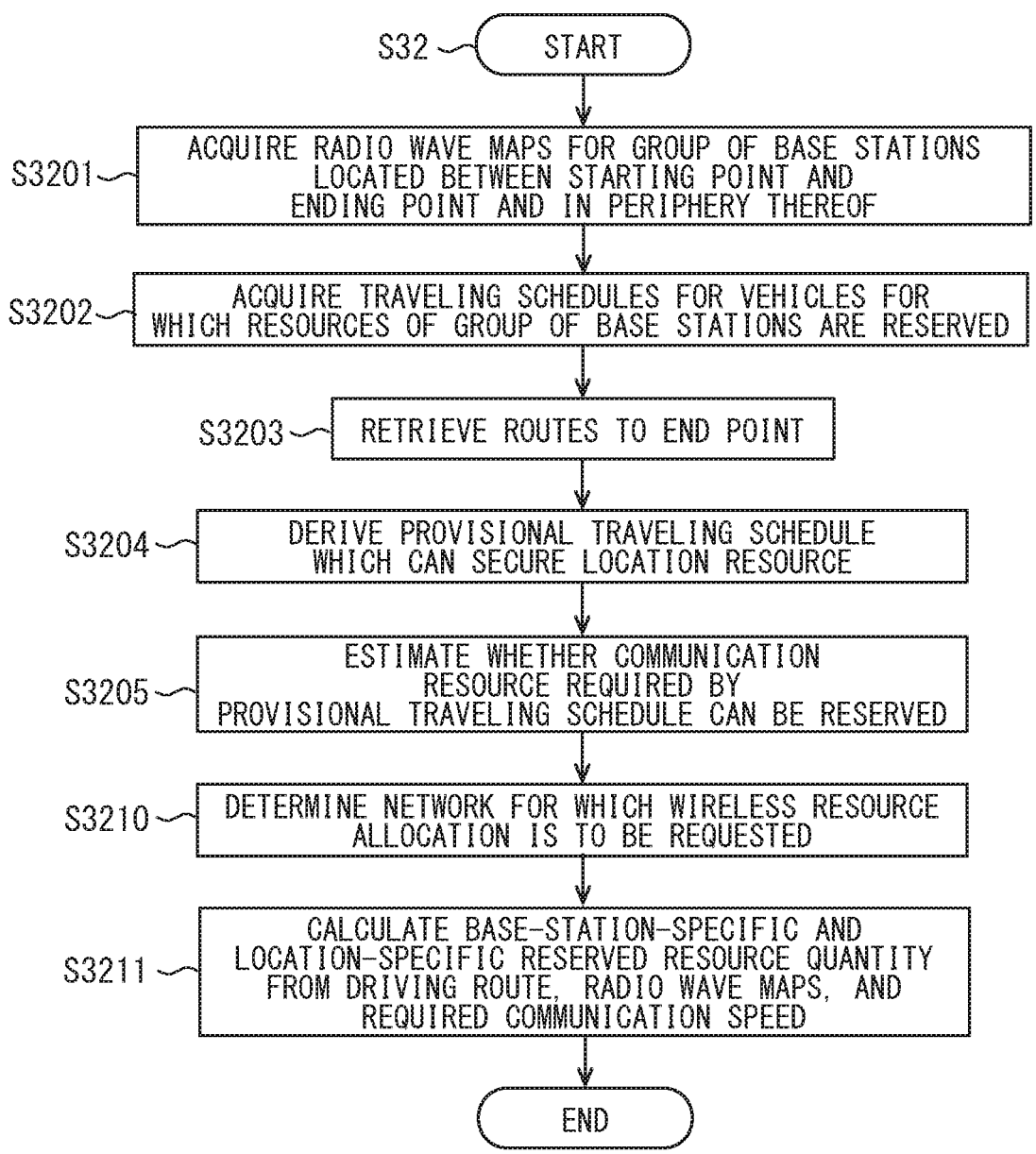
FIG. 27 is a view showing a process executed by the schedule server in the fifth embodiment.

In the fifth embodiment, the schedule server 9A executes a process shown in FIG. 27. In the process shown in FIG. 27, the schedule server 9A executes S3201 to S3205 in the same manner as in FIG. 15 shown in the second embodiment. In S3201, the schedule server 9A acquires the radio wave maps 11 for the group of base stations having the base station area 7 including the section between the starting point $P_S$ and the ending point $P_G$ and the periphery thereof. In S3202, the schedule server 9A acquires the travel schedule for the vehicle 5 for which the wireless resources of the group of base stations acquired in S3201 are reserved. In S3203, the schedule server 9A retrieves routes from the starting point $P_S$ to the ending point $P_G$. In S3204, the schedule server 9A derives a provisional travel schedule which can ensure a location resource. In S3205, the schedule server 9A estimates whether resources required in the provisional travel schedule can be reserved.

The process after the execution of S3205 is different from that in the second embodiment. In FIG. 27, the schedule server 9A executes S3210 subsequently to S3205. In S3210, the schedule server 9A determines the network for which wireless resource allocation is to be requested at each of the times.

In the present embodiment, to effectively utilize frequency resources, the base stations 3 belonging to the same network utilize the same frequency band and, in a region where the respective base station areas 7 of the base stations 3 belonging to the same network overlap each other, interference in the network occurs. Accordingly, a condition that, in a region where there is interference in one network and there is no interference in another network, only the network with no interference is utilized is provided. This condition is assumed to be a first condition.

Another condition that, in a region where a communication efficiency with one network is equal to or more than a given level, only the network with the communication efficiency equal to or more than the given level is utilized is provided. This condition is assumed to be a second condition. Note that, in a region out of the communication range of a given network, wireless resource allocation is naturally not requested of the network. In an overlap region where the multiple base station areas 7 belonging to different networks overlap each other, it is a condition for utilizing the multiple networks to satisfy neither of the first and second conditions.

Figure 28:
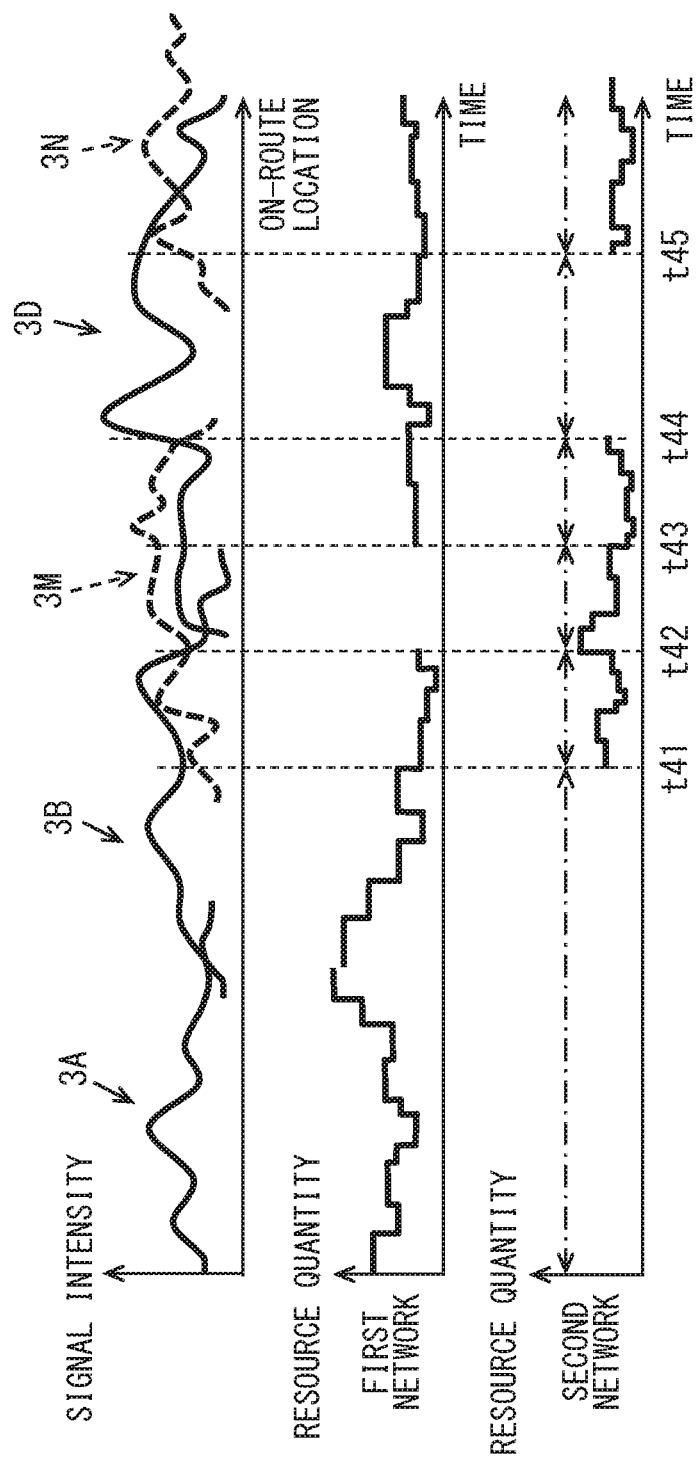
FIG. 28 shows an upper-row graph representing the radio wave maps for the individual base stations, while showing middle- and lower-row graphs representing respective reserved resource quantities for a first network and a second network.

An upper-row graph in FIG. 28 represents a signal intensity of a radio wave from each of the stations 3 with respect to a location on the route R1 shown in FIG. 26 when the vehicle 5A travels from the starting point $P_S$ to the ending point $P_G$ on the route R1. In the graph, solid lines indicate the radio wave maps 11 for the base stations 3A, 3B, and 3D belonging to the first network, while broken lines indicate the radio wave maps 11 for the base stations 3M and 3N belonging to the second network.

A middle-row graph in FIG. 28 represents a resource quantity requested at each of times in a time block during which the network for which wireless resource allocation is to be requested is determined to be the first network under the first and second conditions. A lower-row graph in FIG. 28 represents a resource quantity requested at each of times in a time block during which the network for which wireless resource allocation is to be requested is determined to be the second network under the first and second conditions.

In the middle- and lower-row graphs in FIG. 28, only the first network is determined to be the network for which wireless resources are to be requested during a period before a time t41 and a period between a time 44 and a time 45, while only the second network is determined to the network for which wireless resources are to be requested during a period between a time t42 and a time t43. During a time block other than the periods shown above, both of the first network and the second network are determined to be the networks for which wireless resources are to be requested.

In S3211, the schedule server 9A calculates the base-station-specific and location-specific reserved resource quantity for each of the base stations 3 belonging to the network determined in S3210. The reserved resource quantity is calculated based on the travel route, the radio wave maps 11, and the required communication speed. In the present embodiment, it is assumed that the travel route is that in a provisional travel schedule for which it is estimated in S3205 that the required wireless resource can be reserved. When there are multiple the provisional travel schedules for which it is estimated that the required wireless resources can be reserved, after S3211 is executed for each of the provisional travel schedules, one travel schedule can be determined based on the evaluation values described in the second embodiment. Alternatively, it may also be possible to selectively determine, from among the multiple provisional travel schedules for which it is estimated that the required wireless resources can be reserved, one travel schedule to be the travel schedule for which S3211 is to be executed based on a criterion for the travel distance or travel period.

When wireless resource allocation for the multiple networks is to be determined in S3210, the wireless resource quantity requested of each of the base stations 3 is adjusted such that a total value of the wireless resource quantities requested at the same time is equal to or more than the required wireless resource quantity. When wireless resource allocation is requested of the multiple base stations 3 at the same time, the wireless resource quantity requested of each of the base stations 3 can be determined by various methods. For example, the wireless resource quantity requested of each of the base stations 3 can be determined so as to minimize the total value of the utilization ratios of the wireless resources in the base stations 3 belonging to each of the networks. Alternatively, it may also be possible to distribute the requested wireless resource quantities based on communication efficiencies.

No matter how the wireless resource quantities requested of the multiple base stations 3 are determined, as long as the multiple base stations 3 allocate wireless resources to one of the vehicle communication apparatuses 21 at a given time, it is possible to reduce the utilization ratio of the wireless resources in one of the base stations 3. By executing S3211, the graphs shown in the middle and lower rows in FIG. 28 can be obtained.

In the fifth embodiment, when the multiple networks which do not interfere with each other can be utilized, the base station 3 requesting the allocation of the wireless resource at the same time corresponds to the multiple base stations 3 belonging to the multiple networks. This can reduce the utilization ratio of the wireless resources in each of the base stations 3.

When wireless resource allocation is requested of the base station 3 undergoing interference in a region with interference, to allow the same communication speed to be obtained, a wireless resource quantity larger than that required in a region with no interference is required. Accordingly, in the fifth embodiment, in a region having interference in one network, but having no interference in another network, wireless resource allocation is requested only of the base station 3 belonging to the network with no interference. This can also reduce the utilization ratio of the wireless resources in each of the base stations 3.

Sixth Embodiment

Figure 29:
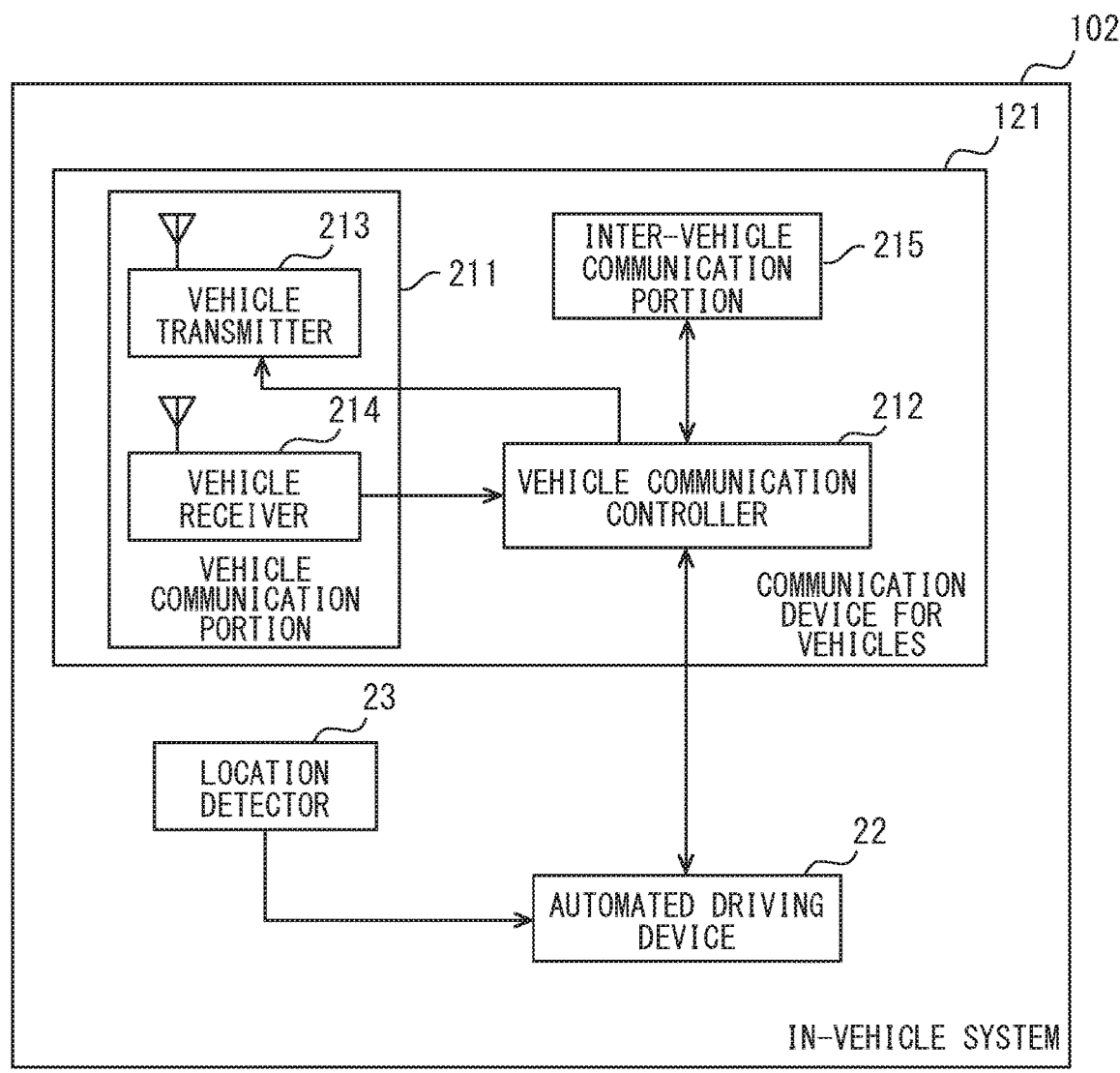
FIG. 29 is a view showing a configuration of the in-vehicle system included in the vehicle communication system in a sixth embodiment.

FIG. 29 shows a configuration of an in-vehicle system 102 included in a vehicle communication system in a sixth embodiment. The in-vehicle system 102 is different from the in-vehicle system 2 described heretofore in each of the embodiments in that a vehicle communication apparatus 121 includes an inter-vehicle communication portion 215.

The inter-vehicle communication portion 215 performs inter-vehicle communication with the inter-vehicle communication portion 215 included in the vehicle communication apparatus 121 mounted in another vehicle 5. The inter-vehicle communication is direct communication between the inter-vehicle communication portions 215 without interposition of the base station 3 therebetween. In the sixth embodiment, the vehicle communication controller 212 also performs radio wave transmission/reception resulting from control of the inter-vehicle communication portion 215 thereby.

The vehicle communication system of the sixth embodiment includes the same management server 4A as that of the second embodiment. Accordingly, the management server 4A includes the resource management server 8A and the schedule server 9A. In the sixth embodiment also, the schedule server 9A executes the processes shown in FIGS. 14 and 15.

However, in the sixth embodiment, when receiving resource allocation requests from the multiple vehicle communication apparatuses 21 utilized in the multiple vehicles 5 during the same period, the schedule server 9A can collectively derive travel schedules for the multiple vehicle communication apparatuses 21. The reason for collectively deriving the travel schedules is that a part of a route or the whole route is to be shared. When a part of the route has a section included in none of the base station areas 7 and when communication between the vehicle communication portion 211 and the base station 3 can be relayed by inter-vehicle communication, a part of the route or the whole route is shared. Note that the same period can be a preset given period elapsed from the reception of the resource allocation requests. When one resource allocation request includes a travel starting time and another resource allocation request is received before the travel starting time is reached, it may also be possible to regard the two resource allocation requests as the resource allocation requests received during the same period.

Figure 30:
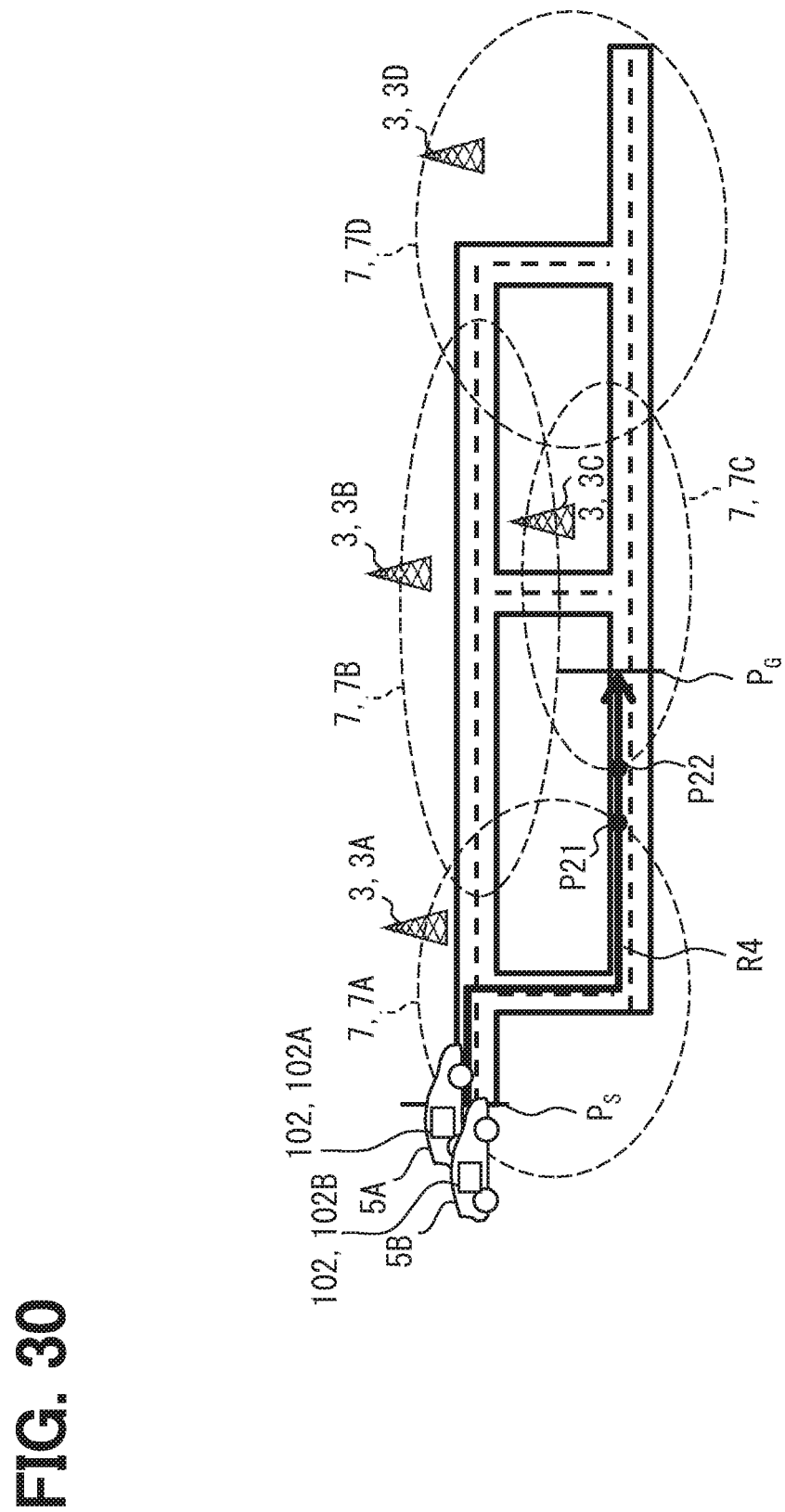
FIG. 30 is a view for specifically illustrating a process executed by the schedule server in the sixth embodiment.

Using FIG. 30, a process in the schedule server 9A in the sixth embodiment will be specifically described. In the example shown in FIG. 30, it is assumed that the resource allocation requests are transmitted from an in-vehicle system 102A mounted in the vehicle 5A and an in-vehicle system 102B mounted in the vehicle 5B during the same period. It is also assumed that the resource allocation requests include substantially the same starting points $P_S$ and substantially the same ending points $P_G$.

When receiving the resource allocation requests, the schedule server 9A gives YES in S31 in FIG. 14, and advances the process to S32. By executing the process in FIG. 15 showing the details of the process in S32, the schedule server 9A retrieves a route R4 shown in FIG. 30 for the two resource allocation requests in S3203.

Then, in S3204 subsequent thereto, the schedule server 9A derives a provisional travel schedule. In an upper row in FIG. 31, the radio wave map 11 on the route R4 when the vehicle 5 travels on the route R4 at a travel speed determined based on a limiting speed, an inter-vehicle distance, or the like with no consideration given to communication is shown. In a lower row in FIG. 31, a reserved resource quantity determined from the upper-row radio wave map 11 and the required communication speed included in the resource allocation request is shown.

As shown in FIG. 30, the route R4 has a communication interrupted section included in neither of the base station areas 7A and 7C. In the communication interrupted section of the route R4, the vehicle communication portion 211 cannot communicate with either of the base stations 3A and 3C. Due to the communication interrupted section, the upper-row graph in FIG. 31 has a section in which the signal intensity is zero, while the lower-row graph has a section in which the reserved resource quantity is zero.

The communication interrupted section extends from a location P21 to a location P22, but a P21-P22 distance is shorter than a distance over which the inter-vehicle communication portion 215 can communicate. Accordingly, the schedule server 9A derives the provisional travel schedule in which, while one of the vehicles 5 is traveling through the communication interrupted section, the other vehicle 5 is located in the base station area 7 near the communication interrupted section and performs inter-vehicle communication to allow communication between the vehicle communication portion 211 and the base station 3 to be relayed.

Figure 32:
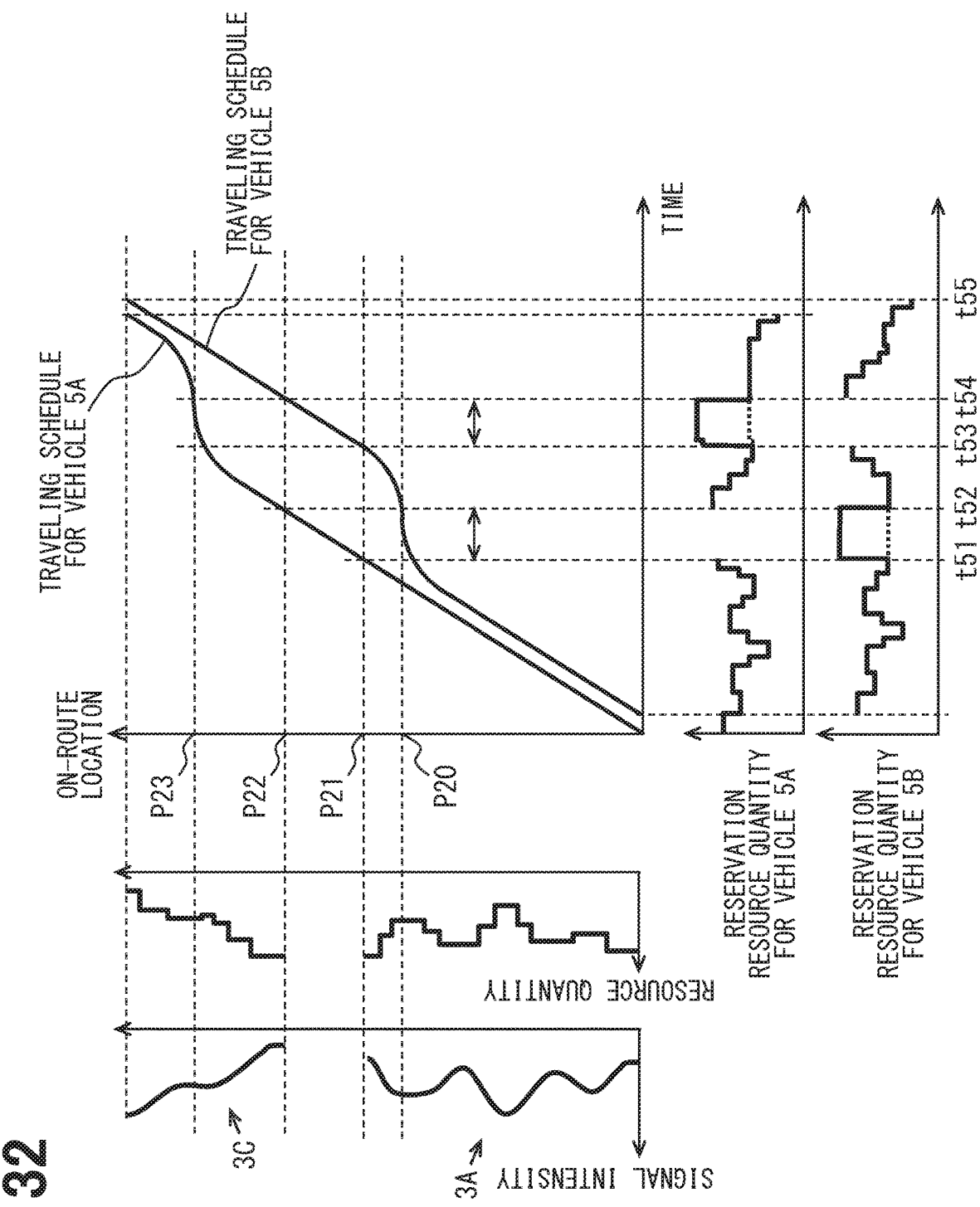
FIG. 32 is a graph showing respective travel schedules and reserved resource quantities for two vehicles.

A graph shown at a center of FIG. 32 and having a time axis and an on-route location axis as two axes represents the provisional travel schedule which allows the communication to be relayed by the inter-vehicle communication. From the graph at the center of FIG. 32, it can be seen that, according to the provisional travel schedule, the vehicle 5A is traveling ahead of the vehicle 5B, while the vehicle 5B is following the vehicle 5A.

The vehicle 5A is traveling through the communication interrupted section during a period between a time t51 and a time t52. During the period, in the provisional travel schedule derived for the vehicle 5B, there is no change in the on-route location. This is because the vehicle 5B stays in the base station area 7A to allow communication between the vehicle communication portion 211 included in the in-vehicle system 102A and the base station 3A to be relayed by the inter-vehicle communication portions 215 included in the in-vehicle systems 102A and 102B.

When the vehicle 5A has driven through the communication interrupted section, the vehicle 5B also starts to drive. Then, the vehicle 5B travels through the communication interrupted section during a period between a time t53 and a time t54. During the period, in the provisional travel schedule derived for the vehicle 5A, there is no change in the on-route location. This is because the vehicle 5A stays at a location in the base station area 7C near the communication interrupted section to allow communication between the vehicle communication portion 211 included in the in-vehicle system 102B and the base station 3C to be relayed by the inter-vehicle communication portions 215 included in the in-vehicle systems 102A and 102B.

After deriving the provisional travel schedule shown in the graph at the center of FIG. 32, the schedule server 9A then advances the process to S3205. In the example shown in FIG. 30, it is assumed that the provisional travel schedule is only one, and the schedule server 9A has estimated that the communication resource required in the provisional travel schedule can be reserved.

Figure 31:
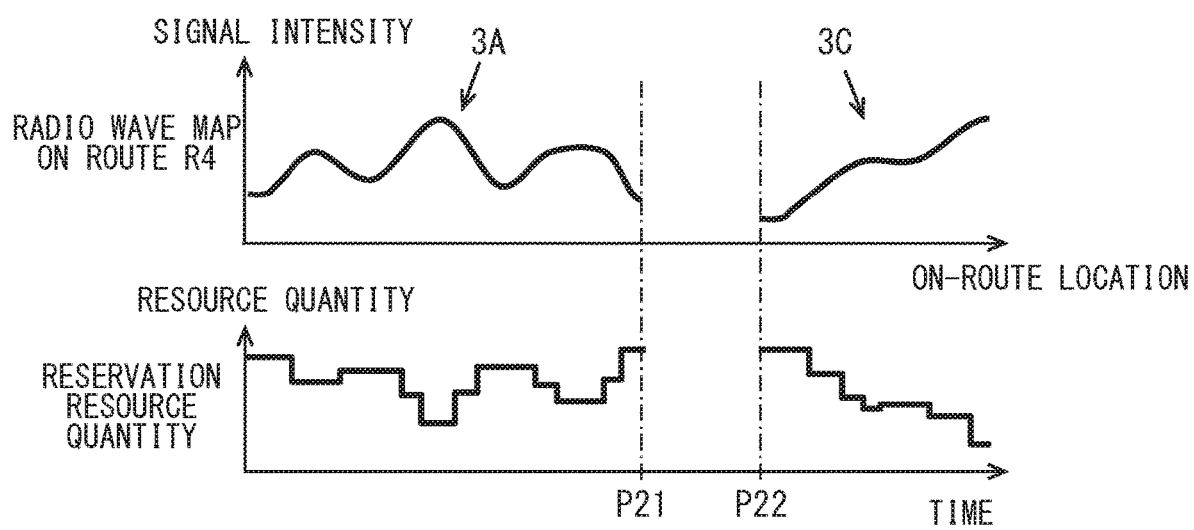
FIG. 31 shows an upper-row graph representing on-route radio wave maps, while showing a lower-row graph representing a required resource quantity.

In S3206 subsequent thereto, the schedule server 9A calculates a base-station-specific and location-specific reserved resource quantity for the route for which the schedule server 9A has estimated that the required wireless resources can be reserved in S3205. On a left side of FIG. 32, the two graphs shown in FIG. 31 are shown. As already described, these graphs are determined with no consideration given to communication. Accordingly, between the location P21 and the location P22, the reserved resource quantity is zero.

By contrast, in a lower side of FIG. 32, the time-specific reserved resource quantities are shown which have been determined for the vehicle communication apparatus 21 mounted in the vehicle 5A and the vehicle communication apparatus 21 mounted in the vehicle 5B in consideration also of relaying performed by inter-vehicle communication.

The lower one of the two graphs shown on the lower side of FIG. 32 is the same as the graph representing the reserved resource quantity shown on the left side of FIG. 32 except during the period between the time t51 and the time t52. In this graph, during the period between the time t51 and the time 52, to the resource quantity at a location P20 in the graph representing the reserved resource quantity and shown on the left side of FIG. 32, a resource quantity considering the relaying performed by the inter-vehicle communication, which is shown by a broken line, has been added.

The upper one of the two graphs shown on the lower side of FIG. 32 is the same as the graph representing the reserved resource quantity and shown on the left side of FIG. 32 except during a period between a time t53 and a time t54. In the graph, during the period between the time t53 and the time t54, to the resource quantity at a location P23 in the graph representing the reserved resource quantity and shown on the left side of FIG. 32, a resource quantity considering the relaying performed by the inter-vehicle communication has been added. A total resource quantity obtained by adding up the respective resource quantities at each of the times in the two graphs shown in the lower side of FIG. 32 corresponds to the reserved resource quantity at each of the times. After the reserved resource quantity is thus determined in S3206, if there are multiple the provisional travel schedules, the schedule server 9A executes steps including and subsequent to S3207, and selectively determines one provisional travel schedule from among the multiple provisional travel schedules. When the provisional travel schedule is only one, the schedule server 9A determines the provisional travel schedule to be the travel schedule.

In the sixth embodiment, even though the travel route shown by the travel schedule has the communication interrupted section, when communication between the vehicle communication apparatus 21 located in the communication interrupted section and the base station 3 can be relayed by inter-vehicle communication, it is possible to derive a travel schedule involving travel in the communication interrupted section. This enhances flexibility of the travel schedule.

Seventh Embodiment

A vehicle communication system in a seventh embodiment has the same hardware configuration as that of the vehicle communication system 1A in the second embodiment. Accordingly, the management server 4A includes the schedule server 9A and the resource management server 8A, and the schedule server 9A can refer to the radio wave maps 11.

In the seventh embodiment, the resource allocation request transmitted from the vehicle communication apparatus 21 includes, in addition to the starting point $P_S$ and the ending point $P_G$ of the section requesting wireless resource allocation, a time block during which other-purpose communication as communication for a purpose other than for movement and a required communication speed. It is assumed that the other-purpose communication is communication for teleconference.

Figure 33:
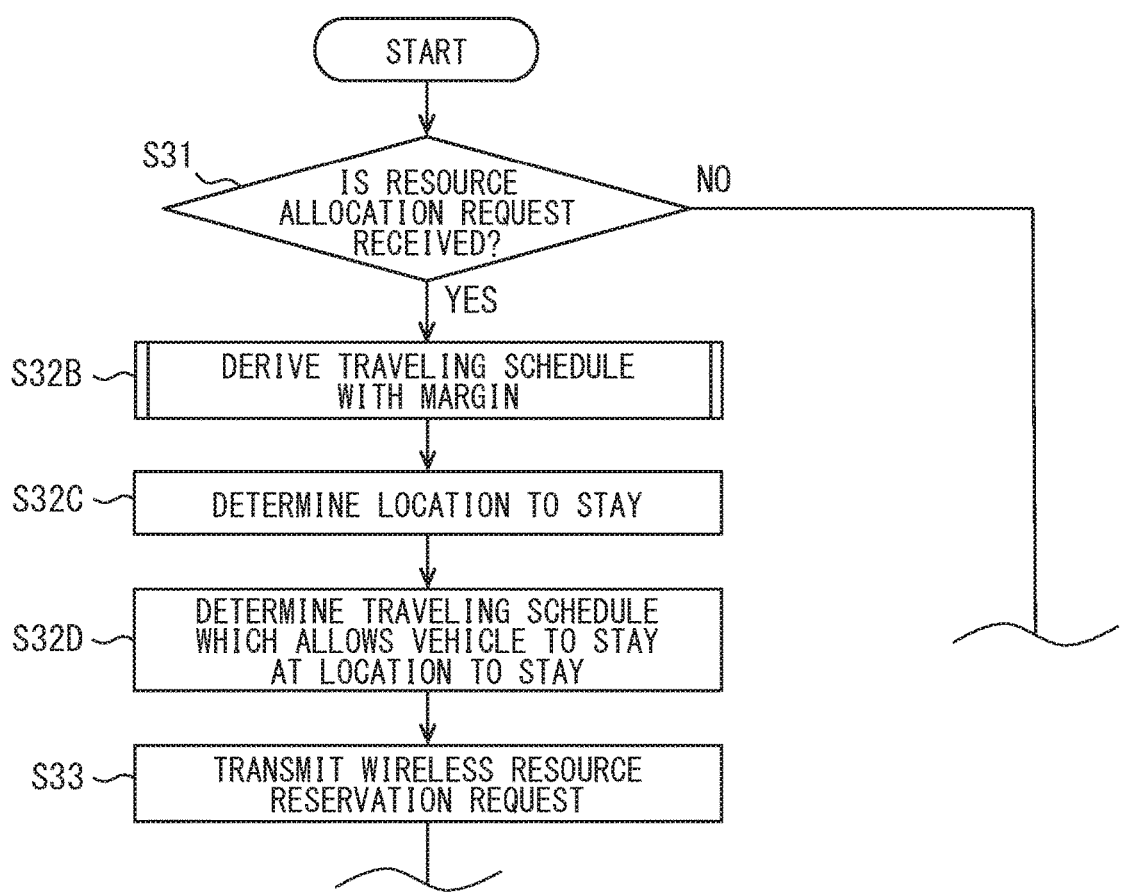
FIG. 33 is a view showing a part of a process executed by the schedule server in a seventh embodiment.

FIG. 33 shows a part of a process executed by the schedule server 9A in the seventh embodiment. The portion omitted in FIG. 33 is the same as in FIG. 14. When a result of the determination in S31 in FIG. 33 is YES, the schedule server 9A advances the process to S32B.

In S32B, the schedule server 9A derives a travel schedule with a margin. A process of deriving the travel schedule with a margin is as described in the fourth embodiment. In the travel schedule with a margin, as shown in FIG. 25, a variation range for a location which may possibly be reached at a given time is obtained. For example, in FIG. 25, at the time t30, the variation range for the location extends from the location P11 to the location P12.

Note that, in the fourth embodiment, the travel schedule with a margin is derived in consideration of various variation factors. By contrast, in the seventh embodiment, the travel schedule with a margin is derived in consideration of an adjustable travel speed range instead of the variation factors. The adjustable travel speed range is a speed range which does not disturb a traffic flow on each road. It is assumed that, e.g., an upper limit of the travel speed range is a limiting speed on each road, and a lower limit of the travel speed range is a value obtained by subtracting a given value from the limiting speed.

In S32C, in the travel schedule with a margin derived in S32B, a location where the communication efficiency is highest within a variation range for a location where the vehicle 5 can be present at the starting time (hereinafter referred to as the other-purpose communication starting time) of the time block during which the other-purpose communication is to be performed, which is included in the resource allocation request, is determined to be a location to stay.

In S32D, a travel schedule which allows the vehicle to stay at the location to stay determined in S32C during the time block during which the other-purpose communication is to be performed, which is included in the resource allocation request, is determined. When the travel speed in the travel schedule is reduced to be lower than when the other-purpose communication is not to be performed, it follows that the vehicle 5 stays, for the time block during which the other-purpose communication is to be performed, at a location where the communication efficiency is higher than at a location where the vehicle 5 is present at the starting time of the other-purpose communication in a travel schedule in which the travel speed is not reduced.

In S33, the schedule server 9A transmits the wireless resource reservation request to the resource management server 8A. The wireless resource reservation request includes the reserved resource quantity determined for the travel schedule determined in S32D.

Figure 34:
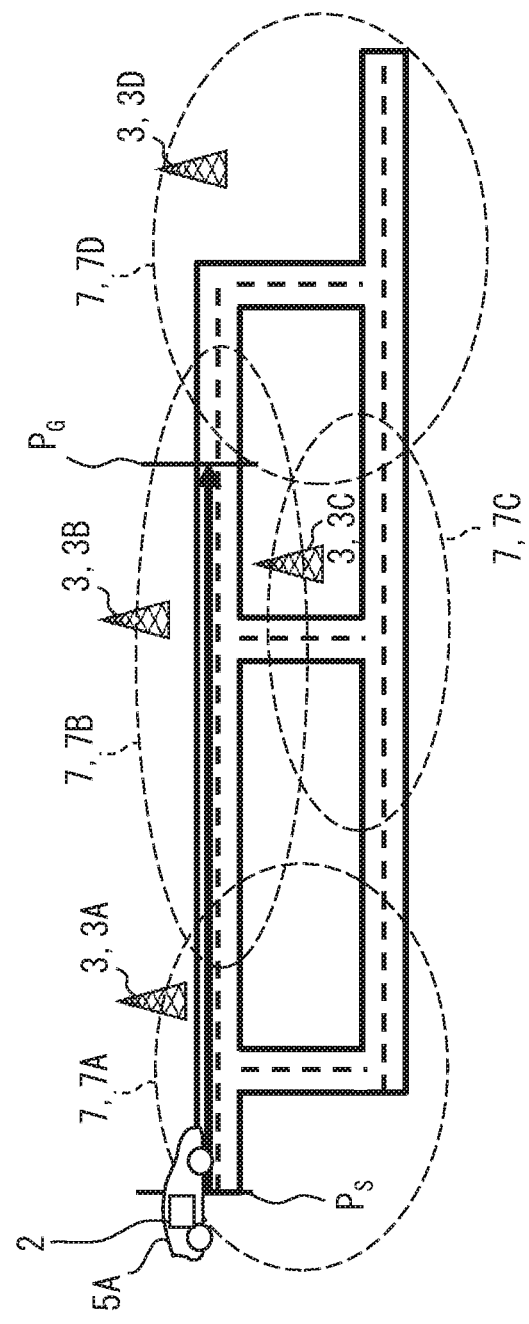
FIG. 34 is a view showing a state in which the in-vehicle system mounted in the vehicle has transmitted a resource allocation request.

Using FIGS. 34 and 35, a method of determining the reserved resource quantity in the seventh embodiment will be described. FIG. 34 shows a state in which the in-vehicle system 2 mounted in the vehicle 5A has transmitted the resource allocation request. The starting point $P_S$ and the ending point $P_G$ are as illustrated in the drawing. Accordingly, the base stations 3 which allocate the wireless resources in response to the resource allocation request are the base stations 3A and 3B.

Figure 35:
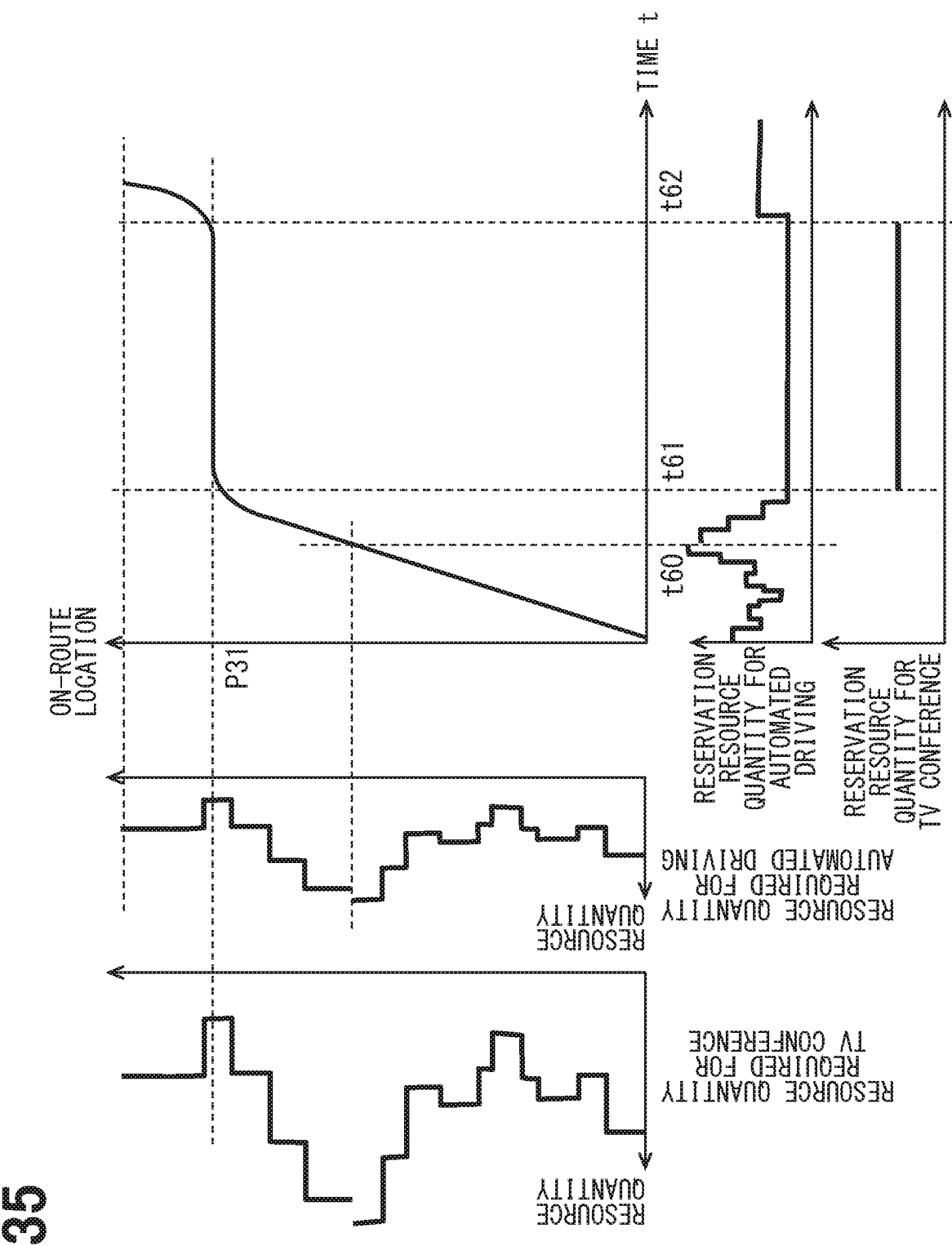
FIG. 35 is a view specifically illustrating the reserved resource quantity to be determined in the seventh embodiment.

In FIG. 35, a time t61 is the starting time of the other-purpose communication, while a time t62 is the ending time of the other-purpose communication. A graph shown at the center of FIG. 35 is the graph representing the on-route location varying with a time when the vehicle 5A travels based on the travel schedule determined in S32D. Each of two graphs shown on a left side of FIG. 35 has the same on-route location axis as that of the center graph, while having a resource quantity axis crossing the on-route location axis. Of the two graphs shown on the left side, the graph closer to the center graph represents the resource quantity required for communication performed to effect automated driving as communication for movement. Of the two graphs shown on the left side of FIG. 35, the graph more distant from the center graph represents the resource quantity required for communication if teleconference is assumed to be performed at each of the on-route locations. These resource quantities are determined from the communication speed required for each communication and the radio wave maps 11.

A location P31 is the location to stay determined in S32C. At the location P31, the required resource quantity is smallest. This is because the location P31 is a location where the communication efficiency is highest in the variation rage for the location where the vehicle 5 can be present at the starting time of the other-purpose communication. The travel schedule determined in S32D is a schedule in which the vehicle 5 stays at the location P31 during a period between the time t61 and the time t62.

In FIG. 35, each of two graphs shown under the center graph has an abscissa axis which is the same time axis as that of the center graph and an ordinate axis representing the resource quantity. The upper graph represents the resource quantity required for communication performed to effect automated driving at each of the times. The lower graph represents the resource quantity required for teleconference at each of the times. A resource quantity obtained by adding up the resource quantities in the two graphs at each of the times corresponds to the reserved resource quantity included in the wireless resource reservation request transmitted in S33.

In the seventh embodiment, when the resource allocation request includes the time block during which the other-purpose communication is to be performed, a travel schedule in which the vehicle stays at the location where the communication efficiency is high to perform the other-purpose communication is determined. This allows the wireless resources to be more effectively utilized than when the other-purpose communication is performed at a location where the communication efficiency is relatively low.

Eighth Embodiment

A vehicle communication system of an eighth embodiment also has the same hardware configuration as that of the vehicle communication system 1A of the second embodiment. The management server 4A includes the schedule server 9A and the resource management server 8A, and the schedule server 9A can refer to the radio wave maps 11.

Figure 36:
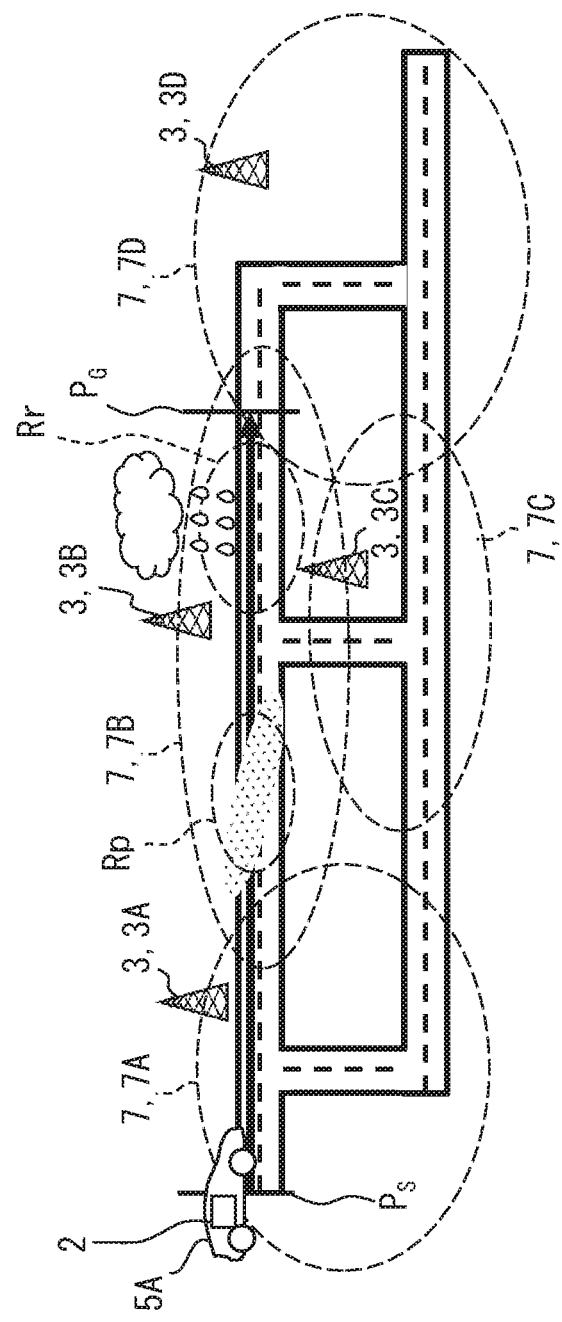
FIG. 36 is a view showing a rainy region and a faded demarcation line region each considered in an eighth embodiment.

In the eighth embodiment, consideration is given to a rainy region Rr and a faded demarcation line region Rp each shown in FIG. 36. The rainy region Rr is the region where an amount of rainfall is equal to or more than a given level. The faded demarcation line region Rp is the region where demarcation lines drawn on a road are faded. In such regions, during automated driving, an amount of information obtained by a perimeter monitoring sensor included in the vehicle 5 decreases. As a result, it is possible that, during automated driving, the vehicle 5 acquires a larger amount of information through wireless communication in order to compensate for the decreased amount of information obtained by the perimeter monitoring sensor.

The schedule server 9A can acquire information on a location of a region where the amount of information obtained by the perimeter monitoring sensor decreases, such as the rainy region Rr or the faded demarcation line region Rp, through communication with an external computer or the like. Then, the schedule server 9A determines a risk factor based on the acquired information. The risk factor is a factor showing a ratio of an increased communication amount in the region with reference to a communication amount as a standard in a case where the amount of information obtained by the perimeter monitoring sensor does not decrease. As the amount of rainfall increases or the degree to which the demarcation lines are faded is higher, the factor has a larger value.

Figure 37:
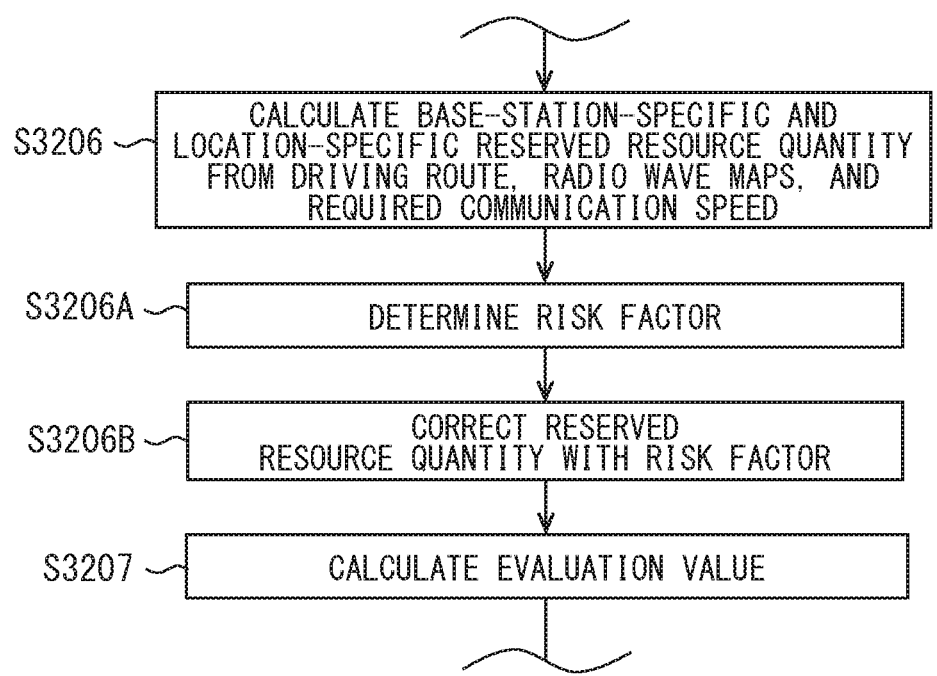
FIG. 37 is a view showing a part of a process executed by the schedule server in the eighth embodiment.

FIG. 37 shows a part of a process executed by the schedule server 9A in the eighth embodiment. The portion omitted in FIG. 37 is the same as in FIG. 15. The process shown in FIG. 37 is obtained by adding S3206A and 3206B to the process shown in FIG. 15. The process shown in FIG. 37 is executed in S32 in FIG. 14.

In FIG. 37, in S3206A, the risk factor is determined. The risk factor is determined for each of the on-route locations. For the location where a possibility is higher that the amount of information obtained by the perimeter monitoring sensor decreases to a higher degree, the risk factor is increased.

Figure 38:
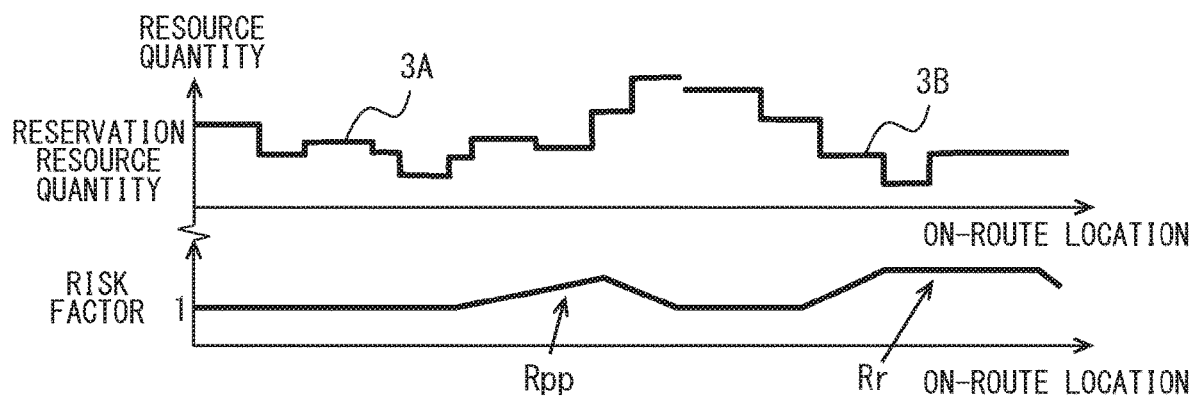
FIG. 38 is a view showing an example of a risk factor.

An upper-row graph in FIG. 38 is the graph conceptually showing the reserved resource quantity calculated in S3206, while a lower-row graph in FIG. 38 is the graph conceptually showing the risk factor determined in S3206A. The graph representing the risk factor has a value larger than 1 in each of the faded demarcation line region Rp and the rainy region Rr.

In S3208B, the reserved resource quantity calculated in S3206 is corrected with the risk factor determined in S3206A. Specifically, for each of the locations, the reserved resource quantity calculated in S3206 is multiplied by the risk factor determined in S3206A. In the process subsequently executed, the corrected reserved resource quantity is utilized. The corrected reserved resource quantity is the reserved resource quantity determined in consideration of a possibility that the amount of information obtained by the perimeter monitoring sensor may decrease to a higher degree.

In the eighth embodiment, the reserved resource quantity is determined in consideration of the possibility that the amount of information obtained by the perimeter monitoring sensor may decrease to a higher degree. Accordingly, it is possible to reduce the possibility that the wireless resources are insufficient even though the amount of information required to be acquired by the vehicle communication apparatus 21 increases.

While the embodiments have been described heretofore, the disclosed technology is not limited to that in the embodiments described above, and modifications shown below are also included in the disclosed scope. The disclosed technology can also be variously modified and practiced in modes other than those described below within the scope not departing from the gist thereof.

(Modification 1)

The server communication controller 42 may also modify the value of the factor N to be utilized to calculate the maximum allowable resource quantity based on at least one of the time and the location. As the value of the factor N is increased, it is possible to more effectively utilize the wireless resources but, as the value of the factor N is increased, a possibility of occurrence of congestion increases. To inhibit the congestion, as the ratio at which the vehicle communication apparatus 21 utilizes the allocated wireless resource is higher, the factor N may appropriately be reduced.

The ratio at which the vehicle communication apparatus 21 utilizes the allocated wireless resource may vary depending on the time and the location. For example, since the accuracy of information obtained by a camera decreases during the nighttime, in automated driving, the need to utilize information obtained by wireless communication is assumed to increase. In that case, it is assumed that the ratio at which the allocated wireless resource is utilized is higher during the nighttime than during the daytime. When such an assumption is possible, the factor N is preferably set smaller during the nighttime than during the daytime.

Also, in a section in which an accident occurrence frequency is relatively high, the vehicle 5 should travel utilizing more information. Accordingly, it is assumed that, in the section in which the accident occurrence frequency is relatively high, the ratio at which the allocated wireless resource is utilized is higher. When such an assumption is possible, in a preset section in which the accident occurrence frequency is relatively high, the factor N is preferably set smaller than in a section in which the accident occurrence frequency is relatively low. Examples of the section in which the accident occurrence frequency is relatively high include a section including an intersection and the vicinity thereof, a section including the vicinity of a junction, or the like. Examples of the section in which the accident occurrence frequency is relatively low include a linear section of a road. Examples of an accident include traffic accidents such as an inter-vehicle accident and an accidental contact between a vehicle and a person.

(Modification 2)

In each of the embodiments, the resource allocation request includes the travel schedule. However, the resource allocation request may also include information other than the travel schedule which allows a future location of the vehicle 5 to be estimated. For example, the resource allocation request may also include a current location of the vehicle 5, the direction of movement thereof, and the speed thereof instead of the travel schedule.

(Modification 3)

The vehicle communication apparatus 21 may also perform inter-vehicle communication or road-vehicle communication instead of or in addition to performing communication with the base station 3.

(Modification 4)

For the individual base stations 3, the respective management servers 4 may also be provided on a one-by-one basis. Alternatively, each of the base stations 3 may also have the function of the management server 4.

(Modification 5)

In the example described above, not only the wireless resource is reserved for each of the times, but also the wireless resource is reserved for each of the base stations. Specifically, in the example described in each of the embodiments, the wireless resources are categorized by the time and the base station. However, the wireless resources may also be categorized by parameters other than the time and the base station. The parameters by which the wireless resources are to be categorized include, in addition to the time and the base station, a frequency region, a CDMA (Code Division Multiple Access) code, MIMO (Multiple Input Multiple Output) precoding settings, or the like.

Figure 39:
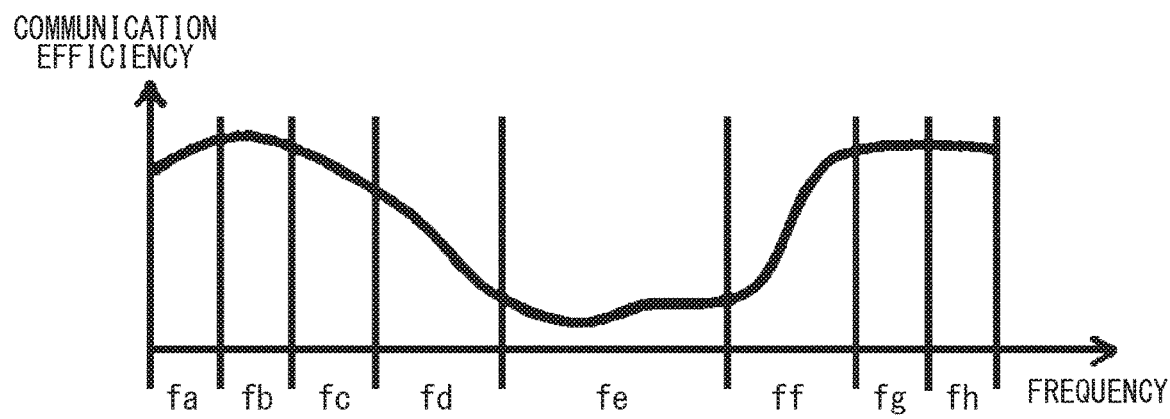
FIG. 39 is a graph showing communication efficiencies for multiple frequency regions.

When the wireless resources can be categorized by the frequency region, it may also be possible to allow the wireless resource allocation request to specify one of multiple frequency regions of which the wireless resource is to be requested. FIG. 39 shows respective communication efficiencies in individual frequency regions. FIG. 39 shows eight frequency regions fa to fh. It may also be possible to arbitrarily select one or multiple frequency regions from among the eight frequency regions and request allocation of the wireless resource or resources of the selected one or plurality of frequency regions. In the example shown in FIG. 39, the frequency region fe is wider than the other frequency regions. This is because, since the communication efficiency is low in the frequency region fe, to allow the same communication speed to be obtained, a wider frequency region is required. On the other hand, since the communication efficiency is high in each of the frequency regions fa and fb, narrow frequency regions are sufficient to allow the same communication speed to be obtained. Note that the resource management server 8A may also selectively determine, from among the multiple frequency regions, one or more frequency regions of which the wireless resource or resources are to be allocated.

The MIMO precoding settings mean beam forming or transfer of multiple streams utilizing multiple antennas. When the multiple antennas are utilized, a frequency efficiency is improved compared to that when only one antenna is utilized. Accordingly, even when the number of frequency regions is small, by increasing the number of the antennas, a communication speed is improved without involving expansion of the frequency regions. Consequently, it may also be possible to specify the MIMO precoding settings instead of or in addition to allowing the wireless resource allocation request to specify one of multiple frequency regions of which the wireless resource is to be requested.

(Modification 6)

Each of the management servers 4, 4A, and 4C may also allocate, to a given one of the vehicle communication apparatuses 21, a time-specific location and a time-specific wireless resource for communication with one of the base stations 3 and simultaneously inhibit another base station 3 having the base station area 7 partially overlapping that of the one base station 3 from utilizing the wireless resource.

A specific description will be given on the assumption that the one base station 3 is the base station 3A and the other base station 3 is the base station 3B. As shown in FIG. 13, the base station 3A and the base station 3B have the respective base station areas 7A and 7B partially overlapping each other. When an in-vehicle system 2A mounted in the vehicle 5A performs communication with the base station 3A, while the vehicle 5A in which the in-vehicle system 2A is mounted is present in a region where the base station areas 7A and 7B overlap each other, the communication efficiency of the communication between the in-vehicle system 2A and the base station 3A may be deteriorated by interference. Accordingly, at the same time when the region where the base station areas 7A and 7B overlap each other is allocated as the location resource to the in-vehicle system 2A and when the wireless resource of the base station 3A is allocated to the in-vehicle system 2A, the base station 3B is simultaneously inhibited from utilizing the wireless resource. This can inhibit deterioration of the communication efficiency between the base station 3A and the in-vehicle system 2A.

Note that, at the time at which the base station 3B is inhibited from utilizing the wireless resource, for such a reason that the wireless resource has already been allocated for communication between the base station 3B and another vehicle communication apparatus 21, it may be impossible to inhibit the base station 3B from using the wireless resource. At that time, the wireless resource cannot be allocated to the in-vehicle system 2A.

(Modification 7)

The radio wave maps 11 are produced through measurement of the signal intensities. However, it may also be possible to produce simpler radio wave maps by determining the signal intensities based on distances from the base stations 3 without measuring the signal intensities. In this case, as the distances from the base stations 3 are larger, the signal intensities are lower. A representation form for the radio wave maps may also be a function based on which the signal intensities are determined by the distances from the base stations 3, not a two-dimensional form. This is because the function substantially represents a two-dimensional map in which the signal intensities are lower as the distances from the base stations 3 are larger.

(Modification 8)

The resource allocation request may also include information which allows the communication speed to be estimated, such as control (e.g., vehicle remote control) to be executed by communication, instead of the required communication speed.

(Modification 9)

The reserved resource quantity included in the wireless resource reservation request need not necessarily be the base-station-specific reserved resource quantity. This is because the resource management server 8A may also determine the base station of which the wireless resource is to be allocated.

(Modification 10)

In each of the embodiments, the vehicle communication portion 213 mounted in the vehicle 5 transmits the resource allocation request as the request transmitter. However, the request transmitter need not necessarily be mounted in the vehicle 5. A terminal to be carried, such as a smartphone, may also have the function of the request transmitter. A case where the terminal to be carried has the function of the request transmitter is not limited to a case where the terminal to be carried is carried into the vehicle 5 and transmits the resource allocation request in that state. The terminal to be carried may also be operated by a user outside the vehicle 5 and transmit the resource allocation request outside the vehicle 5.

Also, a device to be operated by the user outside the vehicle 5 to transmit the resource allocation request outside the vehicle 5 need not necessarily be carried by the user, and may also be of a stationary type. When the device which transmits the resource allocation request is of a stationary type, the device may also be wiredly connected to the management server 4 to transmit the resource allocation request by wired communication. Note that when the terminal to be carried by the user has the function of the request transmitter, the terminal to be carried may be carried into the vehicle 5 to serve as a vehicle communication apparatus, or may also be a terminal other than the vehicle communication apparatus.

The device other than the vehicle communication apparatus and having the function of the request transmitter is hereinafter referred to as a request transmitting device. The request transmitting device may specify the vehicle communication apparatus utilizing a device ID or the like or need not necessarily specify the vehicle communication apparatus. Even when the resource allocation request transmitted from the request transmitting device includes no specification of the vehicle communication apparatus, the resource allocation request includes minimum information indicative of a section requesting location resource allocation and wireless resource allocation. The information indicative of the section requesting the location resource allocation corresponds to, e.g., the starting point $P_S$ and the ending point $P_G$ each described above. The resource allocation request may also include a time at which the vehicle 5 leaves the starting point $P_S$ and a time at which the vehicle 5 arrives at the ending point $P_G$.

An example of a case where the resource allocation request transmitted from the request transmitting device has no specification of the vehicle communication apparatus is a case where vehicle allocation is also requested. The management server 4 also has a function of a vehicle allocation server or, alternatively, cooperates with a vehicle allocation server to determine the vehicle 5 to be allocated which can satisfy the location resource requested by the resource allocation request. The management server 4 may also move the vehicle 5 to be allocated to the starting point $P_S$ by performing automated driving control.

(Modification 11)

In the seventh embodiment, a location where the communication efficiency is highest in the variation range for the location where the vehicle can be present at the starting time of the other-purpose communication is determined as the location to stay. However, the location to stay need not necessarily be within the variation range for the location where the vehicle can be present at the starting time of the other-purpose communication as long as the location to stay is within a variation range for a location where the vehicle can stay within the time block during which the other-purpose communication is to be performed. This is because, as long as the vehicle stays at the location where the communication efficiency is high even during a time block corresponding to a part of the time block during which the other-purpose communication is to be performed, the wireless resource can be more effectively utilized than when the other-purpose communication is performed at a location where the communication efficiency is relatively low. In addition, in the seventh embodiment, the location to stay is assumed to be the location where the communication efficiency is highest in the variation range for the location where the vehicle can stay. However, the location to stay may appropriately be a location where the communication efficiency is totally improved compared to that when the vehicle travels without making a stay for performing the other-purpose communication.

(Modification 12)

In the sixth embodiment, it may also be possible not to limit the section for which relaying is to be performed by the inter-vehicle communication to the communication interrupted section and assume that the section for which relaying is to be performed by the inter-vehicle communication is a section in which the wireless resource allocatable thereto is insufficient to satisfy the required resource quantity. In other words, even though it is determined that a part of the travel route has a section in which the wireless resource allocatable thereto is insufficient to satisfy the required resource quantity, when the deficit resource quantity can be provided by performing relaying via the inter-vehicle communication, the travel route can be nominated as a candidate travel route. The relaying via the inter-vehicle communication is performed by the vehicle communication apparatuses 21 located before and after the section in which the wireless resource is insufficient, in the same manner as in the sixth embodiment. The resource quantity to be relayed may be the whole required resource quantity or may also be the deficit wireless resource quantity.

The invention claimed is:

1. A vehicle communication system comprising:
   a vehicle communication apparatus for a vehicle;
   a management apparatus configured to manage a wireless resource;
   a base station configured to wirelessly communicate with the vehicle communication apparatus; and
   a request transmitter configured to transmit a resource allocation request to the management apparatus for requesting allocation of a location resource and the wireless resource by time, wherein:

the vehicle communication apparatus includes:
- a vehicle transmitter configured to wirelessly transmit signals to an outside of the vehicle,
- a vehicle receiver configured to receive signals wirelessly transmitted from the outside of the vehicle, and
- a vehicle communication controller that
  - corresponds to a vehicle processer, and
  - is configured to control the vehicle transmitter and the vehicle receiver;

the management apparatus includes:
- a management apparatus receiver configured to receive the resource allocation request,
- an allocator that
  - corresponds to a management processer, and
  - is configured to, in accordance with the resource allocation request received by the management apparatus receiver, allocate the location resource and the wireless resource by time to the vehicle communication apparatus in accordance with the resource allocation request, and
- a management apparatus transmitter configured to transmit an allocation result of the allocator to the vehicle communication apparatus in accordance with the resource allocation request;

the vehicle receiver is configured to receive the allocation result; and the vehicle communication controller is configured to control the vehicle transmitter and the vehicle receiver based on the allocation result received by the vehicle receiver, wherein:
- the resource allocation request corresponds to information that requests the allocation of the location resource and the wireless resource by time; and
- the vehicle communication apparatus utilizes the information for communicating with the base station, and wherein:

the allocator includes:
- a location resource allocator configured to allocate the location resource by time, and
- a wireless resource allocator configured to allocate the wireless resource by time;

the location resource allocator is configured to transmit a travel schedule indicating the allocation result of the location resource and a required communication speed that is needed by the vehicle communication apparatus in each location to the wireless resource allocator; and the wireless resource allocator is configured to
- determine a required resource quantity by time and by location based on a wireless resource map indicating information regarding a communication efficiency by location and based on the required communication speed that is needed by the vehicle communication apparatus in each location, and
- allocate the wireless resource by time and by at least one of base stations to the vehicle communication apparatus based on the required resource quantity by time and location.

2. The vehicle communication system according to claim 1, wherein:

the resource allocation request
includes: information indicating a section requesting the allocation of the wireless resource, a schedule time at which the vehicle travels at each position in the section, and a required communication speed, and
requests the allocation of the location resource and the wireless resource by time; and the allocator is configured to allocate the requested location resource and the requested wireless resource by time by the resource allocation request to the vehicle communication apparatus transmitting the resource allocation request when the allocator is able to allocate the requested location resource and the requested wireless resource by time by the resource allocation request received from the management apparatus receiver.

3. The vehicle communication system according to claim 1, wherein:

the allocator includes:
- a location resource allocator configured to allocate the location resource by time, and
- a wireless resource allocator configured to allocate the wireless resource by time;

after allocating the location resource, the location resource allocator is configured to
- determine a required resource quantity by time based on a wireless resource map indicating information regarding a communication efficiency by location and a required communication speed that is needed by the vehicle communication apparatus in each location, and
- transmit the required resource quantity by time;

the at least one of base station includes a plurality of base stations; and the wireless resource allocator is configured to allocate the wireless resource by time and by one of the plurality of base stations to the vehicle communication apparatus based on the required resource quantity by time.

4. The vehicle communication system according to claim 3, wherein:

each of the plurality of base stations includes the wireless resource map in accordance with each of the plurality of base stations; and the location resource allocator is configured to decide the required resource quantity for one of the plurality of base stations.

5. The vehicle communication system according to claim 3, wherein:

after allocating the location resource, the location resource allocator is configured to
- estimate a variation range of the location by time based on the location resource by time, and
- set an amount that is equal to or more than a maximum amount needed when the location by time varies in the variation range, to the required resource quantity by time and location.

6. The vehicle communication system according to claim 3, wherein:

each of the plurality of base stations belongs to one of a plurality of networks; and a plurality of communication ranges of the plurality of base stations belonging to one of the plurality of networks different from each other correspond to a plurality of base station areas;

the plurality of base station areas partly overlap each other; and the location resource allocator is configured to determine the required resource quantity requesting each of the base stations so that a total resource quantity requesting to the plurality of base stations belonging to one of the plurality of networks is equal to or more than a resource quantity decided based on the wireless resource map and the required communication speed, when a condition for utilizing the plurality of networks is satisfied in an overlapping region where the plurality of base station areas belonging to the plurality of base station areas different from each other overlap each other.

7. The vehicle communication system according to claim 3, wherein:
the resource allocation request
includes: a section for requesting the allocation of the wireless resource and a time band for performing a different use communication corresponding to a communication for a use different from a use for movement, and
requests the allocation of the location resource and the wireless resource by time; and
in a case where the resource allocation request includes the time band in which the different use communication is performed and in a case where the vehicle travels in the section in an adjustable travel speed range, the location resource allocator determines the allocation of the location resource by time so that the vehicle stays, during at least a part of the time band in which the different use communication is performed, at a location where the communication efficiency is higher compared with a case where the vehicle travels in the section without staying for the different use communication in a variation range of a location at which the vehicle is capable of staying within the time band in which the different use communication is performed.

8. The vehicle communication system according to claim 3, wherein:
the vehicle communication apparatus further includes a vehicle to vehicle communication portion that performs vehicle to vehicle communication; and
after the location resource allocator is configured to
determine to be capable of allocating, as a whole, the location resource and the wireless resource by time to a plurality of vehicle communication apparatuses for each of a plurality of vehicles, and
determine that a part of the travel route for the allocation of the location resource includes a section that lacks the wireless resource that is capable of being allocated in accordance with the required resource by referring the wireless resource, in a case where the location resource allocator is capable of providing the wireless resource for a lacked amount to the vehicle communication apparatus positioned in the section lacking the wireless resource, due to a relay utilizing the vehicle communication apparatus positioned at a front or a rear side from the section lacking the wireless resource in the travel route, the location resource allocator sets the travel route in which the vehicle travels in the section lacking the wireless resource to a candidate for the allocation of the location resource.

9. The vehicle communication system according to claim 1, wherein
the allocator is configured to determine to be capable of allocating a required resource quantity requested by the resource allocation request to the vehicle communication apparatus transmitting the resource allocation request, when a sum of a required resource quantity at a time and a location indicated by the resource allocation request and an allocated resource quantity is equal to or less than a maximum allowable resource quantity obtained by multiplying a sum of resources allocated to a plurality of base stations by one or more coefficients.

10. The vehicle communication system according to claim 9, wherein
the allocator is configured to change the one or more coefficients based on at least one of the time or the location.

11. The vehicle communication system according to claim 9, wherein
the allocator is configured to set the one or more coefficients of a preset section in which an accident occurrence frequency is high to be less than a preset section in which the accident occurrence frequency is low.

12. The vehicle communication system according to claim 1, wherein:
after allocating the location resource and the wireless resource by time,
the allocator is configured to
calculate, for each of a changed schedule obtained by changing a travel speed of the travel schedule decided based on the location resource by time and the travel schedule that is not changed,
an evaluation value corresponding to a value evaluating either at least one of a movement distance or a movement time, and
a maximum value of a utilization rate of the wireless resource when the vehicle travels along the changed schedule or the unchanged travel schedule, and
determine whether to change the allocation of the location resource by time decided based on the changed schedule or the unchanged travel schedule.

13. The vehicle communication system according to claim 1, further comprising:
a travel control device that is mounted on the vehicle and is configured to control travel of the vehicle based on communication via the vehicle communication apparatus,
wherein
the travel control device is configured to control travel of the vehicle under a condition where the allocation result received by the vehicle receiver corresponds to a result that the location resource and the wireless resource by time in accordance with the resource allocation request have been allocated.

14. The vehicle communication system according to claim 1, wherein
the vehicle transmitter corresponds to the request transmitter.

15. A vehicle communication apparatus for a vehicle and performing wireless communication, comprising:
a vehicle transmitter configured to wirelessly transmit signals to an outside of the vehicle;
a vehicle receiver configured to receive signals wirelessly transmitted from the outside of the vehicle; and
a vehicle communication controller configured to control the vehicle transmitter and the vehicle receiver,
wherein
the vehicle receiver is configured to receive an allocation result indicating whether a location and a wireless resource by time from a management apparatus, the location and the wireless resource being requested by a resource allocation request; and
the vehicle communication controller is configured to control the vehicle transmitter and the vehicle receiver based on the allocation result received by the vehicle receiver;

the vehicle communication is configured to wirelessly communicate with a base station;

the resource allocation request corresponds to information that requests the allocation of the location resource and the wireless resource by time; and the vehicle communication apparatus is configured to utilize the information for communicating with the base station;

the vehicle communication apparatus is configured to receive allocation of a required resource quantity by time and by location;

the required resource is determined based on a wireless resource map indicating information regarding a communication efficiency by location and based on a required communication speed that is needed by the vehicle communication apparatus in each location; and a result of the allocation of the location resource is indicated by a travel schedule of the management apparatus.

16. A management apparatus managing a wireless resource, comprising:

a management apparatus receiver configured to receive a resource allocation request requesting allocation of a location and the wireless resource by time;

an allocator configured to allocate the location and the wireless resource by time to a vehicle communication apparatus for a vehicle and for performing wireless communication in accordance with the resource allocation request received by the management apparatus receiver; and a management apparatus transmitter configured to transmit an allocation result of the allocator to the vehicle communication apparatus, wherein:

the resource allocation request corresponds to information that requests the allocation of the location resource and the wireless resource by time; and the vehicle communication apparatus utilizes the information for communicating with a base station, and wherein:

the allocator includes:

a location resource allocator configured to allocate the location resource by time, and a wireless resource allocator configured to allocate the wireless resource by time;

the location resource allocator is configured to transmit a travel schedule indicating the allocation result of the location resource and a require communication speed that is needed by the vehicle communication apparatus in each location to the wireless resource allocator; and the wireless resource allocator is configured to determine a required resource quantity by time and by location based on a wireless resource map indicating information regarding a communication efficiency by location and based on the required communication speed that is needed by the vehicle communication apparatus in each location, and allocate the wireless resource by time and by at least one of base stations to the vehicle communication apparatus based on the required resource quantity by time and location.

* * * * *